US012717757B2

(12) United States Patent
Haddad

(10) Patent No.: US 12,717,757 B2
(45) **Date of Patent: *Aug. 25, 2026**

(54) DATA CONVERSION AND DISTRIBUTION SYSTEMS FOR DYNAMICALLY UPDATING MODEL RESULTS

(71) Applicant: ICE Data Pricing & Reference Data, LLC, Bedford, MA (US)

(72) Inventor: Robert Naja Haddad, Acton, MA (US)

(73) Assignee: ICE Data Pricing & Reference Data, LLC, Bedford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/305,871

(22) Filed: Aug. 21, 2025

(65) Prior Publication Data

US 2025/0370961 A1 Dec. 4, 2025

Related U.S. Application Data

(63) Continuation of application No. 19/020,289, filed on Jan. 14, 2025, now Pat. No. 12,423,268, which is a (Continued)

(51) Int. Cl.
*G06F 16/00* (2019.01)
*G06F 9/455* (2018.01)
(Continued)

(52) U.S. Cl.
CPC ............ *G06F 16/168* (2019.01); *G06F 9/455* (2013.01); *G06F 16/9024* (2019.01); (Continued)

(58) Field of Classification Search
None
See application file for complete search history.

(56) References Cited

U.S. PATENT DOCUMENTS 6,456,982 B1 9/2002 Pilipovic
6,606,615 B1 * 8/2003 Jennings ................ G06Q 10/06 706/45

(Continued)

FOREIGN PATENT DOCUMENTS

CN 101986654 A 3/2011
CN 102542004 A 7/2012

(Continued)

OTHER PUBLICATIONS

European Search Report dated Jun. 29, 2016, of corresponding European Application No. 16001131.8.

(Continued)

*Primary Examiner* — Jean M Corrielus
(74) *Attorney, Agent, or Firm* — DLA Piper LLP (US)

(57) ABSTRACT

Systems and methods for improved data conversion and distribution are provided. A data subscription unit is configured to receive data and information from a plurality of data source devices. The data subscription unit is in communication with a virtual machine that includes backtesting utility configured to generate backtesting data using one or more statistical models and one or more non-statistical models. The backtesting utility may translate the backtesting results into one or more interactive visuals, and generate a graphical user interface (GUI) for displaying the backtesting results and the one or more interactive visuals on a user device. The backtesting utility may update one or more of the displayed backtesting results and the one or more interactive visuals without re-running the modeling steps.

22 Claims, 30 Drawing Sheets

Related U.S. Application Data continuation of application No. 18/754,762, filed on Jun. 26, 2024, now Pat. No. 12,235,798, which is a continuation of application No. 18/494,964, filed on Oct. 26, 2023, now Pat. No. 12,050,555, which is a continuation of application No. 18/100,647, filed on Jan. 24, 2023, now Pat. No. 11,841,828, which is a continuation of application No. 17/683,717, filed on Mar. 1, 2022, now Pat. No. 11,593,305, which is a continuation of application No. 17/410,227, filed on Aug. 24, 2021, now Pat. No. 11,294,863, which is a continuation of application No. 17/162,013, filed on Jan. 29, 2021, now Pat. No. 11,119,983, which is a continuation of application No. 16/918,055, filed on Jul. 1, 2020, now Pat. No. 10,963,427, which is a continuation of application No. 16/866,859, filed on May 5, 2020, now Pat. No. 10,838,921, which is a continuation of application No. 16/592,203, filed on Oct. 3, 2019, now Pat. No. 10,740,292, which is a continuation-in-part of application No. 15/151,179, filed on May 10, 2016, now Pat. No. 10,474,692.

(60) Provisional application No. 62/163,223, filed on May 18, 2015.

(51) Int. Cl.

| | |
|---|---|
| ***G06F 16/16*** | (2019.01) |
| ***G06F 16/901*** | (2019.01) |
| ***G06F 16/9035*** | (2019.01) |
| ***G06N 20/00*** | (2019.01) |
| ***G06Q 40/06*** | (2012.01) |

(52) U.S. Cl.

CPC ......... *G06F 16/9035* (2019.01); *G06N 20/00* (2019.01); *G06Q 40/06* (2013.01)

(56) References Cited

U.S. PATENT DOCUMENTS 6,681,211 B1 1/2004 Gatto
7,152,070 B1 * 12/2006 Musick ................ G06F 16/254 707/999.102
7,167,838 B1 * 1/2007 Gatto .................... G06Q 40/04 705/36 R
7,177,831 B1 * 2/2007 O'Shaughnessy ..... G06Q 40/10 705/30
7,406,436 B1 * 7/2008 Reisman ........... G06Q 30/0282 705/7.33
7,509,277 B1 * 3/2009 Gatto .................... G06Q 40/06 705/37
7,539,637 B2 * 5/2009 Gatto .................... G06Q 40/04 705/37
7,571,130 B2 * 8/2009 Weber .................... G06Q 40/04 705/36 R
7,603,308 B2 * 10/2009 Gatto .................... G06Q 40/06 705/36 R
7,702,995 B2 * 4/2010 Sahota ............ H04N 21/25883 715/239
7,729,940 B2 6/2010 Harvey et al.
7,739,182 B2 * 6/2010 Myr ...................... G06Q 40/06 705/37
7,930,631 B2 4/2011 Sahota et al.
7,966,246 B2 * 6/2011 Ingargiola ............. G06Q 40/00 705/37
8,036,929 B1 10/2011 Reisman
8,346,646 B2 1/2013 Cutler et al.
8,346,647 B1 1/2013 Phelps et al.
8,386,357 B1 2/2013 Aiken
8,386,358 B1 2/2013 Aiken
8,463,726 B2 6/2013 Jerram et al.
8,479,481 B2 7/2013 O'Toole et al.
8,554,600 B2 10/2013 Reisman
8,768,815 B1 7/2014 Thayer et al.
9,105,000 B1 8/2015 White et al.
9,135,655 B2 9/2015 Buchalter et al.
9,448,636 B2 9/2016 Bulzacki
9,753,962 B2 9/2017 Petschulat et al.
9,792,650 B2 10/2017 Annunziata et al.
9,870,629 B2 1/2018 Cardno et al.
10,109,010 B2 10/2018 Ignatovich et al.
10,325,319 B2 * 6/2019 Bohman ................ G06Q 40/06
10,592,987 B2 3/2020 Dennelly et al.
10,657,184 B2 5/2020 Kent, IV et al.
10,740,292 B2 * 8/2020 Haddad ................ G06F 16/168
10,817,947 B2 10/2020 Weber et al.
10,838,921 B2 * 11/2020 Haddad ................ G06F 16/168
10,866,952 B2 12/2020 Nixon et al.
10,891,551 B2 1/2021 Vick et al.
10,963,427 B2 * 3/2021 Haddad ................ G06F 16/168
11,138,666 B2 10/2021 Weber et al.
2002/0002520 A1 1/2002 Gatto
2002/0052820 A1 5/2002 Gatto
2002/0184131 A1 12/2002 Gatto
2003/0009411 A1 * 1/2003 Ram ...................... G06Q 40/06 705/37
2003/0233302 A1 * 12/2003 Weber .................... G06Q 40/04 705/36 R
2005/0015323 A1 * 1/2005 Myr ...................... G06Q 40/06 705/37
2005/0038729 A1 * 2/2005 Hsu ...................... G06Q 40/04 705/37
2005/0090911 A1 * 4/2005 Ingargiola ............. G06Q 40/06 700/47
2005/0091146 A1 4/2005 Levinson
2006/0005199 A1 1/2006 Galal et al.
2006/0287945 A1 12/2006 Spaccatrosi
2007/0156479 A1 7/2007 Long
2007/0171232 A1 7/2007 Malloy et al.
2007/0244788 A1 10/2007 Ferris
2008/0109383 A1 5/2008 Jaffe
2009/0043713 A1 * 2/2009 Weber .................... G06Q 40/06 705/36 R
2009/0043730 A1 2/2009 Lavdas et al.
2009/0119195 A1 5/2009 Kurczek et al.
2009/0119226 A1 5/2009 Kurczek et al.
2009/0192949 A1 7/2009 Ferguson et al.
2009/0288084 A1 11/2009 Astete et al.
2009/0313178 A1 12/2009 Weber et al.
2010/0057618 A1 3/2010 Spicer et al.
2010/0070431 A1 3/2010 Kaylie
2010/0082240 A1 * 4/2010 Short .................. G01C 21/387 701/532
2010/0145791 A1 6/2010 Canning et al.
2010/0262497 A1 10/2010 Karlsson
2010/0262901 A1 10/2010 Disalvo
2011/0246267 A1 10/2011 Williams et al.
2011/0261049 A1 10/2011 Cardno et al.
2011/0282824 A1 11/2011 Lanng
2012/0054189 A1 3/2012 Moonka et al.
2012/0066062 A1 3/2012 Yoder et al.
2012/0271748 A1 10/2012 Disalvo
2012/0317053 A1 12/2012 Gartland et al.
2013/0138577 A1 5/2013 Sisk
2013/0159832 A1 6/2013 Ingargiola et al.
2013/0346274 A1 12/2013 Ferdinand et al.
2014/0059579 A1 2/2014 Vinson et al.
2014/0095409 A1 * 4/2014 Bohman ................ G06Q 40/06 705/36 R
2014/0172625 A1 6/2014 Reisman
2014/0229407 A1 8/2014 White
2014/0278755 A1 9/2014 Eberl et al.
2014/0279695 A1 9/2014 Hsu et al.
2014/0279702 A1 9/2014 Douillet
2014/0297569 A1 10/2014 Clark et al.
2014/0317021 A1 10/2014 Weber et al.
2014/0317130 A1 10/2014 Thope et al.
2014/0344186 A1 11/2014 Nadler
2014/0365272 A1 12/2014 Hurewitz
2014/0365273 A1 12/2014 Hurewitz

(56) References Cited

U.S. PATENT DOCUMENTS

2014/0365333 A1 12/2014 Hurewitz
2014/0365336 A1 12/2014 Hurewitz
2014/0365399 A1 12/2014 Dennelly et al.
2015/0088783 A1 3/2015 Mun
2015/0178284 A1 6/2015 Garg et al.
2015/0317589 A1 11/2015 Anderson et al.
2015/0356576 A1 12/2015 Malaviya et al.
2016/0055587 A1 2/2016 Chau
2016/0125011 A1 5/2016 Petschulat et al.
2016/0127244 A1 5/2016 González Brenes et al.
2016/0241634 A1 8/2016 Fradkov et al.
2016/0253572 A1 9/2016 Im et al.
2016/0253672 A1 9/2016 Hunter et al.
2016/0342668 A1 11/2016 Haddad
2017/0017712 A1 1/2017 Gartland et al.
2017/0103103 A1 4/2017 Nixon et al.
2017/0221144 A1 8/2017 Ram
2018/0096417 A1 4/2018 Cook et al.
2018/0204285 A1 7/2018 Nadler
2018/0218014 A1 8/2018 Lourdeaux
2018/0307769 A1 10/2018 Sadauskas et al.
2018/0357719 A1 12/2018 Weber et al.
2019/0378213 A1* 12/2019 Ignatovich ......... G06Q 10/0639
2020/0034336 A1* 1/2020 Haddad ................. G06F 16/168
2020/0051159 A1* 2/2020 Ram ................... G06F 3/04842
2020/0057952 A1 2/2020 Vick et al.
2020/0073631 A1 3/2020 Vick et al.
2020/0265012 A1* 8/2020 Haddad ................. G06F 16/168
2020/0294150 A1* 9/2020 Smith .................... G06Q 40/06
2020/0334203 A1* 10/2020 Haddad ................. G06F 16/168
2020/0364789 A1 11/2020 Ram et al.
2020/0364796 A1 11/2020 Nadler
2021/0208846 A1 7/2021 Vick et al.
2022/0005115 A1* 1/2022 San Martin ............. G06F 9/451

FOREIGN PATENT DOCUMENTS

CN 116679920 A 9/2023
JP 2005107103 A 4/2005
WO 2002029560 A1 4/2002

OTHER PUBLICATIONS

"Markit Pricing Data Delivers an Independent Set of Liquidity Measures, Including an Easily Understood and Transparent Liquidity Score," (4 pages), May 2015, http://www.markit.com/product/pricing-data-cds-liquidity.
Extended European Search Report dated Aug. 20, 2020, of counterpart European Application No. 20173745.9.
Kostiainen, Kari, "Development of Trading Algorithm Backtest Environment," Helsinki Metropolia University of Applied Sciences, Master's Degree, Information Technology, Master's Thesis, Apr. 14, 2016, 67 pages.
European Official Action dated Dec. 11, 2023, of counterpart European Application No. 20 173 745.9.
European Office Action dated Jul. 1, 2025, of corresponding European Application No. 20 173 745.9.

* cited by examiner

| OTS CALCULATION INPUTS | OTS TEST RESULTS | | | | | | | |
|---|---|---|---|---|---|---|---|---|
| TRADE SIZE CATEGORY FOR BENCHMARK GROUP (BG) | 1MM+ | | | | | | | |
| TIME HORIZON | 9-1-18 TO 8-31-19 | | | | | | | |
| LOOKBACK PERIOD FOR PAIRED TRADES FROM (t-1) TO (t) | 5 MINUTES TO 1 HOUR | | | | | | | |
| SIDE OF MARKET FOR TRADE(t) | INTERDEALER TRADE | | | | | | | |
| SIDE OF MARKET FOR TRADE(t-1) | DEALER BUY | | | | DEALER SELL | | | |
| TRADE SIZE CATEGORY FOR COMPARISON GROUP (CG) | 0-50K | 50K-250K | 250K-500K | 500K-1MM | 0-50K | 50K-250K | 250K-500K | 500K-1MM |
| NUMBER OF UNIQUE SECURITIES WITH OBSERVATIONS (N) | 546 | 468 | 101 | 74 | 813 | 781 | 224 | 154 |
| MEDIAN OF CG PRICE DIFFERENCES (PDs) | 0.133 | 0.114 | 0.089 | 0.071 | 0.147 | 0.124 | 0.081 | 0.060 |
| MEDIAN OF BG PDs | 0.074 | 0.084 | 0.069 | 0.068 | 0.065 | 0.066 | 0.057 | 0.049 |
| MEAN OF CG PDs | 0.165 | 0.138 | 0.112 | 0.099 | 0.193 | 0.157 | 0.101 | 0.085 |
| MEAN OF BG PDs | 0.097 | 0.108 | 0.094 | 0.092 | 0.080 | 0.083 | 0.073 | 0.074 |
| VARIANCE OF CG PDs | 0.009 | 0.007 | 0.005 | 0.005 | 0.018 | 0.010 | 0.005 | 0.004 |
| VARIANCE OF BG PDs | 0.005 | 0.006 | 0.005 | 0.006 | 0.004 | 0.004 | 0.003 | 0.004 |
| MEAN DIFFERENCE (MD) = MEANCG - MEANBG | 0.068 | 0.031 | 0.019 | 0.007 | 0.113 | 0.074 | 0.028 | 0.011 |
| MEAN SQUARED ERROR (MSE) = (VARIANCECG + VARIANCEBG) / 2 | 0.007 | 0.007 | 0.005 | 0.005 | 0.011 | 0.007 | 0.004 | 0.004 |
| STANDARD ERROR (S.E.) = SQRT ((2*MSE)/N) | 0.005 | 0.005 | 0.010 | 0.012 | 0.005 | 0.004 | 0.006 | 0.007 |
| *T-STATISTIC = MD / S.E. | 13.388 | 5.746 | 1.889 | 0.540 | 22.127 | 17.404 | 4.711 | 1.522 |

DAILY MARKET INSIGHT - JANUARY 4, 2019

CORPORATE BONDS

MIDDAY MARKET OBSERVATIONS

MARKET OVERVIEW | SECURED PRODUCTS | MUNICIPAL BONDS

SPREADS ARE MIXED IN CORPORATES TODAY MARKET PARTICIPANTS TURN THEIR ATTENTION TO A RESURGENT EQUITY MARKET. IN PHARMACEUTICALS, TEVA BONDS RALLIED AFTER THE COMPANY ANNOUNCED SETTLEMENT OF ITS LONG-RUNNING PATENT DISPUTE WITH AMGEN OVER THE GENERIC VERSION OF AMGEN'S SENSIPAR, USED FOR TREATING SECODARY HYPERPARATHYROIDISM IN KIDNEY DIALYSIS PATIENTS TEVA'S BONDS ARE 30 TO 60 BASIS POINTS TIGHTER WHILE AMGEN'S ISSUES ARE MIXED ON SPREAD.

IN HIGH YIELD, FOCUS REMAINS ON OIL NAMES AS CRUDE'S 2%+ IMPROVEMENT TODAY IS GIVING A BID TO THE MARKET. BIGGER PLAYERS LIKE AMEPER, CHK AND CRC ALL HAVE BONDS UP 2 TO 5 POINTS SO FAR TODAY.

| SECTOR | SPREAD CHG (bps) | EST. VOLUME* |
|---|---|---|
| MINING | -2.41 | $ 58,677,480 |
| PHARMACEUTICAL | -1.19 | $ 688,099,370 |
| TECHNOLOGY | -0.89 | $ 691,709,830 |
| OIL & GAS | -.50 | $ 686,234,160 |
| FOREIGN | -.26 | $ 109,048,540 |
| RETAIL - SUPERMARKETS | -.21 | $ 348,966,000 |
| INSURANCE | -.21 | $ 343,678,080 |
| REGIONALS | -0.08 | $ 87,897,220 |
| CANADIANS | -0.03 | $ 64,550,300 |
| HEALTHCARE | 0.11 | $ 272,029,050 |
| BANKS | 0.45 | $1,057,757,910 |

AGGREGATE MEASURES

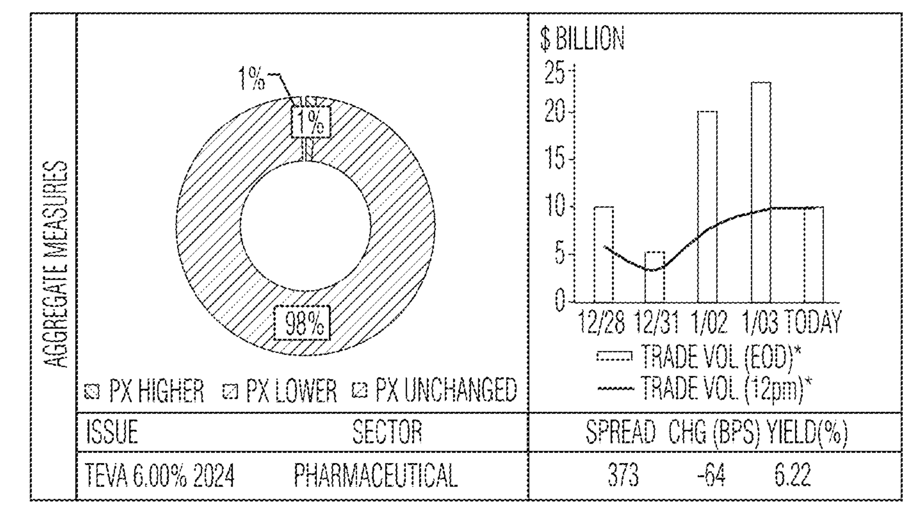

| ISSUE | SECTOR | SPREAD | CHG (BPS) | YIELD(%) |
|---|---|---|---|---|
| TEVA 6.00% 2024 | PHARMACEUTICAL | 373 | -64 | 6.22 |

FIG. 20

DATA CONVERSION AND DISTRIBUTION SYSTEMS FOR DYNAMICALLY UPDATING MODEL RESULTS

TECHNICAL FIELD

The present disclosure relates generally towards improving electronic data conversion and distribution, and, in particular to systems and methods for electronic data conversion and distribution of electronic data sensitivities and projections where electronic data is sparse, whether from high volume data sources and/or differently formatted electronic data sources.

BACKGROUND

Problems exist in the field of electronic data conversion and distribution. Users of data classes with sparse electronic data often seek additional data and information in order to analyze or otherwise utilize theses data classes. One utilization of electronic data is in the creation of data projections (or other statistical analyses/applications) for those data classes having sparse electronic data (e.g., limited historical data). Since the electronic data is sparse, it may be a challenge to obtain the additional electronic data and information needed, at desired time(s) and/or in desired data types and volumes, to generate accurate data projections. Indeed, accurate projections (and other forms of statistical analysis) typically require a large amount of historic electronic data and/or information for analysis. In the absence of such data and information, conventional projections (based on the sparse data and information) are often very inaccurate and unreliable. Accordingly, there is a need for improved data conversion and distribution systems which are able to generate accurate projections and yield other data analysis results that are accurate and timely, even if the data being projected is sparse.

SUMMARY

The present disclosure is related to data conversion and distribution systems which are able to process and utilize any amount of data, received at different volumes, frequencies, and/or formats, from any number of different data sources in order to generate data that is usable for creating accurate data sensitivities, projections and/or yielding other statistical analyses associated with a data class having sparse data, all in a timely manner.

Aspects of the present disclosure include systems, methods and non-transitory computer-readable storage media specially configured for data conversion and distribution. The systems, methods, and non-transitory computer readable media may further include a data subscription unit and a virtual machine. The data subscription unit may have at least one data interface communicatively coupled to a plurality of data source devices and may be configured to obtain data from the plurality of data source devices. The data subscription unit may also be configured to transmit the data via secure communication over a network. The virtual machine of the present disclosure may include one or more servers, a non-transitory memory, and/or one or more processors including machine readable instructions. The virtual machine may be communicatively coupled to the data subscription unit. The virtual machine may include a data receiver module, a data unification module, and a data conversion module.

The data receiver module may be configured to receive the data from the data subscription unit. The data unification module may be configured to reformat and aggregate the data from the data subscription unit to generate unified data. The data conversion module may comprise a backtesting utility that is configured to run the unified data through one or more of filters and conditions to generate backtesting data. The backtesting utility may be further configured to run the backtesting data through one or more statistical algorithms to generate one or more metrics of the unified data and run the backtesting data through one or more non-statistical algorithms to determine one or more relationships amongst the backtesting data. The backtesting utility may generate backtesting results based on the one or more metrics and the one or more relationships, translate the backtesting results into one or more interactive visuals, and generate a graphical user interface (GUI) for displaying the backtesting results and the one or more interactive visuals on a user device. The backtesting utility may be configured to update one or more of the displayed backtesting results and the one or more interactive visuals in response to one or more of user input via the GUI or updates to the unified data, the update being processed without re-running the one or more statistical algorithms and the one or more non-statistical algorithms.

BRIEF DESCRIPTION OF THE DRAWINGS

FIG. 9B is an exemplary illustration of a relationship between dealer buys and interdealer trades that have occurred within a close proximity of each other.

FIG. 20 is a schematic representation of a graphical user interface illustrating a pop up window 2 that may be generated with clicking on the hyperlink.

DETAILED DESCRIPTION

Figure 1A:
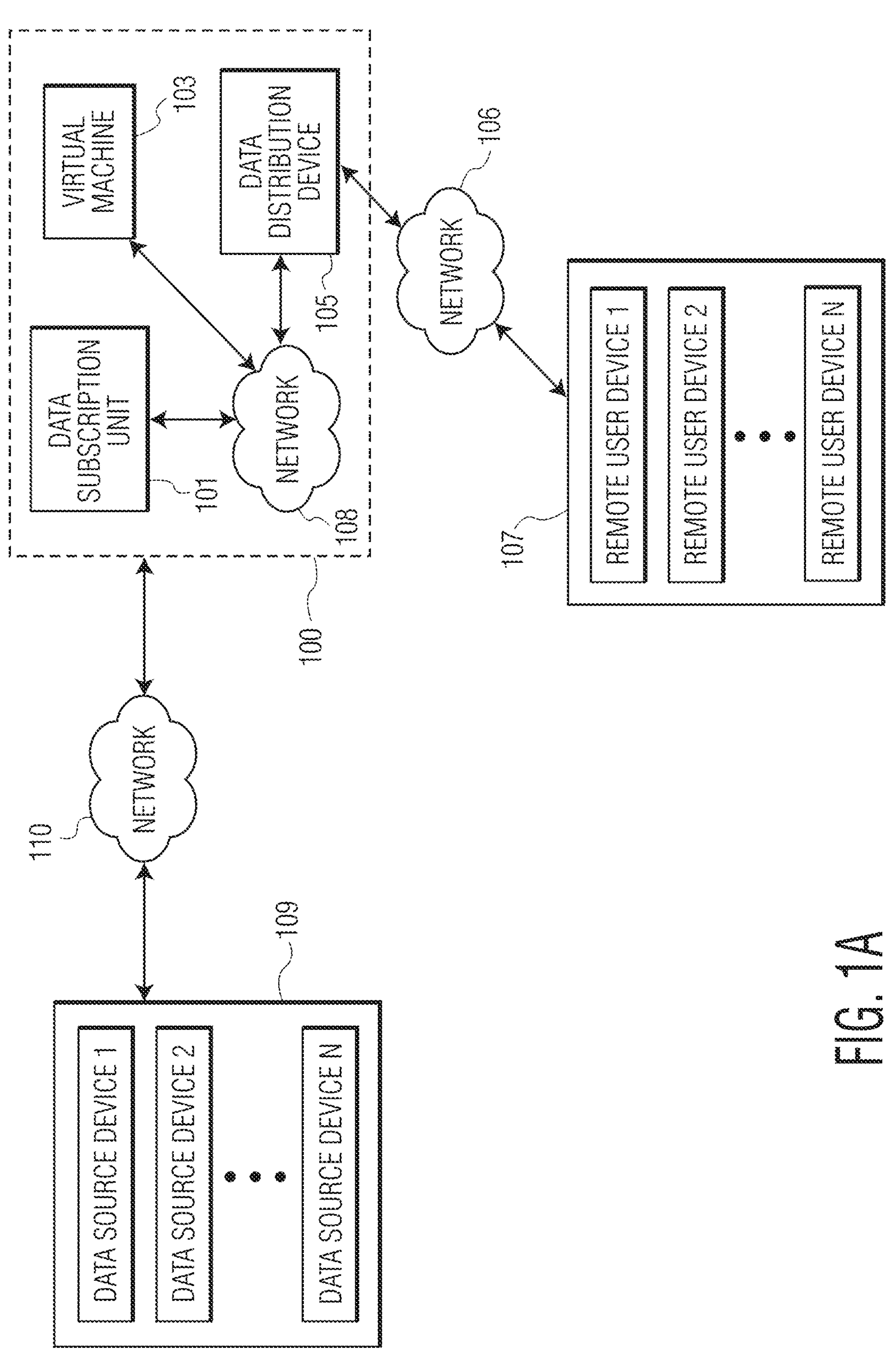
FIG. 1A is a functional block diagram of an embodiment of a data conversion and distribution system in accordance with the present disclosure.

Institutions may require a means to measure, interpret, and assess the quality of evaluated pricing data. For example, due diligence of pricing services methodologies (e.g., inputs, methods, models, and assumptions) may need to be performed. The quality of evaluated pricing data may need to be assessed in order to determine fair value of various instruments.

Ongoing valuation oversight as well as regular reporting may also be required by an institution or a regulatory agency. The relative effectiveness of the pricing evaluation across different sources may need to be examined. These requirements may be difficult to meet for a number of reasons. For example, there may be a lack of uniformity in testing methods across a given industry; there may be a high cost burden and technical complexity required to determine quality of evaluated pricing; testing means may be cost-prohibitive to create in-house as it may require analysis of a large amount of data; incomplete data inputs (i.e., sparse data) may yield misleading results; and others.

Backtesting simulations, using a variety of parameters (e.g., market data ranking rules, trade size filters, issue-vs-issuer analysis, contributor source quality, time rules for applying new market data, etc.), may aid in assessment of evaluated pricing data and may help identify potential improvement areas in the evaluated pricing process. Embodiments described herein may include backtesting systems and methodologies uniquely designed to facilitate industry comprehension of pricing quality analysis functions by introducing a contextual framework of interpretative analyses that simplifies complex diagnostic testing functions not commercially offered in the marketplace.

The backtesting systems and methodologies may enable a user to: qualify the value-add of dealer (data) sources by running "horse-race" type comparisons across contributors, which may improve default source logic and quantitatively weight contributions of data sources; test the viability of proposed ideas to enhance evaluated pricing methodologies/workflows/quality before finalizing requirements and initiating system development efforts; asses relative quality of evaluation data by asset class, sectors, issuers, maturity ranges, credit quality, liquidity dynamics, and more; test before-and-after scenarios to reduce risk; pre-screen the potential value-add of alternative data sources prior to licensing the data; provide an efficient workflow tool to support price challenge responses, vendor comparisons, and deep dive results (e.g., users may submit alternative price (data) sources at security-level, portfolio-level, or cross-sectional across all submissions to bolder intelligence gathering); systematically oversee performance across asset classes down to the evaluator-level; and strengthen the ability to accommodate regulatory inquiries and streamline compliance reporting requirements.

Aspects of the present disclosure relate to systems, methods and non-transitory computer-readable storage media for data conversion and distribution.

An example data conversion and distribution system of the present disclosure may include a data subscription unit and a virtual machine. The data subscription unit may have at least one data interface communicatively coupled to a plurality of data source devices and may be configured to obtain data having a plurality of data formats from the plurality of different data source devices. The data subscription unit may also be configured to transmit the data having the plurality of data formats via secure communication over a network. The virtual machine of the system may include one or more servers, a non-transitory memory, and one or more processors including machine readable instructions. The virtual machine may be communicatively coupled to the data subscription unit. The virtual machine may also include a data receiver module, a data unification module, a data conversion module, and/or a data transmission module. The data receiver module of the virtual machine may be configured to receive the data having the plurality of data formats from the data subscription unit via the secure communication over the network. The data unification module of the virtual machine may be configured to reformat and aggregate the data (having the plurality of data formats) from the data subscription unit, to generate unified data responsive to receiving, at the receiver module, the unified data having a standardized data format. The data conversion module may be configured to run the unified data through one or more statistical algorithms in order to generate at least one of data sensitivities and projected data for a data class that is not necessarily directly related to the data received from the plurality of data sources. In other words, the unified data, which originates from a plurality of data sources other than that of the data class and which may be indirectly or tangentially related to the data class, may be used to generate data sensitivities, data projections and/or other statistical information representative of the data class. The data transmission module may be configured to transmit the at least one of the data sensitivities and the projected data to a data distribution device via one or more secure communications over a network.

In one embodiment, the data distribution device further includes a non-transitory memory and at least one data distribution interface. The non-transitory memory may be configured to store the at least one of the data sensitivities and the projected data. One or more of the data distribution interfaces may be configured to provide secure communications with at least one of one or more remote user devices.

In one embodiment, a remote user device may include a non-transitory memory, one or more processors including machine readable instructions, a data distribution receiver interface communicatively coupled to the data distribution device, a user information interface, a market data source interface, and/or a user display interface. One or more of the remote user devices may be further configured to receive the data sensitivities and/or the projected data from the data distribution device via the data distribution receiver interface, receive user input data via the user information interface, receive current market data via the market data source interface, generate supplementary projected data via one or more processors and/or display at least a portion of the projected data and the supplementary projected data on a user display interface. The supplementary projected data may be based on the received data sensitivities, projected data, user input data, and/or current market data.

An exemplary embodiment of a data conversion and distribution system 100 is illustrated in FIG. 1A. As depicted, the data conversion and distribution system 100 may include a data subscription unit 101, a virtual machine 103, and a data distribution device 105. The data subscription unit 101, the virtual machine 103 and the data distribution device 105 may be communicatively coupled via a network 108. Alternatively or additionally, the data subscription unit 101 may be directly coupled to the virtual machine 103, and/or the virtual machine 103 may be directly coupled to the data distribution device 105, without the use of a network. The data conversion and distribution system 100 may further include one or more remote user devices 107. In one example, each of the remote user devices 107 may be used by participants including for example, data managers, data analysts, regulatory compliance teams, and the like. Although system 100 is described in some examples below with respect to data classes associated with electronic instrument data, system 100 may be used with any electronic data classes associated with any type of electronic data, including those having sparse data. The data subscription unit 101 may have at least one data interface (e.g., data interface 201 shown in FIG. 2) communicatively coupled to one or more data source devices 109. Although the description and drawings herein describe the data conversion and distribution system 100 and its surrounding environment as having one or more data source devices 109 (Data Source Device 1-Data Source Device N) and one or more remote user devices 107 (Remote User Device 1-Remote User Device N), in some examples, there may be any combination of data source devices 109 and/or remote user devices 107, including for example, a single data source device 109 and a single remote user device 107, or a single data source device 109 and no remote user devices 107. One or more of the data source devices 109, data subscription unit 101, virtual machine 103, data distribution device 105, and remote user devices 107 may include one or more computing devices including a non-transitory memory component storing computer-readable instructions executable by a processing device to perform the functions described herein.

The data source devices 109 may be communicatively coupled to the data subscription unit 101 via a network 110. The data distribution device 105 may be communicatively coupled to the remote user devices 107 via a network 106. In some embodiments, the networks 110 and 106 may include two or more separate networks to provide additional security to the remote user devices 107 by preventing direct communication between the remote user devices 107 and the data source devices 109. Alternatively, the networks 110, 106 may be linked and/or a single large network. The networks 110, 106 (as well as network 108) may include, for example, a private network (e.g., a local area network (LAN), a wide area network (WAN), intranet, etc.) and/or a public network (e.g., the internet). Networks 110 and/or 106 may be separate from or connected to network 108.

Figure 1B:
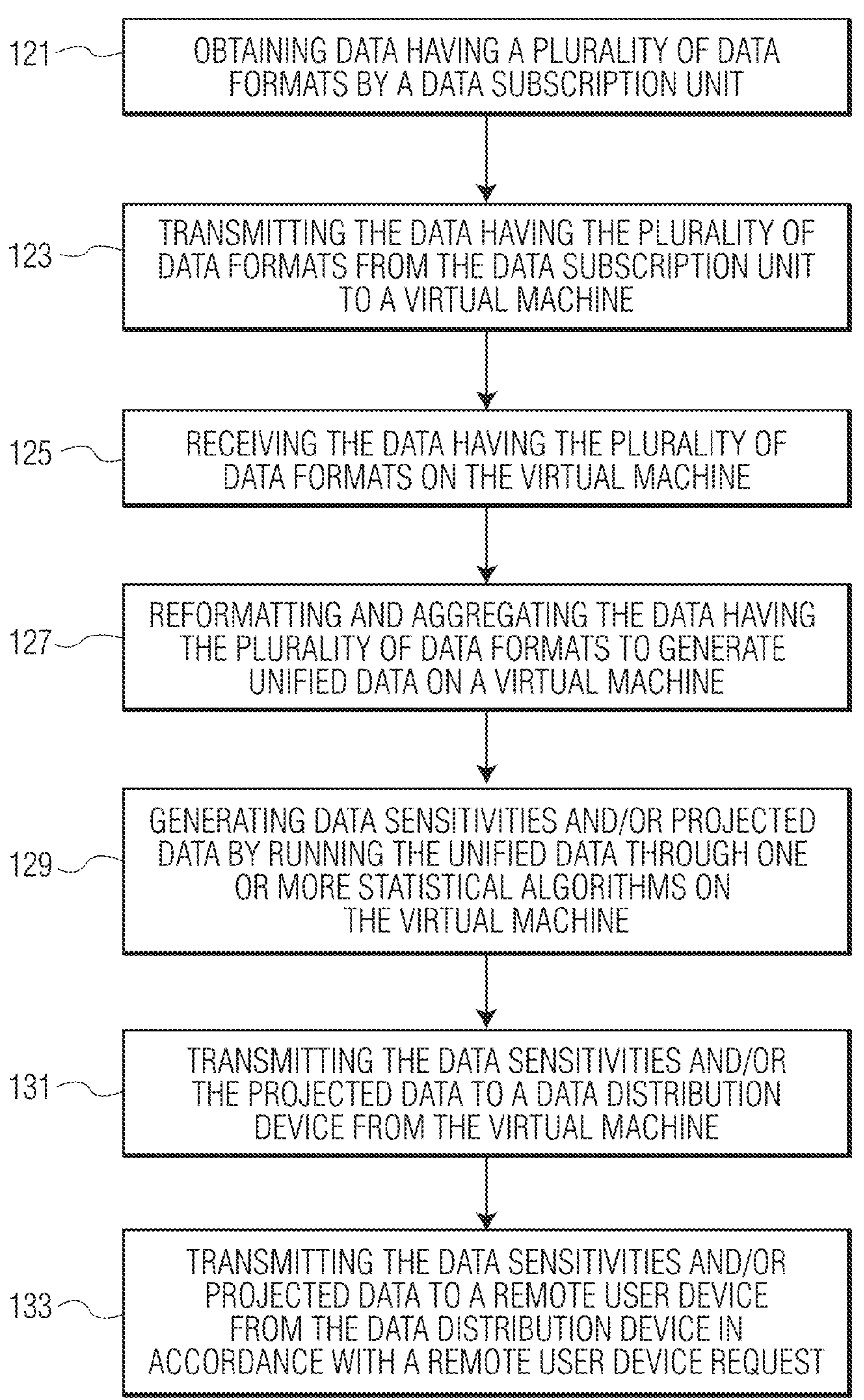
FIG. 1B is a flowchart of an example method for data conversion and distribution in accordance with the present disclosure.

FIG. 1B is a flowchart of an example method corresponding to the data conversion and distribution system 100 of FIG. 1A (also described with respect to FIGS. 2, 3, 5 and 6). As illustrated in FIG. 1A, a method for data conversion and distribution may include, at step 121, obtaining data having a plurality of data formats from the data source devices 109. The data source devices 109 may include data and information directly, indirectly and/or tangentially related to the data class. The data source devices 109 may be selected based on their perceived relevance to the data class and/or usefulness in statistical calculations (e.g., generating data projections) for the data class having limited or sparse data. In one embodiment, the data source devices 109 may be selected by way of subscription preferences designated by a remote user device 107 and/or by an operator of the data conversion and distribution system 100 itself. Additionally, the data obtained from the data source devices 109 may be 'cleansed' (which may involve analyzing, filtering and/or other operations discussed in further detail below) to ensure that only pertinent data and information is used in the statistical calculations, thereby improving the accuracy of any resulting calculations while at the same time reducing the amount of data and information that must be modeled (i.e., run through statistical algorithms that execute the statistical calculations). The data may be obtained, for example, via data interface 201 of the data subscription unit 101. Step 121 is described further below with respect to FIG. 2.

In step 123, the data having the plurality of data formats may be transmitted, for example, by data transmitter 207 of the data subscription unit 101, to the virtual machine 103 via network 108. Step 123 is discussed further below with respect to FIG. 2.

At step 125, a data receiver module 307 of the virtual machine 103 may receive the data having the plurality of data formats from the data subscription unit 101. At step 127, the data received from the data subscription unit 101 may be reformatted and aggregated (discussed below), for example, by data unification module 309 of virtual machine 103, to form unified data. Optionally, the data unification module 309 of the virtual machine 103 may also unpack and/or cleanse (discussed below) the data prior to forming unified data. Steps 125 and 127 are discussed further below with respect to FIG. 3.

At step 129, the data conversion module 311 of the virtual machine 103 may run the unified data through any number of algorithms (e.g., statistical algorithms) to generate data sensitivities, data projections, and/or any other desired statistical analyses information. Step 129 is discussed further below with respect to FIG. 3. An example algorithm of step 129 is also described further below with respect to FIG. 4.

At step 131, the generated data sensitivities, projected data and/or other statistical analyses information may be transmitted, for example, via the data transmission module 315 of the virtual machine 103, to a data distribution device 105. The transmission may be performed using one or more secure communications over the network 108. Step 131 is described further below with respect to FIG. 5.

At step 133, the data distribution device 105 may transmit at least a portion of the generated data sensitivities, projected data and/or other statistical analyses information to one or more remote user devices 107, for example, in response to a request received from among the remote user devices 107. Step 133 is described further below with respect to FIGS. 5 and 6.

The data source devices 109 of FIG. 1A may include additional electronic data and/or other information useful for supplementing and/or making statistical determinations for sparse electronic data sets. In general, the electronic data, and/or information may include suitable real-time data and/or archived data which may be related to a data class having sparse data and which may be useful for determining data sensitivities, data projections and/or statistical analyses information for the data class. In one example, the data source devices 109 of FIG. 1A may include internal and external data sources which may provide real-time and archived data. Internal data sources may include data sources that are a part of the particular entity seeking to supplement and/or generate statistical information for a data class that pertains to that particular entity; whereas external data sources may sources of data and information other than the entity that is seeking to supplement and/or generate the statistical information. For example, in one type of organization, the data source devices 109 may include internal data related to sales, purchases, orders, and transactions. The data sources may also include data aggregators. Data aggregators may store information and data related to multiple data classes. The data aggregators may themselves obtain the data and information from a plurality of other internal and/or external data sources. In some examples, the data sources may include information regarding current activity data, reference data and security information (all of which may vary by industry). In some examples, data sources of data source devices 109 may include news and media outlets, exchanges, regulators, and the like. Data source devices 109 may contain information related to domestic and foreign products and/or services. In one embodiment, the data source devices 109 may contain information regarding quotes counts, trade counts, and trade volume.

Each of the data source devices 109 may produce one or more electronic data files. The electronic data files may include additional data and information pertinent to sparse electronic data. The additional data and information may be useful for generating data sensitivities, projections for sparse electronic data and/or statistical analyses information. In one example, the electronic data files may include data related to current activity, reference data, and security information. In another example, the electronic data files may include data related to pricing, market depth, dealer quotes, transactions, aggregate statistics, a quantity of products/instruments, a total paramount, advances, declines, highs and lows, and/or the like. Notably, any type of data may be included in the data files, depending on the particular industry and/or implementation of the data conversion and distribution system of the present disclosure. In one embodiment, the electronic data files may be produced by the data source devices 109 at a predetermined event or time (e.g., an end of a business day). Alternatively, the electronic data files may be produced on an hourly, weekly, or at any other appropriate time interval.

One or more data file formats may be associated with each of the data source devices 109. Each of the produced electronic data files may be associated with a unique data file identifier. Alternatively, each group of data files produced by a single data source device 109 (e.g., data source device 109-1) may be associated with a unique data source identifier associated with that data source device (e.g., data source device 109-1). One or more of the data source devices 109 may be uniquely configured to produce the one or more electronic data files in accordance with data subscription unit 101 of the data conversion and distribution system 100.

Figure 2:
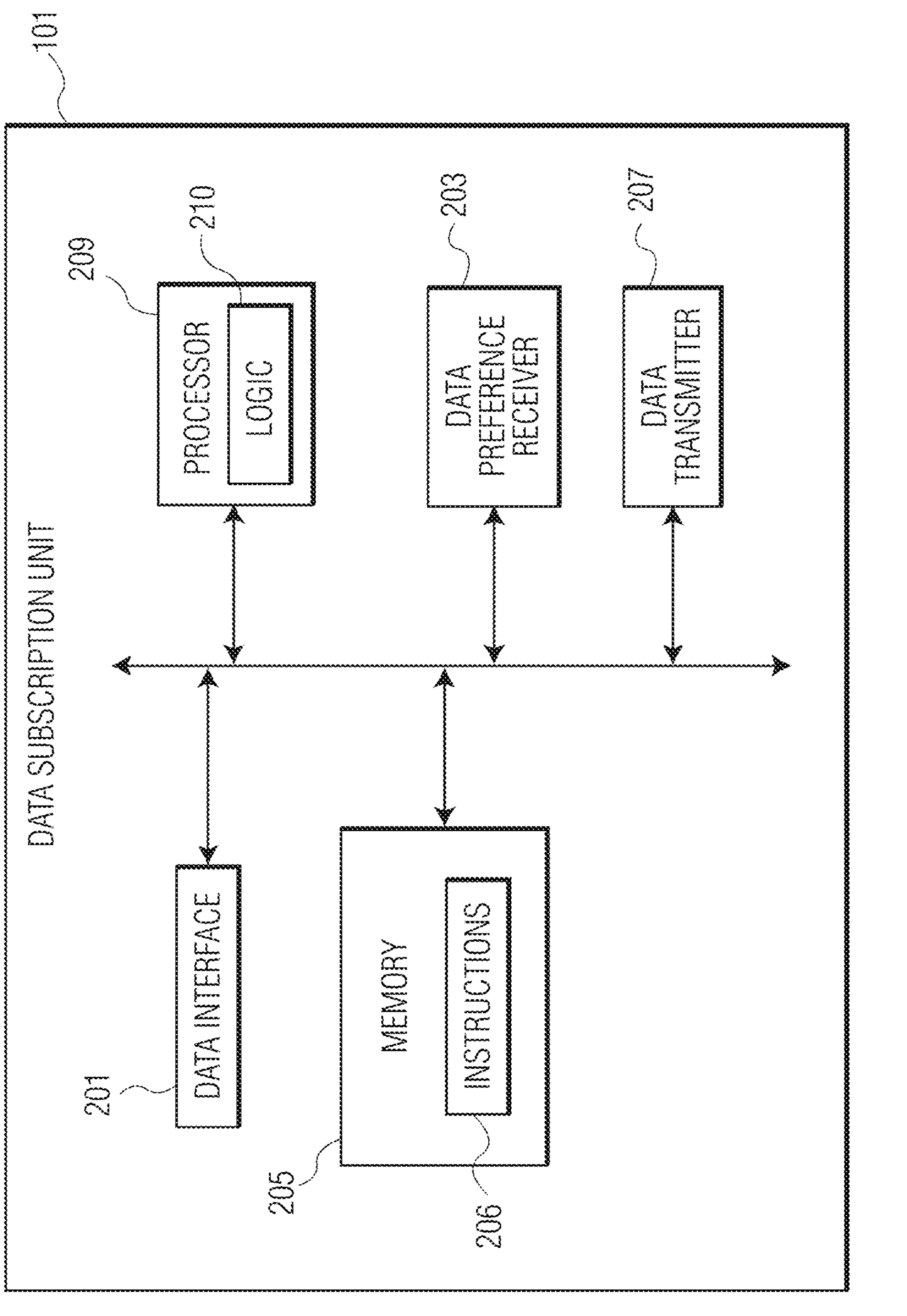
FIG. 2 is a functional block diagram of a data subscription unit in accordance with an embodiment of a data conversion and distribution system of the present disclosure.

An example data subscription unit 101 of the data conversion and distribution system 100 of FIG. 1A is depicted in FIG. 2. The data subscription unit 101 may include at least one data interface 201 communicatively coupled via network 110 to plurality of data source devices 109. The data subscription unit 101 may be configured to obtain data having a plurality of data formats via the electronic data files produced by the one or more data source devices 109. The data subscription unit 101 may include one or more processors 209 (also referred to herein as processing component 209), logic 210 and a non-transitory memory 205 including instructions 206 and space to store subscription preferences. The subscription preferences may define the parameters of the communicative coupling between the data subscription unit 101 and the plurality of data source devices 109. In other words, the subscription preferences may define which data source devices 109 to connect to and communicate with, the type, volume and/or frequency with which data is pulled or received from said data source devices 109, and/or any other parameters related to the flow of data and information. The data subscription unit 101 may also include a data transmitter 207 configured to transmit the obtained data (having the plurality of data formats) via secure communication over network 108. Transmissions from the data transmitter 207 may be received by the virtual machine 103 of the data conversion and distribution system 100.

The data subscription unit 101 may, for example, via processor 209, receive subscription preferences, store the received subscription preferences in the non-transitory memory 205, and communicatively couple via the at least one data interface 201 of the data subscription unit 101 to one or more of the data source devices 109. In one embodiment, communicatively coupling via the at least one data interface 201 of the data subscription unit 101 to the data source devices 109 further includes sending a request (from the data subscription unit 101) to the data source devices 109 to receive data files related to a particular input or data, over a particular communication link, at a specified frequency. The data subscription unit 101 may then connect to the data source devices 109 by establishing a communication link between the data interface(s) 201 of the data subscription unit 101 and the data source device(s) 109 in network 110. The network 110 may be unsecured or secured and wired and/or wireless.

The data subscription unit 101 is said to be subscribed to a data source device 109 if a request transmitted to at least one data source device (e.g., data source device 109-1) among data source devices 109 is accepted and data and information is transmitted in accordance with the request from the data source device(s) 109 to the data subscription unit 101 via the network 110. In one embodiment, a request may specify the type and/or volume of data and information requested, the frequency at which it should be transmitted, as well as the communication protocol that should be used to transmit the data and information. For example, a request may request that one or more data source devices 109 transmits electronic data files regarding all sales activity relating to instrument or product X at the end of every business day in accordance with a file transfer protocol (FTP) or secure file transfer protocol (SFTP). Alternative secure communication links may also be utilized.

In accordance with the received request, the respective data source device(s) 109 may generate one or more electronic data files containing only the requested information and transmit the requested data files at the specified frequency. The generated electronic data file(s) may then be transmitted to the data subscription unit 101 via data interface 201. In this manner, an embodiment of the data conversion and distribution system 100 may dictate receiving only the type and volume of data and information that is pertinent to supplementing and/or generating statistical information (e.g., data projections and sensitivities) related to one or more electronic data classes for which directly-related or historical information is sparse or unavailable. In this manner, the processing and memory requirements of the data conversion and distribution system 100 are maximized (i.e., by avoiding receiving irrelevant or voluminous data beyond what is needed or desired), particularly in embodiments where it is envisioned that millions of data requests and/or data files are received per day.

The electronic data files received by the at least one data interface 201 of the data subscription unit 101 may be in a variety of formats. For example, the data file formats may correspond to the specifications of each of the data source devices 109 from which the data files are received. Additionally, the data file formats may have different data transfer parameters, compression schemes, and the like. Furthermore, in some examples, the data file content may correspond to different forms of data, such as different currencies, date formats, time periods, and the like. In one embodiment, the data interface(s) 201 may receive a separate electronic data file for each request for information. In another embodiment, the data interface 201 may receive a single data file, corresponding to one or more requests for information, from each of the plurality of data source devices 109 to which it subscribes.

Thus, the frequency and volume of data which is provided to the data subscription unit 101 and the setup for a communication link may be arranged in accordance with the subscription preferences stored on the data subscription unit 101. The subscription preferences may be provided by a user device connected to the data conversion and distribution system 100 (either via a direct and/or remote connection to data subscription unit 101, or by way of any other input means of the data conversion and distribution system 100) and/or by an operator of the data conversion and distribution system 100 itself. The preferences may be stored on the non-transitory memory 205 of the data subscription unit 101. Optionally, the data received via the data interface 201 may also be stored in the non-transitory memory 205 of the data subscription unit 101. In one embodiment, newly received data from the one or more data source devices 109 may be used to update, add to, or remove data already stored in the non-transitory memory 205 of the data subscription unit 101.

In one embodiment, the subscription preferences may be received by a data subscription preference receiver 203 specially configured to receive subscription preferences, and store and/or update subscription preferences in at least a portion of the non-transitory memory component 205 of the data subscription unit 101.

In one embodiment, after the data source devices 109 are subscribed to by the data subscription unit 101, the data may be automatically transmitted from the data source devices 109 to the data subscription unit 101 as the electronic data files are generated on the data source devices 109. In one embodiment, a predetermined event or time (e.g., the close of a business day or a predetermined time of day) may cause the data source device 109 to generate the data files for the data subscription unit 101.

In one embodiment, the data subscription unit 101 may further include one or more security protocols. The security protocols may include, for example, verification of one or more of the unique identifiers associated with the received electronic data files, including, for example the unique data file identifier and/or a unique data source identifier. For example, in one embodiment, the unique data source identifier may be utilized by the data subscription unit 101 to verify that it is receiving data files and information from the appropriate data source device 109. Such a system may be advantageous in preventing denial of service attacks and other malicious actions which are intended to harm the data conversion and distribution system 100 or the remote user device(s) 107 (e.g., by way of the data conversion and distribution system 100).

The data subscription unit 101 further includes a data transmitter 207 configured to transmit the data having the plurality of data formats via secure communication over a network 108. In one embodiment, a FTP or SFTP connection may deliver the received data files including the plurality of data formats to a virtual machine 103 of the data conversion and distribution system 100 via the data transmitter 207.

Figure 3:
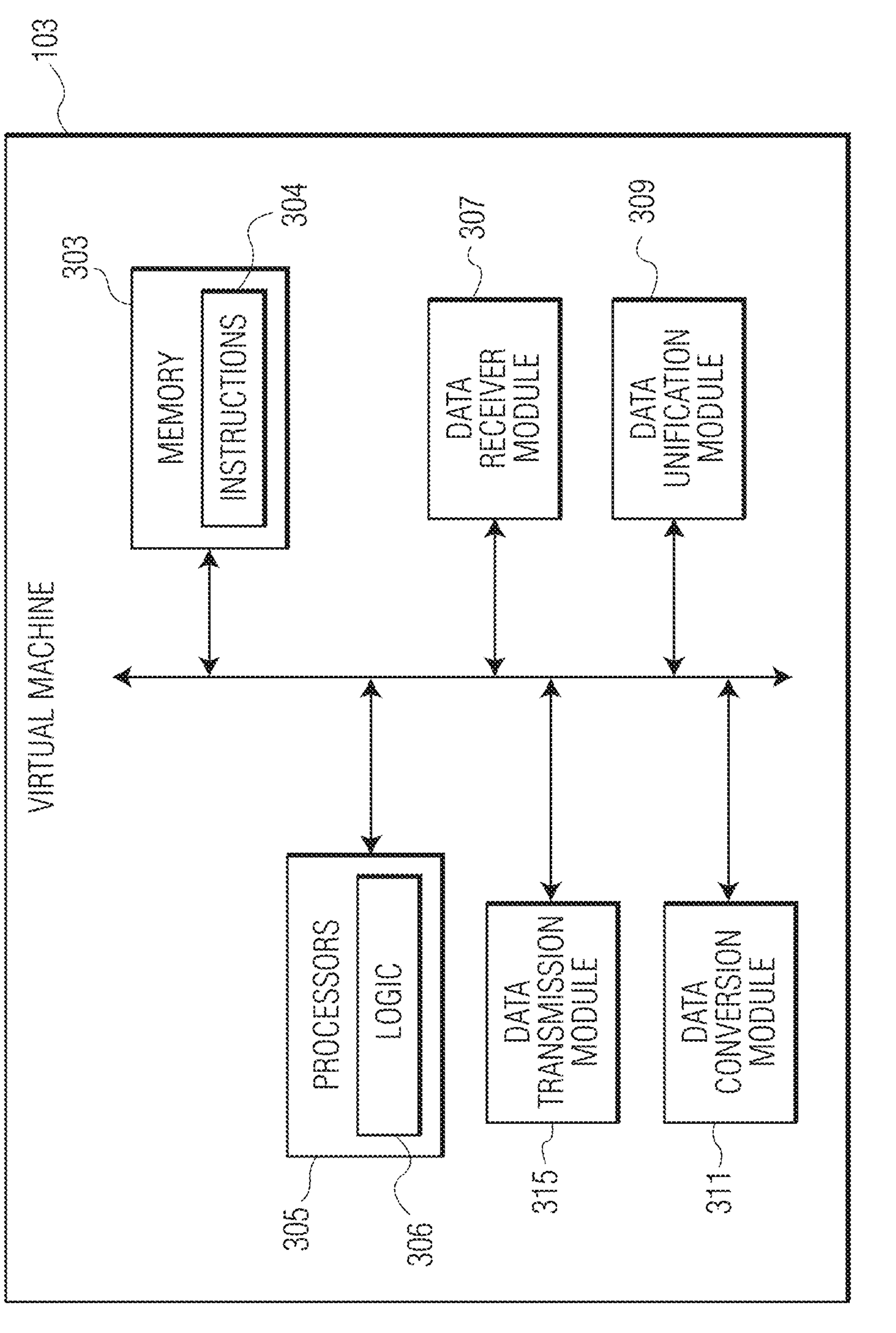
FIG. 3 is a functional block diagram of a virtual machine in accordance with an embodiment of a data conversion and distribution system of the present disclosure.

As illustrated in FIG. 3, an example virtual machine 103 of the system of FIG. 1A may include non-transitory memory 303 storing machine-readable instructions 304, and one or more processors 305 (also referred to herein as processing component 305) including processor logic 306. The virtual machine 103 is communicatively coupled to the data subscription unit 101. The virtual machine 103 may also include a data receiver module 307, a data unification module 309, a data conversion module 311, and/or a data transmission module 315. Although the virtual machine 103 is illustrated in FIG. 1A as a single machine (e.g., a server), in some examples, the virtual machine 103 may include one or more servers.

The data receiver module 307 may be configured to receive electronic data having the plurality of data formats from the data subscription unit 101 via an optionally secure communication over the network 108. Once the data receiver module 307 receives the data having the plurality of data formats, it may transfer the data from the data receiver module 307 to the data unification module 309 for processing.

The data unification module 309 may be configured to receive data having the plurality of data formats from the data receiver module 307. Upon receiving the data having the plurality of data formats, the data unification module 309 may at least one of reformat, aggregate, decompress, cleanse and/or unpack the data having the plurality of data formats in order to generate unified data. Reformatting the data having the plurality of data formats may include analyzing the received data to identify its data type, and converting the received data into data having a predefined data format or type. For example, reformatting may involve converting data having different formats (e.g., comma separated variables (CSV), extensible markup language (XML), text) into data having a single format (e.g., CSV).

In one embodiment, the data having a plurality of data formats (and originating from a plurality of data source devices 109) may be aggregated. Aggregation may involve combining data and/or a plurality of electronic data files from one or more data sources into a single compilation of electronic data (e.g., one electronic data file) based on certain parameters and/or criteria. For example, in one embodiment, data may relate to a particular product or instrument, and recent observations including information regarding transaction counts, quote counts, transaction volume or price histories from a variety of dates and/or time periods may be combined or aggregated for each particular product or instrument.

At least a portion of the data having the plurality of data formats may be received by the data unification module 309 in a compressed format (which means that the data has been encoded using fewer bits than was used in its original representation). The data received in compressed format may be decompressed by the data unification module 309, which involves returning the data to its original representation for use within the virtual machine 103. For example, "zipped" data files (which refer to data files that have been compressed) may be "unzipped" (or decompressed) by the data unification module 309 into electronic data files having the same bit encoding as they did prior to their being "zipped" (or compressed).

Cleansing the data may include scanning and/or analyzing a volume of raw data and identifying and removing any data and information deemed incorrect, out-of-date, redundant, corrupt, incomplete and/or otherwise not suitable or non-useful for purposes of supplementing the sparse data set and/or performing statistical analyses for the sparse data set. It is envisioned that the volume of raw data may include data and information pertaining to millions (even tens of millions) of products or instruments. Thus, performing the cleansing function will substantially reduce the volume of data and information that is subject to subsequent functions described herein (e.g., aggregating, unpacking, reformatting, decompressing, etc.). As a result, fewer system resources will be required to perform any of these subsequent functions. In this manner, the cleansing function operates to improve overall system operating efficiency and speed.

Removing data that is determined to be unsuitable or non-useful from the raw data may involve a filtering function that separates the suitable and useful data from the unsuitable and non-useful data, and then forwards only the suitable and useful data for further processing. The data deemed unsuitable or non-useful may be deleted, stored in a dedicated storage location and/or otherwise disposed of. Cleansing the data may also include aligning data received from multiple sources and/or at multiple times, where aligning may involve assembling the data in a form that is suitable for processing by the data conversion module 311 (e.g., sorted according to a time sequence, grouped by category, etc.). In one embodiment, cleansing the data may also include converting data in one form (as opposed to type or format) into data having a standardized form that is usable by the data conversion module 311 (e.g., currency conversion).

Unpacking the data may or may not include one or more of the decompressing, cleansing, aggregating, and/or other functions described above. Alternatively or additionally, unpacking may involve opening one or more data files, extracting data from the one or more data files, and assembling the extracted data in a form and/or format that is suitable for further processing. The sequences for opening and/or assembling the data may be predefined (for example, data may be opened/assembled in a sequence corresponding to timestamps associated with the data).

One or more of the functions discussed above (including, for example, reformatting, aggregating, decompressing, cleansing, and unpacking) as being carried out by the data unification module 309 may be performed in any suitable order or sequence. Further, one or more of these functions may be performed in parallel, on all or on portions of the received data. Still further, one or more of these functions may be performed multiple times. Collectively, one or more of these functions may be performed by the data unification module 309 (on the received data having a plurality of data formats) to ultimately generate the unified data (e.g., data having similar data characteristics (e.g., format, compression, alignment, currency, etc.)). The data unification module 309 may also perform additional and/or alternative functions to form the unified data.

Since the data unification module 309 may be separate and upstream from remote user devices 107, the processing functions discussed above are performed external to the remote user devices 107. Accordingly, the remote user devices 107 are able to receive electronic data from multiple data sources 109 in a unified form (and/or unified format) without having performed such aggregating and reformatting functions. Additionally, the data source devices 109 no longer have to reformat the data it generates prior to transmitting it to the data conversion and distribution system 100, as the data subscription unit 101 and the virtual machine 103 are able to receive and process data having any of the plurality of data formats.

At least a portion of the unified data may be stored in the memory 303 of the virtual machine 103. The memory 303 of the virtual machine 103 may be modular in that additional memory capabilities may be added at a later point in time. It one embodiment, it is envisioned that a virtual machine 103 of a data conversion and distribution system 100 may be initially configured with approximately 15 GB of disk space and configured to grow at a rate of 1.5 GB per month, as the virtual machine 103 receives and then stores more data from the data subscription unit 101, although any initial amount of disk space and any growth rate may be implemented.

The solutions described herein utilize the power, speed and precision of a special purpose computer system configured precisely to execute the complex and computer-centric functions described herein. As a result, a mere generic computer will not suffice to carry out the features and functions described herein. Further, it is noted that the systems and methods described herein solve computer-centric problems specifically arising in the realm of computer networks so as to provide an improvement in the functioning of a computer, computer system and/or computer network. For example, a system according to the present disclosure includes an ordered combination of specialized computer components (e.g., data subscription unit, virtual machine, etc.) for receiving large volumes of data having varying data formats and originating from various data sources, reformatting and aggregating the data to have a unified format according to preferences, and then transmitting the unified data to remote user devices. As a result, the remote user devices only receive the type and volume of information desired and the remote user devices are freed from performing the cumbersome data processing and conversion functions accomplished by the specialized computer components.

The unified data (provided by data unification module 309) may be accessed by or transferred to the data conversion module 311. The data conversion module 311 is configured to execute one or more statistical processes (e.g., statistical modeling, algorithms, etc.) using the unified data to generate at least one of data sensitivities, projected data, and/or any other statistical analyses information based on the unified data. In one embodiment, the data conversion module 311 may be configured to model and produce projected data based on the unified data, and data sensitivity information may be determined based on the projected data. In this manner, the data conversion module 311 is able to produce projected data and data sensitivities (and other statistical analyses information) for data classes without sufficient direct data to generate said projections, sensitivities, etc. (e.g., data classes having sparse electronic data). It may also be appreciated that data projections and data sensitivities may be reviewed according to archived data, to adjust modeling used by the statistical algorithm(s).

One example of a sparse electronic data set includes electronic transactional data associated with liquidity indicators. Participants in such an industry (including portfolio managers, analysts, regulatory compliance teams, etc.) may seek information related to whether a product or instrument has sufficient liquidity. Existing computer systems offer variations of "liquidity scoring" which largely depends on a counted number of data points (i.e., dealer sources) that have been observed. However, in illiquid markets, directly observable data points relating to transactional and quote information may be scarce. For example, in some fixed income markets, less than 2% of the issued instruments are a part of a transaction on a given day. As a result, directly observable data points relating to transaction and quote information is sparse, thereby forming a sparse electronic data set.

Accordingly, a data conversion and distribution system according to the current disclosure provides a solution for these types of data classes having sparse electronic data sets. As described above, the solution comes in the form of specially configured computer components, including a data subscription unit and a virtual machine, that collectively, receive any amount of data according to preferences, the data having varying data formats and originating from a variety of data sources, reformat and aggregate the data, and generate unified data files that may be run through statistical algorithms to generate statistical data and information for the sparse data classes.

Some portions of the description herein describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Additionally, certain embodiments described herein may be implemented as logic or a number of modules, components, or mechanisms. A module, logic, engine, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware may generally be used interchangeably herein as is known by a skilled artisan) as a module that operates to perform certain operations described herein.

In various embodiments, a module may be implemented mechanically or electronically. For example, a module may include dedicated circuitry or logic that is permanently configured (e.g., within a special-purpose processor) to perform certain operations. A module may also include programmable logic or circuitry (e.g., as encompassed within a specially-purposed processor or other programmable processor) that is configured (e.g., temporarily) by software or firmware to perform certain operations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components include a specially purposed processor configured using software, the specially purposed processor may be configured as respective different modules at different times. Software may accordingly configure the processor to constitute a particular module at one instance of time and to constitute a different module at a different instance of time.

Figure 4:
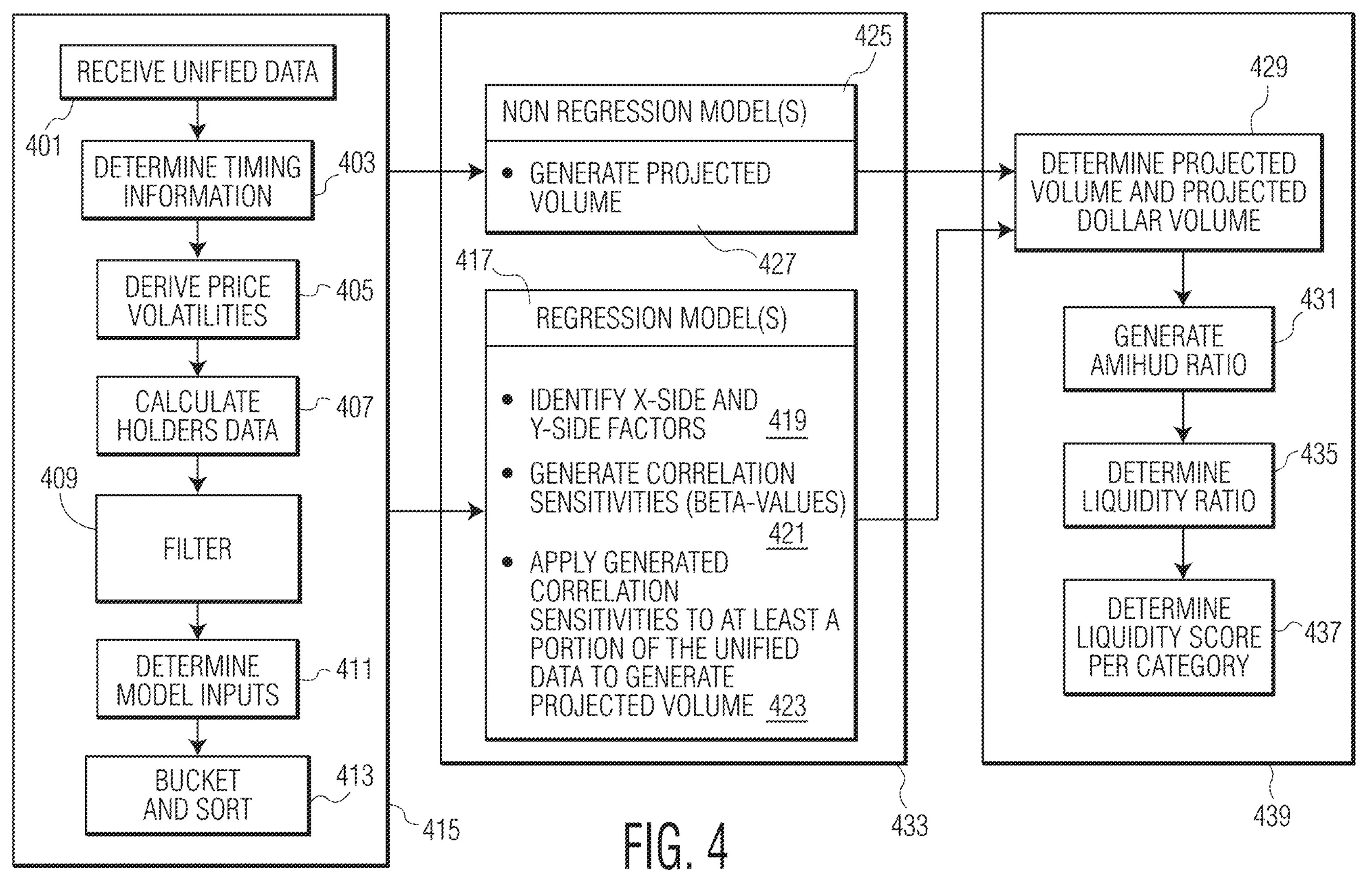
FIG. 4 is a flowchart of an example statistical algorithm for generating data sensitivities and/or projected data in accordance with an embodiment of a data conversion and distribution system of the present disclosure.

FIG. 4 is a flowchart of one example statistical algorithm that may be used in connection with the data conversion module 311 of FIG. 3 and is related to providing liquidity indicator statistics. Liquidity may be defined as the ability to exit a position at or near the current value of a product or instrument. For purposes of this disclosure, a product or instrument shall refer to any asset, whether tangible or electronic, that may be purchased, sold, offered, exchanged or otherwise made the subject of a transaction). In some embodiments, a product or instrument may refer to a consumer good, while in others, it may refer to a securities or similar assets.

The data conversion and distribution system 100 described herein may be used, in one exemplary and non-limiting embodiment, to generate liquidity indicator statistics for fixed income instruments which, as discussed above, may not be the object of active transactional activities. Fixed income instruments may include individual bonds, bond funds, exchange traded funds (ETFs), certificates of deposits (CDs), money market funds and the like. This approach to measuring liquidity, however, is not limited to fixed income securities, and is applicable to other types of instruments, including but not limited to, equities, options, futures, and other exchange-listed or OTC derivatives. Illiquid markets such as fixed income markets have limited transactional activity. For example, less than 2% of the outstanding instruments in fixed income markets may be the subject of transactional activity on any given day. Thus, data such as market depth is insufficient to construct an accurate assessment of an instrument's statistical liquidity. Accordingly, in one embodiment, a statistical algorithm of FIG. 4 may be used to estimate statistical indicators of an instrument's liquidity (e.g., "liquidity indicators") based on the influence of features on the ability to exit a position at or near the current value of the instrument. The statistical algorithm of FIG. 4 may be run on a specialized liquidity engine of the data conversion module 311. The liquidity engine may be configured specifically for providing statistical liquidity indicators.

In the statistical algorithm of data conversion module 311 shown in FIG. 4, features of the buyers, sellers, and asset may be used to determine the ability to electronically transact a particular instrument. Features may include asset class, sector, issuer, rating (investment grade, or high-yield), maturity date, amount outstanding, issue date, and index constituent, number of quotes, number of transactions, number of holders, number of buyers and sellers, transaction volume, tighter bid/ask spreads, liquidity premiums and the like. The influence of features on the transaction volume may be determined by applying a statistical algorithm comparing historical data regarding the features to historical information regarding the transaction volume. The results of the statistical algorithm may be applied to information about the current features of the instrument in order to project the future transaction volume, liquidity and the like.

The statistical algorithm of FIG. 4 may include a number of pre-modeling steps 415, including receiving unified data 401 that may include data quote counts, transaction counts, and transaction volumes values corresponding to a time window. The statistical algorithm may then determine timing information 403. In particular, the received time window may be broken into time periods. For example, the time window may include 84 business days and may be subdivided into 4 time periods of 21 days each.

The data and information in each of the time periods may be used to derive price volatilities 405 for each instrument. To derive the price volatilities, a time horizon may be defined. In one embodiment, the time horizon may depend on the time to maturity. For example, if the days to maturity is greater than 53, then the time horizon may be set to 63 days, and if the days to maturity is less than or equal to 53 days, then the time horizon may be set to the days to maturity plus 10 days. Once the time horizon is defined, the price volatility 405 may be derived by comparing the bid price for each instrument in the time horizon in sequential order from the most recent bid to the earliest bid in the time horizon. In one embodiment, the comparison may include calculating the average absolute log price change for each sequential pair of bids. Determination of the price volatilities may include use of stored unified data or unified data that includes historical trade information.

The statistical algorithm of FIG. 4 may also calculate holders data for each asset class 407. For example, the statistical algorithm may calculate the median holders over two time periods (e.g., each time period spanning 42 production days).

The statistical algorithm of FIG. 4 may include additional filtering steps 409 for identifying instruments which are eligible to receive a liquidity score. In this example, instruments may refer to securities or any other similar product. The statistical algorithm may further include a filtering rule set which is applied to instruments. For example, the filtering rule set may specify that a particular instrument be "ignored." A liquidity score may not be calculated for an "ignored" instrument. The filtering rule set may also specify that an instrument that is actively evaluated and released by the organization implementing the data conversion and distribution system be ignored.

The statistical algorithm of FIG. 4 may determine a list of inputs 411 for use in modeling. These inputs may include one or more of an instrument identifier, issue date, quote count, trade count, trade volume, amount outstanding, issuer identifier, financial Boolean, investment grade Boolean, and the like. These inputs may be obtained from the unified data provided by data unification module 309.

Prior to calculating the liquidity indicators, the algorithm may bucket and sort a number of instruments 413 according to the price volatilities of each instrument. The instruments may be bucketed in accordance with their different durations. Within each bucket, the instruments may be sorted based on their volatility value. For example, the system may create 40 distinct buckets for each list of instruments, where the instruments are bucketed by their durations. Within each bucket, the instruments may be sorted by their price volatilities. In one embodiment, near-zero or zero-valued price volatilities may be replaced with the minimum non-zero volatility. Similarly, if an entire bucket having non-zero valued volatilities is included, a predetermined percentage (e.g., the lowest ten percent (10%)) of the volatilities may be replaced with the first volatility value found after the predetermined percentage (e.g., the lowest ten percent (10%)).

The statistical algorithm of FIG. 4 may include modeling steps 433 involving one or more non-regression models 425 and one or more regression models 417. The one or more models 417, 425 of modeling step 433 may be run for each type of instrument independently. For example, the one or more regression models 417 may be run on investment grade bonds (which have a low risk of default) independently from running the one or more regression models on high-yield bonds (which have lower credit ratings and a higher risk of default).

In one embodiment, at least one of the one or more regression models 417 is a linear multifactor regression model. The one or more regression models 417 may be utilized to generate correlation sensitivities (data sensitivities) between factors or attributes (an X-side of the regression) and the transaction volume (a Y-side of the regression) of an instrument 421. The correlation sensitivities (data sensitivities) may then be used to project future trade volumes 423.

In one embodiment, two regression models, Models A and B, may be utilized to generate correlation sensitivities (data sensitivities) or beta-values, between factors (attributes) and transaction volume. Model A may use one or more factors (attributes) related to the transaction volume, quote count, transaction count, amount outstanding (AMTO), years since issuance (YSI), financial Boolean, holders data (calculated above in step 407), bond price and the like for the X-side of the regression 419. Model B may use factors (attributes) related to the issuer transaction volume, issuer quote count and transaction count, AMTO, financial Boolean, holders data (calculated above in step 407), bond price and the like for the X-side of the regression 419. The years since issuance may be calculated as the difference in the number of days between the issue date and the current production date and dividing the difference by 365. Both Model A and Model B may use the most recent time period (calculated above in step 403) for the Y-side of the regression 419. In one embodiment, the X-side factors (attributes) for the transaction volume variable may be weighted so that the transaction volume values of the data set sums to the total transaction volume. Data and information related to these factors (attributes) may be obtained by the pre-modeling processing steps 415 described above.

The regression models 417 may generate correlation sensitivities or beta-values for the factors 421. For example, the two regression models, Models A and B, may be performed using the X-side and Y-side factors described above. The resulting correlation sensitivities 421 (i.e., data sensitivities) or beta-values may be indicative of the correlation between the X-side factors and the Y-side trading volume. In particular, the generated beta-values may indicate the correlation between the transaction volume, quote count and trade count, amount outstanding, years since issuance, financial Boolean, investment grade Boolean, holders, transformed bond price variable (e.g., may be defined by equation: $(\text{bond price}-100)^2$), and the trading volume. In one embodiment, four separate sets of beta-values may be generated, as models A and B may be run separately for investment grade and high-yield bonds, as they are sensitive to different factors.

The correlation sensitivities or beta-values may then be used along with data and information corresponding to the factors in a new data set of the model to generate a projected volume 423. The new data set may be a portion of the unified data.

In one embodiment, alternative statistical models which do not use regression (non-regression models 425) may be used in combination with the regression models 417. In one embodiment, a model 425 with no regression step may calculate the projected volume as a weighted sum average of the transaction volume from a set number of time periods 427. In another embodiment, a model 425 with no regression step may calculate the projected volume as the maximum of average accumulative volume of all of the previous days up to the current day in a time period 427. In yet another embodiment, a model 425 with no regression step may calculate the projected volume as the average volume across a time period 427.

In certain embodiments, a seasonal adjustment may be applied to the projected volume from the regression or non-regression models (425, 417) of projected volume. Additionally, one or more algorithms may be run on the projected volumes to remove the effects of regression linkage.

Various post-modeling steps 439 may be taken by the statistical algorithm of data conversion module 311. The outputs from the one or more regression and non-regression models (425, 417) applied on the unified data may be utilized to determine a projected volume and a projected dollar volume for any bond 429. In one embodiment, the projected volume is the maximum volume from all applicable models. The projected dollar volume may be calculated as the projected volume*BidPrice/100. The BidPrice may be indicative of the price a buyer is willing to pay for the instrument. The projected dollar volume may be subject to a minimum dollar volume rule such that if the projected volume is less than 1000 and the amount outstanding is less than 1000 but not equal to zero, the projected dollar volume may be set to the AMTO*BidPrice/100. Alternatively, if the projected volume is less than 1000 and the amount outstanding is greater than 1000, the projected dollar volume is set to 1000*BidPrice/100.

After a projected dollar volume is generated for each instrument (step 429), the algorithm may generate an Amihud ratio value 431. The Amihud ratio is indicative of illiquidity and is commonly defined as a ratio of absolute stock return to its dollar volume averaged over a time period. The Amihud ratio value may be calculated by identifying the volatility of each instrument (see step 405), and dividing the volatility by the max projected dollar volume across all the models (see step 429).

The models 425, 417 (collectively, 433) may output a number of measures that are available for use by downstream products. These outputs may include the active trading estimate (the maximum dollar volume of the non-regression models), the potential dollar volume (maximum dollar volume of the regression models), the Projected Trade Volume Capacity (the maximum dollar volume across all of the regression and non-regression models), the volatility, and the Amihud ratio value.

The outputs from the models 433 may also be used to assign scores that allow for the comparison of instruments. Those instruments having a low Amihud ratio value may be given a high score indicating they are the more liquid instrument. Those instruments having a high Amihud ratio value may be given a low score indicating they are a less liquid instrument. Scores may be determined based on an instrument's percentile rank in comparison with the universe size (the number of unique Amihud ratio values). The instruments in each category may be ranked in a list. In one example, the list may be separated into ten sections, where the first 10% having the highest Amihud scores are assigned a score of 1, the second 10% having the next highest Amihud scores are assigned a score of 2, and so forth.

The statistical algorithm may also determine the liquidity ratio 435, which is a liquidity indicator (described further below). The liquidity ratio 435 is an estimate of the market price response per dollar transacted in an instrument. The liquidity ratio 435 may be defined as the projected future potential price volatility divided by the projected future potential transaction volume (determined in step 429). The liquidity ratio may be a normalized value (as each instrument is normalized by its projected future potential transacting volume), and thus allows for the direct comparison of instruments within a given category 437.

The statistical algorithm may determine a liquidity score per category 437. Categories for ranking the instruments may include one or more of all bonds, same asset class, same sector, same issuer, similar duration in asset class, similar yield to maturity in asset class, and similar amount outstanding bonds in asset class. The all bonds category may include every instrument that received an Amihud value for the given production date, across all asset types (corporate, municipal, structured, agency, etc.).

The same asset class category may cover instruments having the same asset class. In other words, corporate instruments may be compared to corporate instruments and municipal bond instruments may be compared to municipal bond instruments. The same sector category may cover instruments categorized with the same market sector. The same issuer category may cover instruments assigned to the same issuer id. The same duration in asset class category may cover instruments with similar duration ranges within the same asset class. The duration ranges may be derived by sorting the instruments by their duration value, breaking the sorted list into ten equally weighted ranges, and assigning each of the ten equally weighted ranges a score. The similar yield to maturity in asset class category may cover instruments with similar yield to maturity ranges within the same asset class. The yield to maturity ranges may be derived by sorting the instruments by their yield to maturity value, breaking the sorted list into ten equally weighted ranges, and assigning each of the ten equally weighted ranges a score. The similar outstanding bonds in asset class category may cover instruments with similar amount outstanding ranges within the same asset class. The amount outstanding ranges may be derived by identifying unique amount outstanding values per asset class, sorting the instruments by their amount outstanding values per asset class, breaking the sorted list into ten equally weighted ranges, and assigning each of the ten equally weighted ranges a score.

The output from these models (active trading estimate, the potential dollar volume, the Projected Trade Volume Capacity, the Projected Volatility, the Amihud ratio value, and the liquidity scores) are examples of liquidity indicators. Scoring, categorical information, outputs from the models, liquidity indicators, may be stored on the memory component 303 of the virtual machine 103, the data distribution device 105, and made available for downstream products and applications on a remote user device 107.

The output from the data conversion module 311 (including, for example, regression and non-regression models (425, 417), liquidity indicators, scoring, categorical information and the like) may be transmitted via the data transmission module 315 of the virtual machine 103 to the data distribution device 105 via one or more secure communications over network 108.

Figure 5:
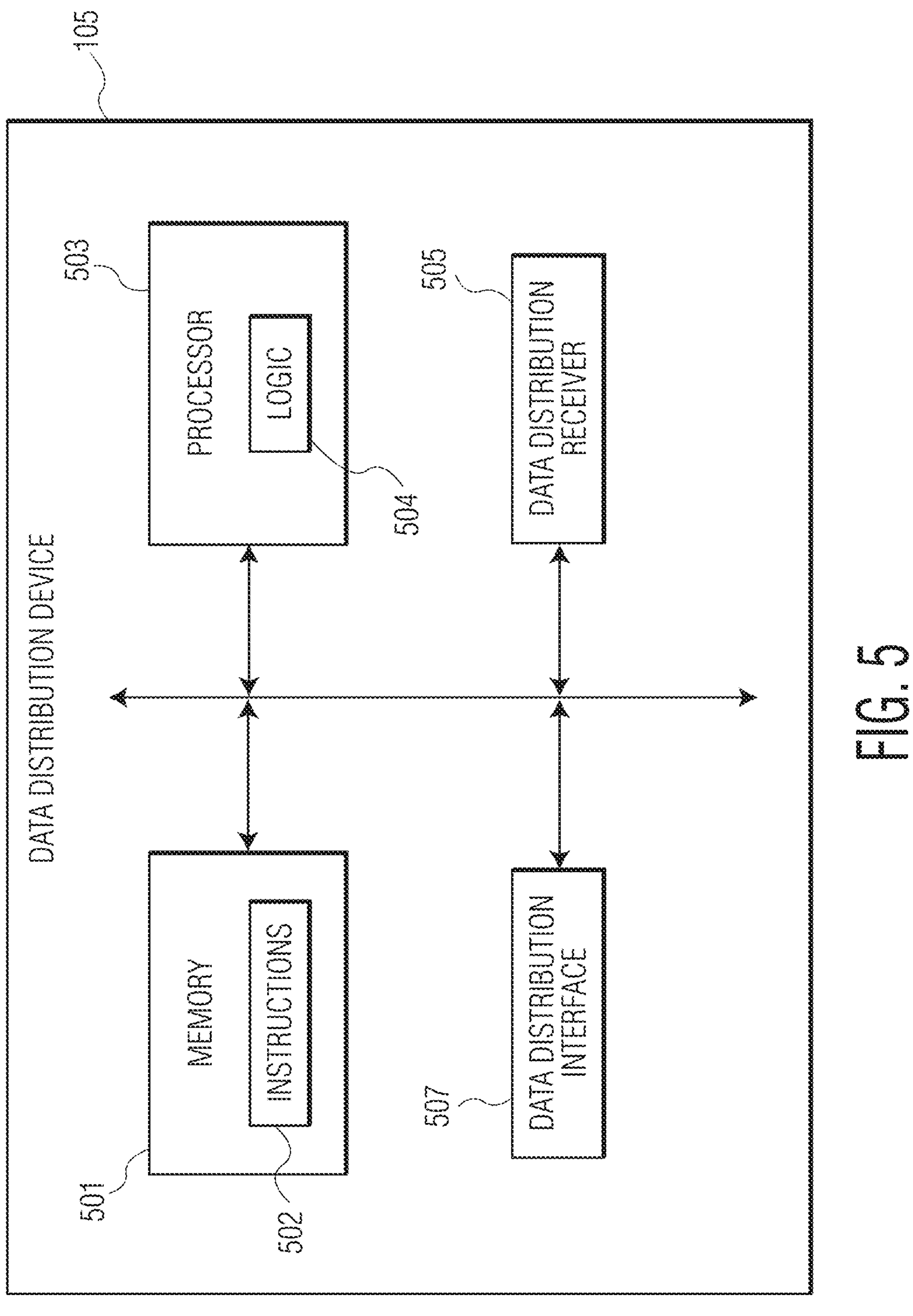
FIG. 5 is a functional block diagram of a data distribution device in accordance with an embodiment of a data conversion and distribution system of the present disclosure.

An example data distribution device 105 of the system of FIG. 1A is depicted in FIG. 5. The data distribution device 105 may include one or more processors 503 (also referred to herein as processing component 503) including processor logic 504. The data distribution device 105 may include at least one data distribution receiver 505 configured to receive information from the virtual machine 103. The data distribution device 105 may include non-transitory memory 501 including instructions 502 to store the outputs from the regression and non-regression models (425, 417), liquidity indicators, scoring, categorical information, and/or any other derived statistical data or information from the virtual machine 103.

The data distribution device 105 may include at least one data distribution interface 507 configured to provide secure communications with at least one remote user device via network 106. The non-transitory memory 501 of the data distribution device 105 may also be configured to store predefined settings for one or more remote user devices 107. The data distribution device 105 may be further configured to receive a request from one or more remote user devices 107 at data distribution receiver 505. The request may detail which portion of the stored information on the data distribution device 105 the respective remote user device 107 indicates to receive. The data distribution device 105 may send the requested portion of the stored information to the remote user device 107 responsive to receiving the request. For example, a remote user device 107 may request that the data distribution device 105 only transmit liquidity indicators for instrument X to the remote user device 107. Transmissions from the data distribution device 105 to the remote user devices 107 via the network 106 may involve FTP and a structured query language (SQL) loader, or any other suitable means. The contents of the request may form the predefined settings that are stored on the non-transitory memory 501 of the data distribution device 105.

Figure 6:
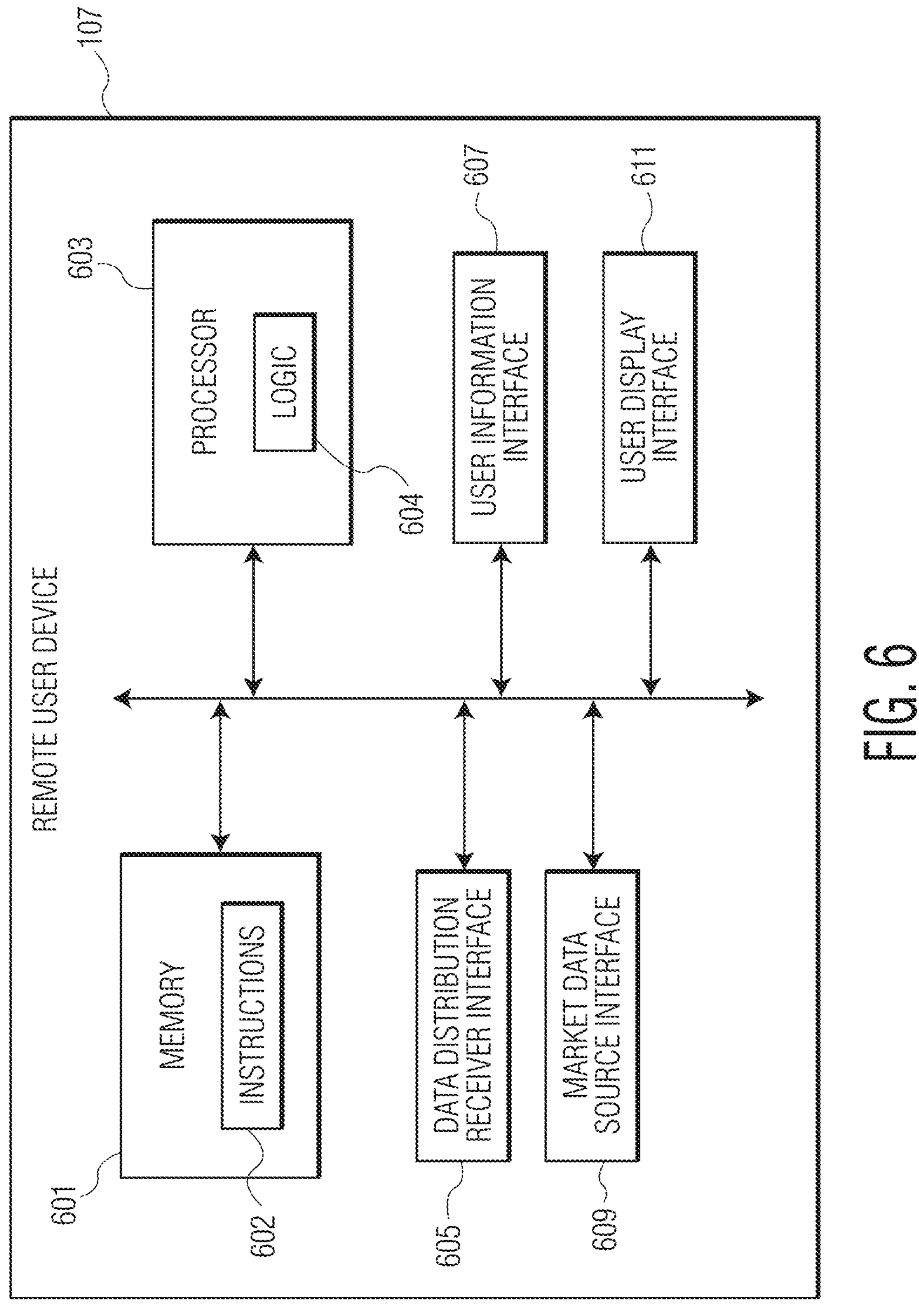
FIG. 6 is a functional block diagram of a remote user device in accordance with an embodiment of a data conversion and distribution system of the present disclosure.

An example remote user device is illustrated in FIG. 6. As illustrated in FIG. 6, remote user device 107 may include a non-transitory memory 601 storing machine-readable instructions 602, one or more processors 603 (also referred to herein as processing component 603) including processor logic 604, a data distribution receiver interface 605, a user information interface 607, a market data source interface 609, and/or a user display interface 611. The data distribution receiver interface 605 may be specially configured to be communicatively coupled to the data distribution device 105 via network 106. For example, in one embodiment, the remote user device 107 may be specially configured to perform certain data processes, contain an up-to-date version of a web browser associated with system 100, and have an Internet connection capable of communication with system 100. The remote user device 107 may have an account with the service provider of the data conversion and distribution system 100. The remote user device 107, and, more specifically the data distribution receiver interface 605, may establish a secure connection with the data distribution device 105. The secure connection may be mediated by a password portal on a web-service, a secured application, biometrics device(s), and the like. Additional security measures which allow for encrypted communications (such as industry standard secured hypertext transfer protocol (HTTPS), secure socket layer (SSL) certificates, and the like) may also be used. Although a single remote user device 107 is discussed, a plurality of remote user devices 107 may be used with the data conversion and distribution system 100.

Each remote user device 107 may be configured to receive, via the data distribution receiver interface 605, at least one of the data sensitivities, projected values, and other information stored on the data distribution device 105. The remote user device 107 may also be configured to receive user input data via the user information interface 607 and current market data via the market data source interface 609. The market data source interface 609 may be configured to receive market data from computer systems associated with exchanges, regulators and the like. In other embodiments, the market data source interface 609 may simply be a data source interface, configured to receive any type of form of data pertinent to any industry. The remote user device 107 may also be configured to generate supplementary projected data based on the received at least one of the data sensitivities and the projected data, the user input data and current market data. The projected data may include one or more of the projected volume, projected dollar volume, Amihud ratio, liquidity ratio and liquidity score per category. The supplementary projected data may include one or more of a projected market price impact and a projected days to liquidate.

Processing component 603 of each of the remote user devices 107 and processing component 503 of the data distribution device 105 may work in unison to generate supplemental projected data including a projected market price impact and a projected days to liquidate. For example, in one embodiment, a user of the remote user device 107 may upload and transmit data to the data distribution device 105. The uploaded and transmitted data may include the sparse data class and information relating thereto, such as product data, position data, instrument data, portfolio data, etc. The data distribution device 105 may receive and store the data from the remote user device 107. One or more algorithms stored on the memory component 501 of the data distribution device 105 may be executed to generate the supplemental projected data. Input to the one or more algorithms may include, for example, the data received from the remote user device 107, output from the data conversion module 311 (e.g., liquidity indicators, scoring, categorical information, and/or any other derived statistical data or information), data previously stored on the data distribution device 105, and/or other data and information relevant to the implementation. The supplemental projected data may then be transmitted from the data distribution device 105 to the remote user device 107. The remote user device 107 may receive and/or store the supplementary projected data from the data distribution device 105. The projected market price impact may be defined as the projected effect that a market participant will have when an instrument is bought or sold. It may be represented as a percentage. The projected days to liquidate may be defined as the projected days it would take to liquidate an instrument given the position size of the instrument. In particular, a user of one of the remote user devices 107 may input a targeted market price impact via user information interface 607. The remote user device 107 may then retrieve projected data, data sensitivities, current market data, and other information related to the instrument. Using the obtained information the remote user device 107 (working with the data distribution device 105) may generate an estimate of the days to liquidate needed to achieve the targeted market price impact. Similarly, the remote user device 107 may receive from a user (via interface 606) a targeted projected days to liquidate. Using information obtained from the remote user device 107 and the data distribution device 105, the remote user device 107 and/or the data distribution device 105 may generate a measure of the projected market price impact given the targeted projected days to liquidate.

The supplemental projected data (including the projected market price impact and the projected days to liquidate) may take into account the impact of position size on liquidating an instrument. For example, two investors may hold the same instrument at varying positions: Investor A may have a $1 million position and Investor B may have a $100 million position. If the projected trading volume capacity is estimated to be $10 million per day, it is reasonable to conclude that Investor A's position may be liquidated in one trading day, and Investor B's position may take longer to liquidate. Accordingly, the projected days to liquidate may take into account the projected trading volume capacity and position size. Additionally, there may be a time-dependent cost associated with exiting a position over the course of multiple days, as market conditions may change and influence the price of the asset. Thus, the projected market price impact may use the volatility estimates (used in the generation of the liquidity ratio), along with other variable considerations such as bid-ask spread and evaluated price of the security, to determine the impact on the market price based on how many days the investor uses to liquidate their position.

The remote user devices 107 may also display at least one of the projected data, supplementary projected data, user input data and current market data via the user display interface 611. The user display interface 611 may further include a graphical user interface (GUI), application programming interface (API) and the like. The remote user device 107 may be configured to receive user graphical user interface (GUI) preference data from a user of the system via interface 607. Using the received user GUI preference data, the remote user device 107 may extract information including at least a portion of the at least one of the projected data and the supplementary projected data, data sensitivities, and current market data from the memory 601 of the remote user device 107 and/or memory 501 of the data distribution device 105. The extracted information may then be displayed on the graphical user interface of the user display interface 611 in accordance with the user GUI preference data.

Figure 7:
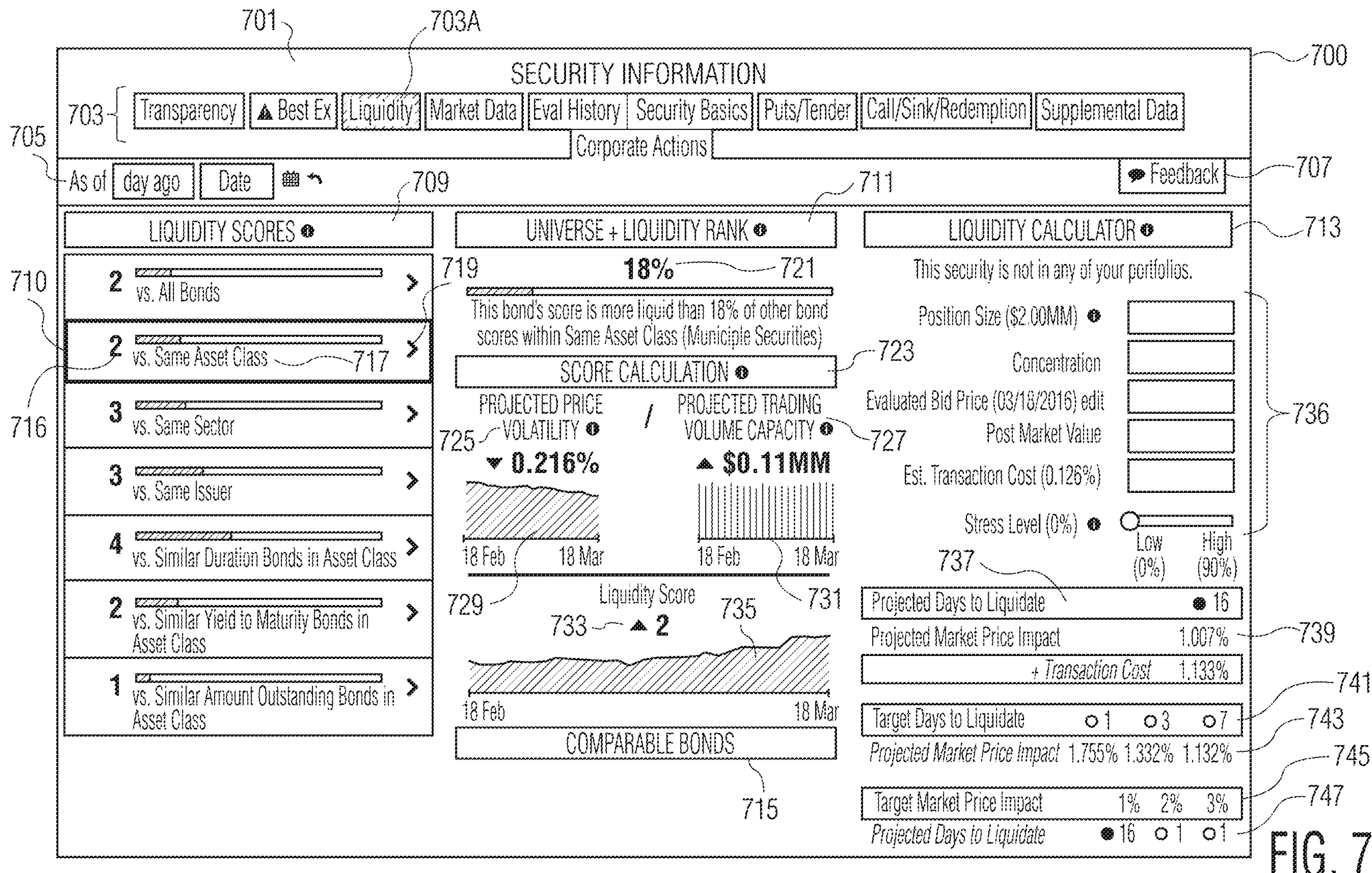
FIG. 7 is a schematic representation of a graphical user interface used in connection with an embodiment of the present disclosure.

FIG. 7 illustrates an exemplary GUI 700 of the user display interface 611 of FIG. 6. In some examples, the GUI 700 may be present on a webpage accessed by the user of the remote user device 107. The GUI 700 may include a first section displaying instrument information 701 including, for example, the instrument title, a brief description, and the like.

The GUI 700 may also contain means for providing feedback to an operator of the data conversion and distribution system. Selection of the feedback icon 707 by the user may provide a pop-up window, link to a new tab or webpage, and the like which allows for communication with the system 100 for data conversion and distribution. Alternatively, hovering over the feedback icon 707 with a mouse, may display a phone number, email address, or chat service configured to aid in communication between the user of the remote user device 107 and the operator of the data conversion and distribution system 100.

A second section of the GUI 700 may include tabs 703 used to change the panels displayed in the GUI window. Tabs 703 may include transparency, best execution, liquidity, market data, evaluation history, instrument basics, puts/tender, call/sink/redemption, supplemental data, corporate actions, or any other desired tabs appropriate for the particular implementation. A selected tab may change color in order indicate to a user selection of the tab. Other panels displayed on the GUI window may be adjusted in accordance with the selected tab 703.

In the displayed embodiment, selection of the liquidity tab 703A displays at least five panels: a liquidity scores panel 709, a universe and liquidity rank panel 711, a score calculator panel 723, a comparable bonds panel 715, and a liquidity calculator panel 713. It is envisioned that additional or fewer panels may be visible upon selecting the liquidity tab 703A. The GUI 700 may also display information regarding the date at which data and information displayed in the GUI 700 was last updated 705.

The liquidity scores panel 709 may include information regarding the scores of each instrument when compared with the instruments in each categories, separated by category. Categories may include all bonds, same asset class, same sector, same issuer, similar duration bonds in an asset class, similar yield to maturity bonds in asset class, similar outstanding bonds in an asset class, etc. Each sub-panel 710 of the liquidity scores panel 709 may include the score 716, the category the score corresponds to 717, and an indicator 719. In one embodiment, selection of the indicator 719 may update the other panels and subpanels of the liquidity tab 703A. The selection of the indicator 719 may also display additional information related to the instrument and category chosen.

The universe and liquidity rank panel 711 may display information regarding the instrument's score in comparison with other instruments in the selected category 717. For example, the depicted example illustrates that a particular bond's score is more liquid than 18% (721) of the other bond scores within the same category 717 (asset class).

The score calculator panel 723 may display the projected data including the projected price volatility 725 and the projected volume capacity 727. The projected data may be depicted in numerical and/or graphical format 729, 731 for ease of use by the user. The score calculator panel 723 may also include the liquidity score 733, and a display of how the liquidity score may change over time 735 in graphical format.

The comparable bonds panel 715 may display a listing of instruments having the same issuer but with more favorable liquidity scores.

The liquidity calculator panel 713 may include an indication of whether a particular instrument is in a user's portfolio. The liquidity calculator may also include one or more fields 736 configured to receive user input. The fields 736 for user input may include position size, concentration, evaluated bid price, position market value, estimated transaction cost, stress level and/or any other information pertinent to the implementation. One or more of the fields may be updated automatically by the remote user computer device 107 based on either market data received from a market data source, or by other user input. Although textboxes configured for user input are depicted, alternate methods for receiving user input may be used, such as a scrollbar, selectable drop-down menu, and the like.

The liquidity calculator panel 713 may also include a display of the supplemental projected data including the projected days to liquidate 737 and the projected market price impact 739. It may also include a section depicting an estimation of the projected market price impact 743 given a number of target days to liquidate 741. Similarly, a section of the liquidity calculator panel 713 may also include an estimation of the projected days to liquidate 747 given a target market price impact 745.

Although exemplary sections and panels are depicted in FIG. 7, alternate configurations for the sections and panels are envisioned. For example, a graphical user interface may contain more or fewer sections and panels. Additionally, the sections and panels may be reorganized in any manner and display other pertinent information.

Figure 8:
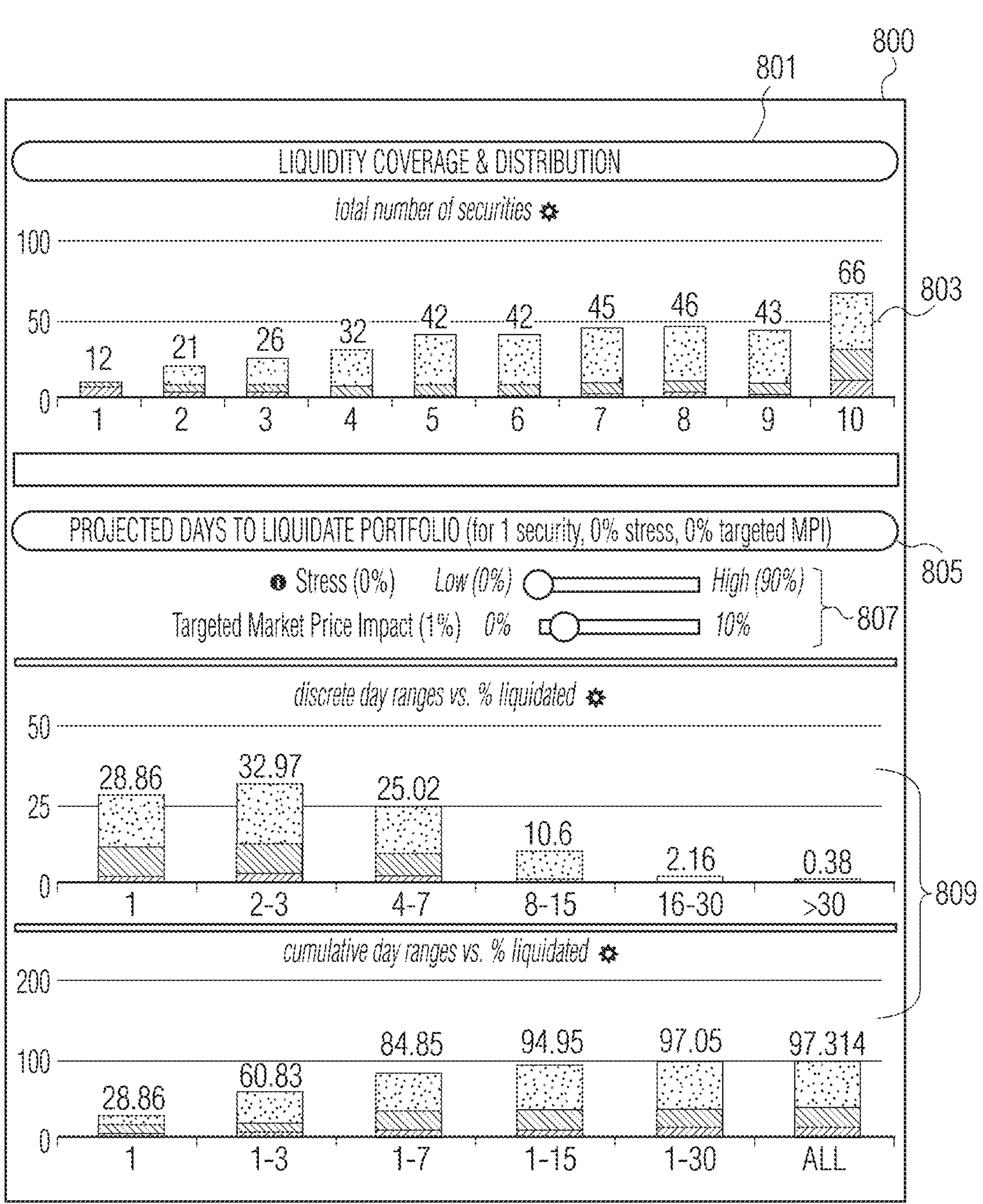
FIG. 8 is a schematic representation of a graphical user interface used in connection with an embodiment of the present disclosure.

Additional panels 800 are depicted in FIG. 8. These additional panels 800 may be incorporated into the graphical user interface of FIG. 7. Alternatively, the additional panels 800 may be visible after selection of a separate tab 703 of the graphical user interface, or pop-up after selection of any element in FIG. 7. The additional panels 800 depicted in FIG. 8 include a liquidity coverage and distribution panel 801 which illustrates the total number of instruments 803 and a projected days to liquidate portfolio panel 805. The projected days to liquidate portfolio panel 805 may include user input fields 807 such as stress and targeted market price impact. After the user inputs the targeted market price impact by way of the sliding selector, the user input may be transmitted to the data distribution device 105. The data distribution device 105 and/or the remote user device 107 may work in unison to generate other projected values such as the projected days to liquidate. The projected days to liquidate may then be displayed in either the projected days to liquidate portfolio panel 805 in graphical or numerical form 809, or in the graphical user interface of FIG. 7 in the liquidity calculator panel 713 as element 747. Similar to the additional projected days to liquidate portfolio panel 805, it is envisioned that a graphical user interface may include a projected market price impact panel configured to receive from a user on a remote user device 107 the target days to liquidate. The user may input the target days to liquidate by way of a text-field, selection menu, selection boxes, slider or the like. The remote user device 107 may then transmit the target days to liquidate to the data distribution device 105 to obtain relevant data and information. The remote user device 107 and the data distribution device 105 may then work in unison to generate the projected market price impact.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the particular functions described herein. In some embodiments, computers may include processors, memories, data storage devices, and/or other specially-programmed components. These components may be connected physically or through network or wireless links. Computers may also include software which may direct the operations of the aforementioned components. Computers may be referred to with terms such as servers, personal computers (PCs), mobile devices, and other terms that may be interchangeable therewith, and any special purpose computer capable of performing the described functions may be used.

Computers may be linked to one another via one or more networks. A network may be any plurality of completely or partially interconnected computers, wherein some or all of the computers are able to communicate with one another. Connections between computers may be wired in some cases (e.g., via wired TCP connection or other wired connection) or may be wireless (e.g., via a Wi-Fi network connection). Any connection through which at least two computers may exchange data may be the basis of a network. Furthermore, separate networks may be able to be interconnected such that one or more computers within one network may communicate with one or more computers in another network. In such a case, the plurality of separate networks may optionally be considered to be a single network.

Each of the data source devices 109, data subscription unit 101, virtual machine 103, data distribution device 105, and remote user devices 107 may include one or more computing devices. The one or more computing devices may each include servers 301, processing components 209, 305, 503, 603 having logic 210, 306, 504, 604, memory components 303, 501, 601 having instructions 304, 502, 602, communications interfaces 315, 507, 607, 609, receivers 307, 505, 605, user displays 611 and/or the like.

Processing components 209, 305, 503, 603 may include, without being limited to, a microprocessor, a central processing unit, an application specific integrated circuit (ASIC), a field programmable gate array (FPGA), a digital signal processor (DSP) and/or a network processor. Processing components 209, 305, 503, 603 may be configured to execute processing logic 210, 306, 504, 604 for performing the operations described herein. The processing components 209, 305, 503, 603 described herein may include any suitable special-purpose processing device or a processing device specially programmed with processing logic 210, 306, 504, 604 to perform the operations described herein.

Memory components 303, 501, 601 may include, for example, without being limited to, at least one of a read-only memory (ROM), a random access memory (RAM), a flash memory, a dynamic RAM (DRAM) and a static RAM (SRAM), storing computer-readable instructions 304, 502, 602 executable by processing components 209, 305, 503, 603. Memory components 303, 501, 601 may include any suitable non-transitory computer readable storage medium storing computer-readable instructions 304, 502, 602 executable by processing components 209, 305, 503, 603 for performing the operations described herein. Although one memory component 303, 501, 601 is illustrated in each of FIGS. 3, 5, and 6 in some examples, the one or more computer systems may include two or more memory devices (e.g., dynamic memory and static memory).

The one or more computing systems may include one or more communication interface interfaces 315, 507, 607, 609, and communication receivers 307, 505, 605, for direct communication with other computers and/or computer components (including wired and/or wireless communication) and/or for communication with network(s) 106, 108, 110 (FIG. 1A).

In some examples, the remote user devices 107 may include display devices (e.g., a liquid crystal display (LCD)). In some examples, computer system of a remote user device 107 may include one or more user interfaces 607, 611 (e.g., an alphanumeric input device, a touch sensitive display, a cursor control device, a loudspeaker, etc.).

Figure 9A:
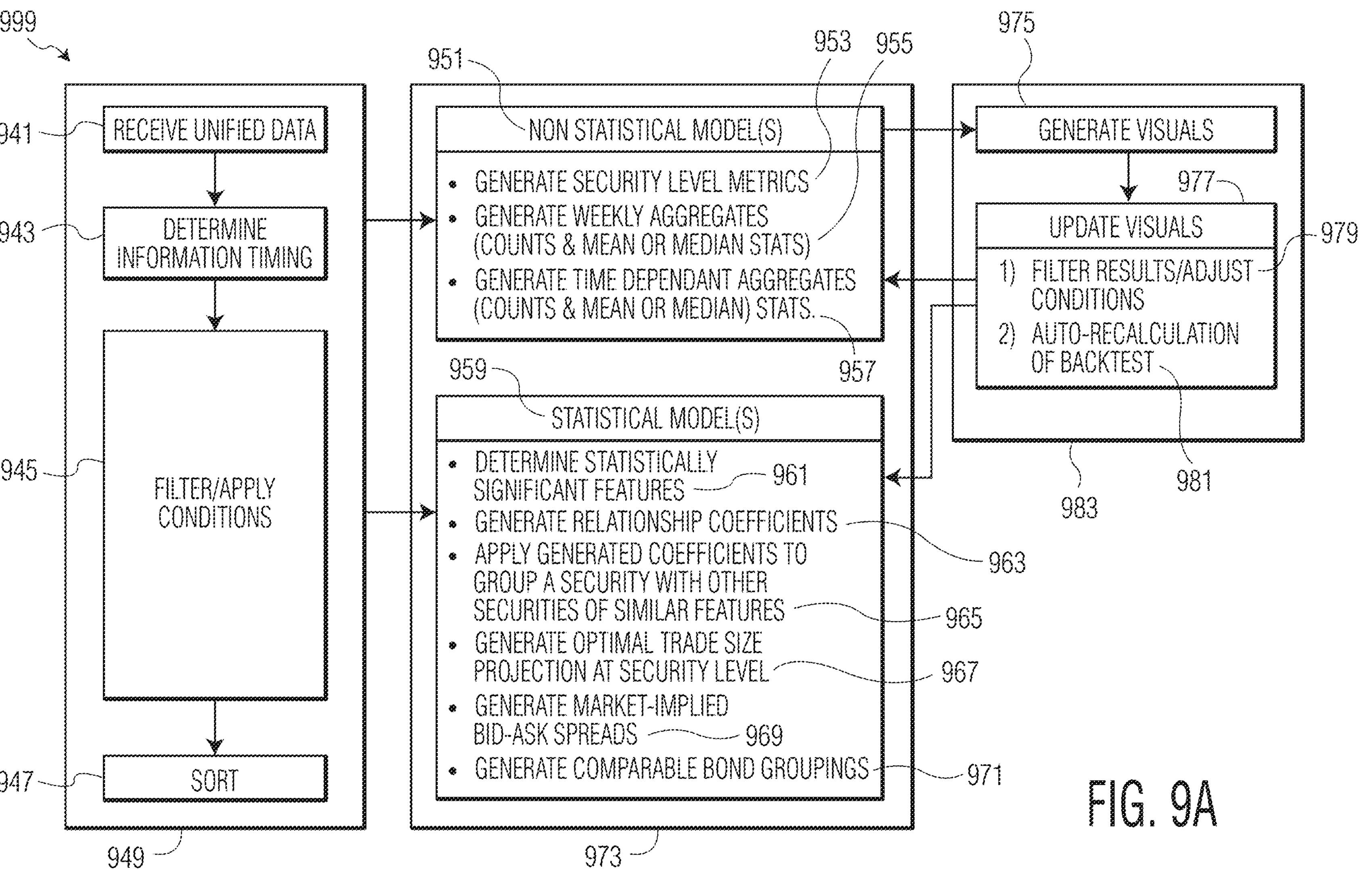
FIG. 9A is a flowchart of an example statistical algorithm for evaluating pricing methodologies (e.g., currently practiced methodologies, proposed methodologies, etc.), market data sources, and alternative market data sources, and rendering various backtesting analytic indicators associated with the evaluation.

Referring now to FIG. 9A, a flowchart illustrating an example backtesting utility 999 that may be used in connection with the data conversion module 311 of FIG. 3 is shown. The backtesting utility 999 may provide a set of user-interactive backtesting methodologies for evaluating pricing methodologies (e.g., currently practiced methodologies, proposed methodologies, etc.), market data sources, and alternative market data sources and may render various backtesting analytic indicators associated with the evaluation. The rendered analytic indicators may provide an improved (graphic) user-interface for assessing (e.g., measuring, interpreting) a quality of a pricing methodology. Moreover, because the backtesting utility 999 is interactive, a user may create new (ad hoc) backtesting methodologies on-the-fly that may be specific to the user's evaluation.

In an embodiment, the backtesting utility 999 may be run on a specialized backtesting engine of the data conversion module 311. The backtesting engine may be configured specifically for providing, generating and displaying (e.g., via the graphic user interface) backtesting analytic indicators using the statistical algorithm shown in FIG. 9A.

The data conversion and distribution system 100 described herein may be used, in one exemplary and non-limiting embodiment, to generate backtesting analytics for one or more instruments, including, but not limited to fixed income securities, equities, options, futures, and other exchange-listed or OTC derivatives. Accordingly, the backtesting utility 999 may be used to assess the differences between evaluated pricing, dealer quotations, prices generated from quantitative or machine learning models and trades observed in the market, all in the realm of electronic trading markets and systems.

As described herein, machine learning models may include algorithms and statistical models that computer systems use to perform specific task(s) without using explicit instructions, determining and relying on patterns and inferences instead. The machine learning may be performed by artificial intelligence. The machine learning algorithms may build a mathematical model based on sample data, known as "training data," in order to make predictions or decisions initiate actions without being explicitly programmed to perform such actions. The machine learning algorithms may be implemented, for example, where it is difficult or infeasible to develop a conventional algorithm for effectively performing a particular task or group of tasks.

The machine learning tasks may be classified into several broad categories such as, for example, supervised learning, semi-supervised learning and unsupervised learning. In supervised learning, a machine learning algorithm may build a mathematical model from a set of data that contains both the input and the desired outputs. In some cases, the input may be only partially available, or restricted to special feedback. Semi-supervised learning algorithms may develop mathematical models from incomplete training data, where a portion of the sample input may not have (identifying) labels.

Classification algorithms and regression algorithms are types of algorithms that may be used in supervised learning. Classification algorithms may be used when output is restricted to a limited set of values. Regression algorithms may have continuous output, meaning they may have any value within a range. Examples of a continuous value include temperature, length, or price of an object.

In unsupervised learning, a machine learning algorithm may build a mathematical model from a set of data which contains only input and no desired output labels. Unsupervised learning algorithms may be used to find structure within the data, like grouping or clustering of data points. Unsupervised learning may discover patterns in the data, and can group the input into categories, as in feature learning. Dimensionality reduction refers to a process of reducing a number of "features", or input, in a set of data.

The backtesting utility 999 may include pre-modeling steps 949, modeling steps 973, and post-modeling steps 983. The influence of various features on the pricing quality may be determined by applying one or more models (e.g., non-statistical and/or statistical models) to determine various metrics and/or statistical measures relating to pricing quality. The results of the modeling may be rendered as various (visual) analytic indicators via a graphic user interface. Moreover, the backtesting utility of FIG. 9A may provide user-flexibility to adjust the backtesting analytic indicators that are displayed (e.g. selection among various analytic indicators, position/movement of one or more of the analytic indicators on a display screen, zooming capability, analytic indicator extraction (e.g., chart extraction), etc.). Yet further, the backtesting utility may be configured such that extracted analytic indicators may be dynamic displayed and may be recalculated and updated in real-time upon any changes in a backtesting methodology configuration.

The one or more pre-modeling steps may include receiving unified data 941 from the data unification module 309 described above with reference to FIG. 3. In an embodiment, the unified data may include data quote counts, transaction counts, and transaction volumes values corresponding to a time window. The time window may be any time/date range and may be selected by a user or determined automatically. The backtesting utility may then determine information timing 943. In particular, the received time window may be broken into any number of time periods. The time periods may be of any length, such as, for example, as short as several minutes to as long as several weeks. For example, the time window may include 84 business days and may be subdivided into four time periods of 21 days each. The backtesting results may be generated for a number of different subsets of securities, time periods and assumptions based on user preferences (e.g., the characteristics of the securities, the distance in time between observations, etc.).

The backtesting utility 999 may apply filtering and/or conditions 945 to the unified data for use in one or more of the modeling steps 973. The filtering and/or conditions applied to the unified data 941 may include, for example, amount outstanding (AMTO), duration, projected trade volume capacity, liquidity score, start date, end data, lookback window and/or trade size. In general, the filtering and/or conditions may include any suitable parameters, including, but not limited to, one or more of first-layer conditions, second-layer conditions, and third-layer conditions described herein.

The first-layer conditions may allow a user to select, without being limited to, one or more securities, portfolios, asset classes, date ranges, specific dates, specific times of day selection, and backtesting analytics.

The second-layer conditions may allow a user to select a number of additional options. For example, the second-layer conditions may include one or more, but not limited to: price type criteria selection for target dependent variables (e.g., yield, duration, dollar volume, amount outstanding, projected trade volume capacity, etc.), price type selection criteria for conditional independent variables (e.g., volume, dollar volume, etc.), trade size selection criteria (e.g., over/under/range/discrete) for the target dependent variables, trade size selection criteria (e.g., over/under/range/discrete) for the conditional independent variables, an optimal institutional trade size calculation and selection parameter, a "lookback" time period selection criteria to set a scope of data point inclusion preferences (e.g., which may be applicable for both target dependent and conditional independent variables), conditional reference features criteria filtering (e.g., AMTO, time since issuance, coupon rate, maturity date, etc.), analytics criteria filtering (e.g., modified duration, effective duration, yield to maturity, yield spread, bid-ask spread, liquidity score, projected price volatility, projected trade volume capacity, etc.), etc.

The third-layer conditions may support real time regeneration of initial back-testing analytics, discrete, range, or multi-selection results generation (e.g., where baseline back-testing specifications may be based on initially enforced first-layer and second-layer conditioning parameters), and security-level attributes selection criteria.

After the applying the filtering and/or conditions 945, the backtesting utility 999 may optionally sort 947 the data in accordance with one or more different criteria. The back-testing utility may sort any and/or all of the data by any quantifiable metric. The backtesting utility may sort the data by any suitable criteria, such as, for example, time durations, price volatility, yield, duration, liquidity score, amount outstanding, etc. In another example, the backtesting utility may sort the backtesting data by one or more of the applied filtering and/or conditions 945.

The data generated in the pre-modeling steps 949 may be referred to as backtesting data. In an embodiment, one or more features of individual securities may be used to generate classifiers of similar securities to include in a back-testing analysis. The one or more features may include asset class, sector, issuer, rating (e.g., investment grade, high-yield), maturity date, amount outstanding, issue date, index constituent, number of quotes, number of transactions, number of holders, number of buyers and sellers, transaction volume, tighter bid/ask spreads, liquidity premiums and others. The influence of features on classifier membership may be determined by applying a statistical or machine learning algorithm based on predefined distance measures or correlations. The classifiers identified by the classifying method may then be used to determine comparable securities to include in the backtesting computations, as well as the one or more features that have influenced prices. The classifying process may determine that one or more securities may be grouped together based on one or more characteristics. The classifying process may classify one security as another type of security based on one or more characteristics. The classifying process may use machine learning. It should be noted that the classifying process described above may also be used to determine liquidity, as described above with reference to FIGS. 1-8.

The backtesting data may be further processed in the modeling steps 973. Features of the buyers, sellers, assets and backtesting methodology may be used to assess a quality of a pricing methodology (e.g., to electronically transact a particular instrument). The modeling steps 973 may include one or more non-statistical models 951 and/or one or more statistical models 959. In some examples, the one or more non-statistical models 951 and the one or more statistical models 959 may be run independently. In some examples, at least a portion of the one or more non-statistical models 951 may use input obtained from an output of the one or more statistical models 959 to determine one or more metrics/statistics.

In one embodiment, the non-statistical models 951 may generate one or more security level metrics 953, generate weekly aggregate statistics 955 (e.g., counts, mean and/or median statistics), and generate time-dependent aggregate statistics 957 (e.g., count, mean and/or median statistics). The security level metrics 953, weekly aggregate statistics 955, and the time-dependent aggregate statistics 957 may be referred to as the metrics and statistics 953, 955, 377. One or more of the metrics and statistics 953, 955, 377 may be generated from the backtesting data. In some examples, one or more of the security level metrics 953, weekly aggregate statistics 955, and the time-dependent aggregate statistics 957 may be generated from both the backtesting data and output from one or more statistical models 959. The one or more statistical models 959 may use statistically significant features 961 from among the backtesting data and generate one or more relationship coefficients 963 based on the statistically significant features. The generated relationship coefficients may be applied, at step 965, for example, to classify one or more securities with other securities having similar features.

The metrics and statistics 953, 955, 377 may include a number of times absolute percent change of trade/CEP is less than 0.25%, which may be calculated by:

$$E\left(\left|\frac{\text{Trade}}{Cep}-1\right|<0.25\%\right), \quad \text{Equation 1}$$

where E may be an enumeration function in which observations are counted.

The metrics and statistics 953, 955, 377 may include a number of times absolute percent change of trade/CEP is less than 0.5%, which may be calculated by:

$$E\left(\left|\frac{\text{Trade}}{Cep}-1\right|<0.50\%\right). \quad \text{Equation 2}$$

The metrics and statistics 953, 955, 377 may include a number of times absolute percent change of trade/CEP is less than 0.75%, which may be calculated by:

$$E\left(\left|\frac{\text{Trade}}{Cep}-1\right|<0.75\%\right). \quad \text{Equation 3}$$

The metrics and statistics 953, 955, 377 may include a number of times absolute percent change of trade/CEP is less than 1.00%, which may be calculated by:

$$E\left(\left|\frac{\text{Trade}}{Cep}-1\right|<1.00\%\right). \quad \text{Equation 4}$$

The metrics and statistics 953, 955, 377 may include a total number of times the back-test found a pair of trades to compare against CEP. The metrics and statistics 953, 955, 377 may include a number of times absolute % change of Trade/CEP was closer than absolute percentage change of current trade over previous trade, which may be calculated by:

$$E\left(\left|\frac{\text{Trade}}{Cep}-1\right|<\left|\frac{\text{Trade}_t}{\text{Trade}_{t-1}}-1\right|\right). \quad \text{Equation 5}$$

The metrics and statistics 953, 955, 377 may include a win ratio of CEP closer to observations, which may be calculated by:

$$\frac{CEP\ \text{CLOSER}}{\text{OBSERVATION}}. \quad \text{Equation 6}$$

The metrics and statistics 953, 955, 377 may include a distance reduction percentage providing a distance reduced between the last trade and the new trade if CEP was used in place of the last trade as quote, which may be calculated by:

$$1-\frac{\sum\left|\frac{\text{Trade}}{Cep}-1\right|}{\sum\left|\frac{\text{Trade}_t}{\text{Trade}_{t-1}}-1\right|}. \quad \text{Equation 7}$$

The metrics and statistics 953, 955, 377 may include an average absolute value of the percent change of previous trade to the current trade $$(Y_i^A)$$

and CEP to the current trade $$(Y_i^B)$$

per week, which may be calculated by:

$$Y_i^A=\frac{\sum_1^N\left|\frac{DB_t}{DB_{t-\Delta t}}-1\right|}{N},\ \{i \mid Mon_i^{Market\ open}\le t\le Fri_i^{Market\ close} \quad \text{Equation 8}$$

$$Y_i^B=\frac{\sum_1^N\left|\frac{DB_t}{CEP_t}-1\right|}{N},\ \{i \mid Mon_i^{Market\ open}\le t\le Fri_i^{Market\ close}. \quad \text{Equation 9}$$

The metrics and statistics 953, 955, 377 may include an average absolute percent change per time delta of the trade to the current trade $$(Y_i^A)$$

and CEP to the current trade $$(Y_i^B,$$

which may be calculated by:

$$Y_i^A=\frac{\sum\left|\frac{DB_t^*}{DB_{t-\tau}}-1\right|}{N},\ \text{where } [t-(t-\tau)]=i\times\Delta t \quad \text{Equation 10}$$

$$Y_i^B=\frac{\sum\left|\frac{DB_t^*}{CEP_t}-1\right|}{N},\ \text{where } DB_t^*=DB_t^* \text{ in } Y_i^A. \quad \text{Equation 11}$$

The one or more statistical models 959 may also be utilized to generate one or more optimal trade size (OTS) projections 967 at the security level based on the grouping in step 965. The one or more statistical models 959 may also be utilized to generate one or more market-implied bid-ask spreads 969, as well as one or more comparable bond groupings 971.

The OTS projections may reflect a minimum transaction size amount that may demonstrate statistically significant variation in market-implied bid-ask spreads at points below the OTS versus the trading behavior deterministic of market-implied bid-ask spreads at points above the OTS. The OTS may be considered a security-specific point of equilibrium, where stability in market data inputs is computed through statistical significance testing of associated sample means.

The OTS projections may be used for one or more practical applications. For example, the OTS may be used as a separation point, where filtered trading activity above the OTS may be considered reliable for consumption into derived analytics, including pricing applications, liquidity risk measurements, bid-ask spread determinations, and comparable bond proxies.

The OTS projections may be a filtering threshold that characterizes the essence of trading characteristics for a security at the bid, mid, and offer side of the market. Effectively, the OTS may reflect the minimum transaction size at which trading activity above this level, at any trade size, demonstrates a statistically insignificant variation in market prices. The OTS may be considered a security-specific point of equilibrium for each representative side of the market, where stability in market data inputs may be computed through statistical significance testing of associated sample means. If the OTS can be determined for each security, whereby trades occurring in sizes greater than or equal to the OTS are demonstrably "similar" in nature, these trade observations may be considered reflective of the institutional market.

The OTS may be used as a separation point, where filtered trading activity above and/or below the OTS could be considered reliable for consumption into derived analytics, including pricing applications, liquidity risk measurements, bid-ask spread determinations, and comparable bond proxies.

For instance, when generating a range of fixed income analytics (e.g., liquidity risk measurements, bid-ask spreads, valuations, etc.) for fixed income securities intended to represent institutional market dynamics, filtering by OTS may improve the quality in this representation. Conversely, while trading activity below the OTS can be considered more representative of retail market dynamics, these inputs may be deterministic of size-adjusted variations in fixed income analytics. For example, these inputs may reflect incremental liquidity risk premiums applied by market participants to incorporate the risk mitigation tendencies driving trading behaviors and the realized economics of supply-and-demand.

Referring now to FIG. 9B, an exemplary illustration of a relationship between dealer buys and interdealer trades that have occurred within a close proximity of each other is shown. FIG. 9B illustrates an example calculation that may be performed using the backtesting utility 999 described above with reference to FIG. 9A. In the example shown, price movements of dealer buys (DB) to interdealer traders (ID) (i.e., DB2ID) and price movements of dealer sells (DS) to ID (i.e., DS2ID) may be measured from five distinct trade size groups. Group 1 may include trade sizes of 0-50K. Group 2 may include trade sizes of 50K-250K. Group 3 may include trade size of 250K-500K. Group 4 may include trade sizes from 500K-1M. Group 5 may include trade sizes over 1M. Each trade pair in Groups 1-5 may have occurred within 60 minutes prior to an associated ID trade of 1M+ in size.

In this example, the movements of DB2ID and DS2ID in Group 5 may be considered the corresponding "Benchmark Groups," to which all other trade categories may be compared. The example includes trading activity for U.S. investment grade corporate bonds over a twelve-month period from Sep. 1, 2018 to Aug. 31, 2019. If trade sizes from Groups 1-4 are statistically indifferent to trade sizes in the Group 5 benchmark group, they may result in statistically insignificant mean differences at the 5% level (i.e., 95% confidence interval). In other words, if trades occurring in sizes between 0-50K (Group 1) are to be considered similar to trades occurring in sizes of 1 MM+ (Group 5), their mean differences should not be statistically different from each other, with 95% confidence.

A t-statistic less than approximately +/−1.96 may indicate the sample means are not statistically different from each other at the 95% confidence level. This may suggest that trade sizes above the lower boundary of the category are indicative of the mean response observed in the 1 MM+ benchmark sample. As shown in FIG. 9B, based on the backtesting results for a sample of U.S. Investment Grade Corporate Bonds, the OTS for Dealer Buys may reasonably be set to 250K, while the OTS for Dealer Sells may be reasonably set to 500K. It should be noted that each distribution of observations may be reduced by applying upper and lower boundaries of 90% and 10% of the sample population in order to reduce the effect of outliers.

While model specifications may vary depending on the instrument, sector, or asset class being analyzed, a critical ingredient to measuring OTS is trading data. It may be easier to measure OTS in bonds with a large number of trade pair observations due to the large amount of data to analyze. One or more methods of extrapolation may be used to analyze OTS in a wider population of bonds without observed trading activity. For example, one or more modeling concepts (e.g., measuring the statistical relationships between a variety of relevant features associated with the bond) may be used to enable a security-level OTS projection. The relevant features associated with the bond may include, for example, issuer, sector, asset class, amount outstanding, coupon, maturity, duration, yield, spread, price level, time since issuance, projected volatility, projected trade volume capacity, projected turnover ratio, liquidity scores, etc.

The one or more non-statistical models 951 and the one or more statistical models 959 may also be used to calculate an optimal institutional trade quantity. For example, an average or median difference between trades of different quantities may be calculated in order to identify the trade quantity percentiles with statistically indistinguishable differences in price when compared to the subsequent trade of a similar quantity.

The one or more non-statistical models 951 and/or the one or more statistical models 959 may also be used to compute the difference between a security's bid price and its ask price (i.e., the bid-ask spread) according to the security's traded prices. In financial markets, the ask price (or offer price) may reflect the value at which a market participant would sell a security, whereas the bid price reflects the value at which a market participant would purchase a security. Accordingly, the difference between the bid price and ask price is the bid-ask spread. In contrast to securities with wide bid-ask spreads, securities with tighter the bid-ask spreads may result in lower overall transaction costs, lower relative liquidity risk, and lower relative uncertainty in valuation modeling. Cross-sectional variations in bid-ask spreads may be negatively correlated with an associated trade size. For example, an actively traded bond may be reflected by a dealer quoting a two-sided market of 100.00 bid and 100.25 ask at a trade size of $1M on each side of the market. That same dealer may quote a wider two-sided market in the event that the trade size preference shrinks to $10K on each side of the market, resulting in, for instance, a two-sided market of 99.75 bid and 100.50 ask being quoted.

In illiquid markets such as the corporate or municipal bond markets, the bid-ask spread may not be readily available or may only be provided to a limited number of market participants through dealer quotations. As a result, it may be necessary to utilize a statistical or machine learning algorithm to produce an estimate of the security's bid-ask spread from directly observable trade data. The bid-ask spreads calculated by the one or more non-statistical models 951 and the one or more statistical models 959 may also be used to adjust or offset an evaluated price, quoted price or trade price in order to generate an implied bid price, mid-price or ask price from any observed trade.

In an example, the OTS may be used to determine the market implied bid-ask spreads for the institutional side of the market. As shown in Table 1, bid-mid and ask-mid spreads may be used to impute market implied bid-ask spreads at each of the trade size groups described above with reference to FIG. 9B.

TABLE 1

| Market Implied Bid-Ask Spreads | | | |
|---|---|---|---|
| Trade Size | Avg. Bid Spread to Mid | Avg. Ask Spread to Mid | Mkt Implied Bid-Ask Spread |
| 0-50K | 0.165 | 0.193 | 0.358 |
| 50K-250K | 0.138 | 0.157 | 0.295 |
| 250K-500K | 0.112 | 0.101 | 0.213 |
| 500K-1MM | 0.099 | 0.085 | 0.184 |
| OTS | 0.112 | 0.085 | 0.198 |

Similar to the quantitative approaches to project OTS for securities without observable trade data described above, concepts in constructing statistical relationships (as described herein) may be applied to extrapolate market implied bid-ask spread to the universe of applicable fixed income securities in order to systematically generate a security-level market implied bid-ask spread projection. One or more features of the securities may be used to extrapolate the market implied bid-ask spread including, for example, the OTS projections, issuer, sector, asset class, amount outstanding, coupon, maturity, duration, yield, spread, price level, time since issuance, projected volatility, projected trade volume capacity, projected turnover ratio, liquidity scores, etc. To assist in pattern recognition and determining statistical relevancy/relationships/correlations of these inputs to our target outputs, machine learning algorithms of the present disclosure may be used to identify optimal associations (which may be defined through out-of-sample backtesting comparisons).

The OTS and market implied bid-ask spread projections may enable the identification of comparable bond proxies for securities. In this context, comparable bond proxies, and, in aggregate form, comparable bond groupings, may establish a clear advantage in the administration of systematically applying observable market data inputs to fixed income securities without observable trading activity. Determinations for the construction of comparable bond proxy representations may be identified through statistical and machine learning algorithms of this disclosure (e.g., regression analysis, random forest, gradient boosting, etc.). The comparable bond selection rules may be defined through out-of-sample backtesting comparisons.

The one or more non-statistical models 951 and/or the one or more statistical models 959 may be used to determine differences between evaluated pricing, dealer quotations, prices generated from quantitative or machine learning models, proximity to a transaction, and trades observed in the market. These computations may be run and aggregated for each type of instrument independently. For example, one or more computations may be performed on municipal general obligation bonds independently from (and simultaneously to) investment grade financial sector bonds.

One or more post-modeling steps 983 may be performed by the backtesting utility 999. The outputs from the modeling steps 973 may be utilized to generate one or more backtesting analytic indicators. The analytic indicators may be generated as one or more visuals 975, for example, on a graphical user interface of a display screen (e.g., user display interface 611 of remote user device 107). Examples of the generated visuals 975 are described below.

It should be noted that the analytic indicators may be dynamically updated in real-time in response to user input or automatically (e.g., in response to updates to parameters such as live market data) after the visuals are generated in step 975. The user input may include selection, manipulation and/or extraction of various analytic indicators on a display screen. In some embodiments, user input may be utilized to adjust one or more filters and/or conditions for the backtesting analysis, directly among the backtesting analytic indicators displayed on a results window (of the display screen). Responsive to the user input directly into the results window, the backtesting utility may dynamically update the visuals 977. Notably, the updating of the visuals (step 977) may occur without switching windows or any additional pop-up windows (e.g., from a results window to a configuration window).

To perform the updated analysis, the backtesting utility may apply updated filtering and/or conditions 979 indicted by the user update (from the results window) or automatically from an external data source, to the one or more non-statistical models and/or the one or more statistical models 959 and automatically perform a recalculation 981 of the backtesting analysis based on the updated filtering and/or conditions (step 977). The backtesting utility may then generate updated visuals (graphical display(s)) directly into the same results window, thereby repeating step 975 with the updated backtesting analytic indicators. In this manner, the backtesting utility may provide real time regeneration of initial backtesting analytic indicators and dynamic updating of the generated visuals 975 based on any user-driven or system-driven adjustments, all without changing windows or requiring additional windows for user input.

The output from the data conversion module 311, including one or more backtesting analytic indicators may be transmitted via the data transmission module 315 of the virtual machine 103 to the data distribution device 105 via one or more secure communications over network 108.

Figure 10:
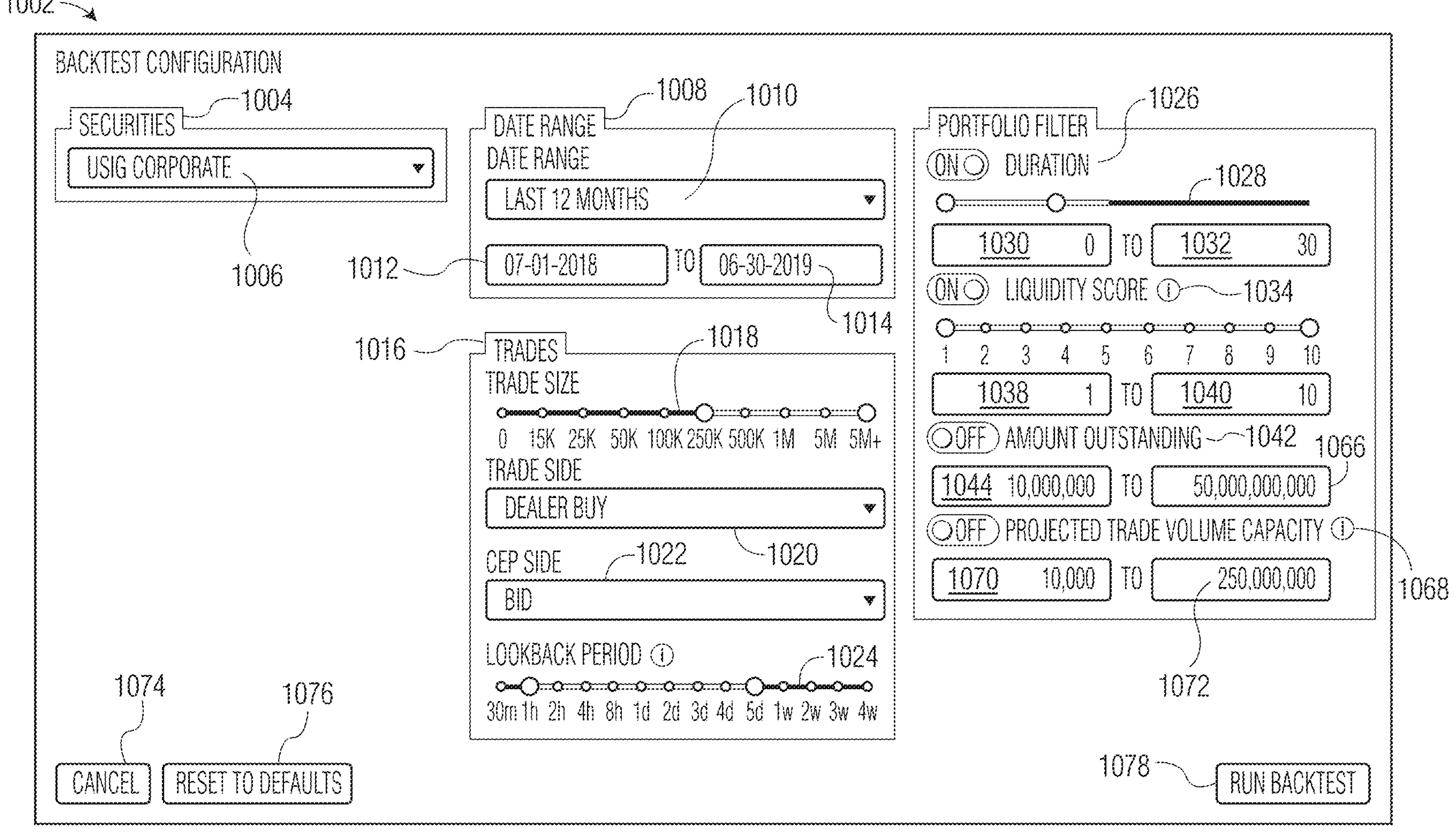
FIG. 10 is a schematic representation of a backtest configuration graphical user interface.

Referring now to FIG. 10, a schematic representation of a backtest configuration graphical user interface 1002 is shown. The backtest configuration graphical user interface 1002 may allow a user to select one or more securities 1004 and apply one or more of the filtering and/or conditions 945 described above with reference to FIG. 9A. In an embodiment, a user may select one or more securities, for example, using a securities dropdown menu 1006. The securities dropdown menu 1006 may allow a user to select, with for example, a mouse cursor or touch input, one or more securities to analyze. The one or more securities may include, for example: USD Investment Grade (USID) Corporate, USD High Yield (USHY) Corporate, US Municipal (General Obligation), US Municipal (Housing), US Municipal (Other), US Municipal (Pre-Refunded/ETM), US Municipal (Revenue), US Municipal (Taxable), etc. A Custom option may be selected, which may include a user-specified list of Committee on Uniform Securities Identification Procedures (CUSIP) securities.

The backtest configuration interface 1002 may also allow a user to apply one or more of the filtering and/or conditions 945 to the selected securities. For example, a user may select a date range 1008. The user may select a specific date range from the present day through a date range dropdown menu 1010. Alternatively, the user may select a specific start date 1012 and end date 1014. The user may also select one or more options for trades 1016. The user may select different trade sizes using a trade size slider bar 1018. The user may select a specific trade side (e.g., dealer buy, interdealer, and dealer sell) using a trade side dropdown menu 1020. The user may also select a specific continuous evaluated pricing (CEP) side (e.g., bid, ask, and mid) using a CEP side dropdown menu 1022. The user may select a specific lookback period using a lookback period slider bar 1024. The lookback period may be a length in time to be used for calculations and/or comparisons in the one or more non-statistical models 951 and/or the one or more statistical models 959.

The backtest configuration interface 1002 may also allow a user to apply one or more of the filtering and/or conditions 945 to portfolios. For example, the user may turn a duration filter on or off 1026. The length of duration may be selected using a duration slider bar 1028 or a specific start time 1030 and a specific end time 1032 may be entered. The user may turn a liquidity score filter on or off 1034. The liquidity score may be relative to various comparable security groupings. For example, a company's corporate bond may rank very high against the universe of corporate bonds, but may appear lower relative to outstanding bonds of the issuer. The liquidity score may be selected using a liquidity score slider bar 1036 or a specific low liquidity score 1038 and a specific high liquidity score 1040 may be entered. A liquidity score of 1 may be least liquid and a liquidity score of 10 may be most liquid.

The user may turn an amount outstanding filter on or off 1042. A specific low amount outstanding 1044 and a specific high amount outstanding 1046 may be entered.

The user may turn a projected trade volume capacity filter on or off 1068. The projected trade volume capacity may represent a forward-looking projection of daily trading volume capacity for a security. The figure may reflect estimates based on an individual security's recent time-weighted historical trading activity (i.e., Active Trading Estimate) as well as an incremental capacity estimated through statistical analysis by incorporating factors deemed to influence future trading activity (i.e., Surplus Potential Estimate). The Surplus Potential Estimate forecast may be used to estimate the potential activity in the marketplace for securities (e.g., fixed income) that generally do not trade but have the ability to trade. The trade volume projections may be used to evaluate prices in order to reflect a potential dollar volume traded. A specific low projected trade volume capacity 1070 and a specific high projected trade volume capacity 1072 may be entered.

The backtest configuration interface 1002 may allow a user to cancel 1074, reset all inputs to default 1076, and run 1078 the backtesting utility 999 described above.

Figure 11:
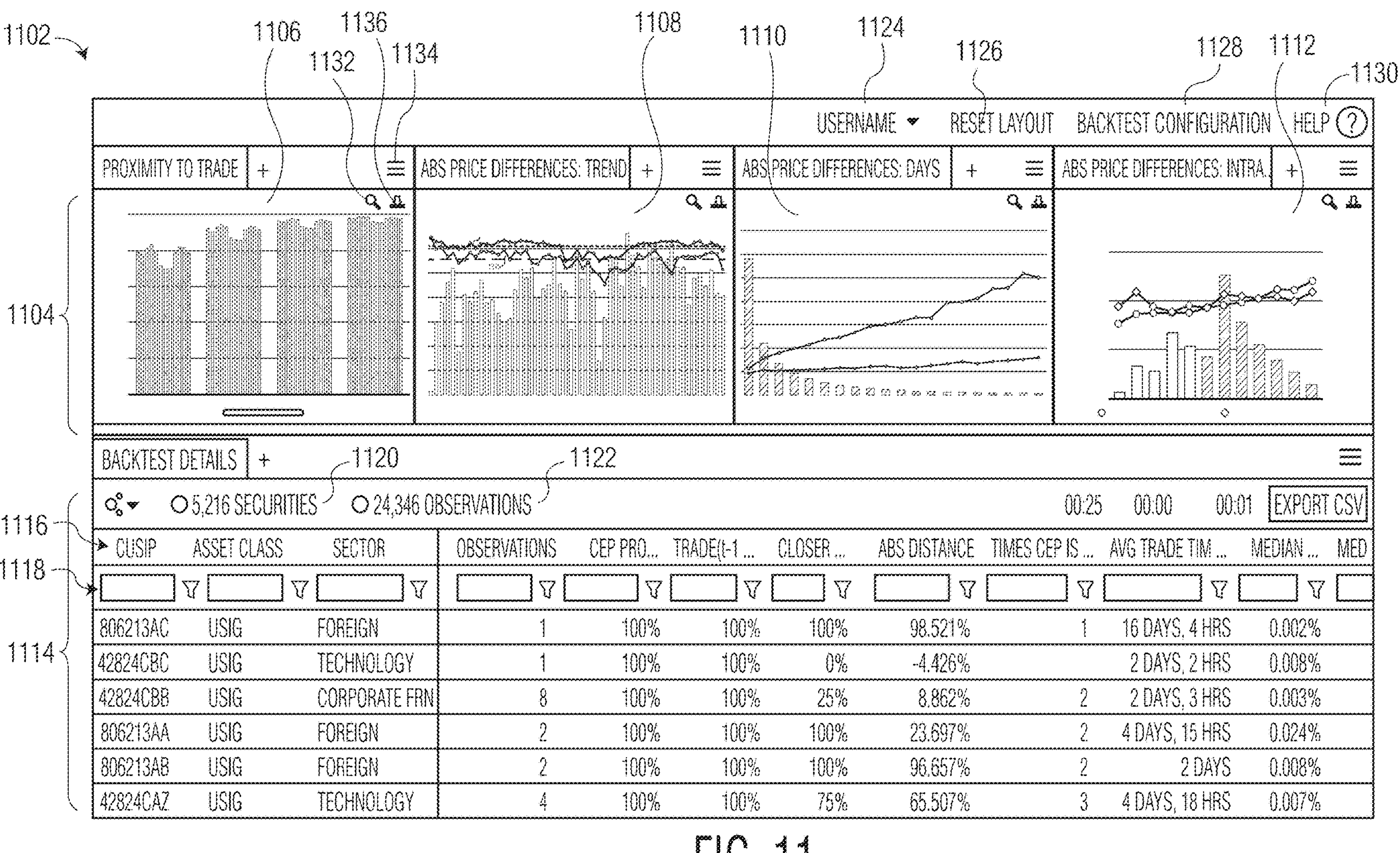
FIG. 11 is a schematic representation of a graphical user interface illustrating a results dashboard.

Referring now to FIG. 11, a schematic representation of a graphical user interface illustrating a results dashboard 1102 is shown. The results dashboard 1102 may display one or more interactive visuals 1104 generated in step 975 as described above in reference to FIG. 9A. In an example, the results dashboard 1102 may show four graphs, but any number of graphs may be displayed in any order. In addition, each graph of the one or more interactive visuals 1104 may be expanded to a larger size and minimized using a magnifier feature 1132 (shown in the upper right corner of each graph of the one or more interactive visuals 1104). A menu icon 1134 may allow user to sort tabs, move the tab position, zoom in on a region of the graph, create a new region of the graph, move a region into a new window, remove a region, set a region as a principal region, and any other desired functionality. An extract icon 1136 may allow a user to extract a graph to another program and/or download the underlying backtesting data.

A first graph 1106 may show proximity to trade, a second graph 1108 may show a trend analysis of absolute (ABS) percentage price difference, a third graph 110 may show an ABS percentage price difference and days between trades, a fourth graph 112 may show an ABS percentage price difference and intraday trade pairs. Each of these graphs are described in additional detail below.

The results dashboard 1102 may also display backtest details 1114. The backtest details 1114 may include the backtesting data used in the modeling steps 973 described above with reference to FIG. 9A. The backtest details 1114 may further include one or more categories 1116, such as, for example, CUSIP identification, asset class, sector, number of observations, a liquidity score of the security in its asset class, a duration of the security, and the one or more of the security level metrics 953, weekly aggregate statistics 955, and the time-dependent aggregate statistics 957 described above. For example, the one or more categories 1116 may include the number of times absolute percent change of trade/CEP is less than 0.25%, the number of times absolute percent change of trade/CEP is less than 0.25%, the number of times absolute percent change of trade/CEP is less than 0.5%, the number of times absolute percent change of trade/CEP is less than 1.00%, the total number of times the backtest found a pair of trades to compare against CEP, the number of times absolute % change of Trade/CEP was closer than absolute percentage change of current trade over previous trade, the win ratio of CEP closer to observations, and the distance reduction percentage providing a distance reduced between the last trade and the new trade if CEP was used in place of the last trade as quote. It should be noted that any number of additional categories may be included based on the type of backtesting data being modeled and the filtering and/or conditions 945 applied.

One or more filters 1118 may be applied to each category, which in turn, may cause the one or more interactive visuals 1104 to be updated as described above with reference to step 977. The updates may be periodic or continuous/automatic. The one or more filters 1118 may correspond to one or more of the second-layer conditions and the third-layer conditions described above. The one or more filters 1118 may provide refined backtesting parameters that cause the backtesting utility 999 to generate new on-demand calculations from the initial set of backtesting configurations. The one or more filters 1118 may include any parameter applicable to each category, for example, specific values or ranges. New results may be rapidly generated in real time as each filter of the one or more filters 1118 is applied and/or modified. In other words, the system may modify the one or more interactive visuals 1104 and the backtest details 1114 without returning to the backtest configuration interface 1002 described above with reference to FIG. 10 and without having to re-run the backtesting utility 999 from the start. Considering the amount of data being analyzed, this feature may save a large amount of computing time and power, and improve overall system efficiency.

The backtest details 1114 may also provide a total number of securities analyzed 1120 and a total number of observations reviewed 1122, as well as any other desired metric. All of the information presented in the backtest details 1114 may be exported as a data table compatible with one or more external programs at any point of filtering by the one or more filters 1118.

The results dashboard 1102 may display a user name 1124. The results dashboard 1102 may allow the user to reset the layout 1126 of the one or more interactive visuals 1104 and/or the backtest details 1114. The results dashboard 1102 may allow a user to return 1128 to the backtest configuration 1002 and may provide a user help 1130, if needed.

Figure 12:
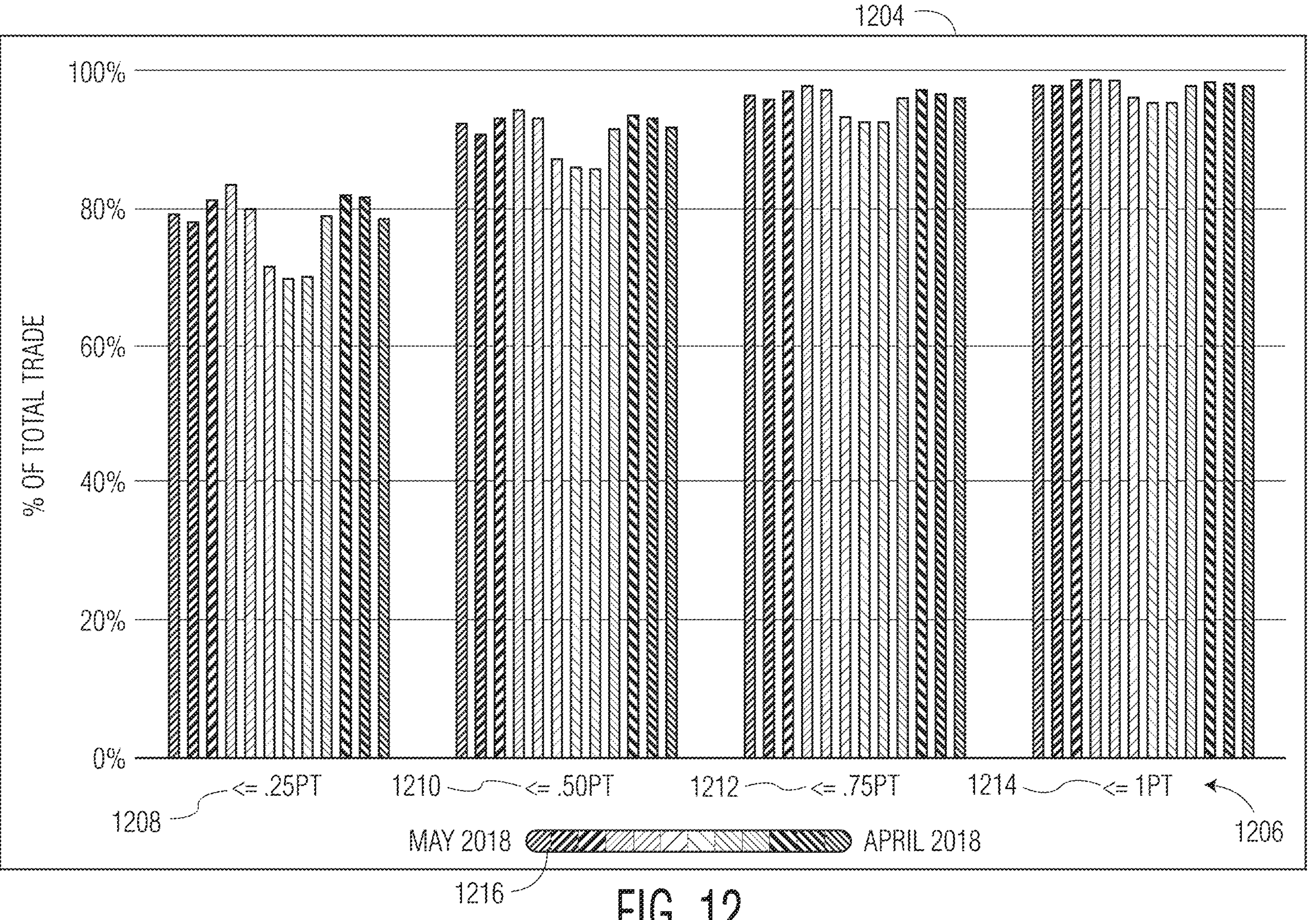
FIG. 12 is a first example graph generated by the system of the present disclosure illustrating proximity to trade.

Referring now to FIG. 12, a first example graph 1202 is shown. The first example graph 1202 may illustrate proximity to trade. The first example graph 1202 may be displayed in the one or more interactive visuals 1104. The proximity to trade graph may summarize a frequency of occurrences when a CEP is within a certain threshold of an associated trade at the same point in time. In other words, the proximity to trade graph may quantify how often evaluated prices appear within a certain proximity to a next observed trade price. For example, a backtesting simulation run by the backtesting utility 999 may generate a sample size of 100 observations. If evaluated prices are within a range of (+/−) 0.50% to the next trade prices on 75 of those observations, this would result in a proximity to trade measurement of 75%.

Proximity to trade may be calculated by:

$$PT_{(range)} = \sum_{i=l}^{n}\left(\frac{TC_i \leq \text{range}}{n}\right), \qquad \text{Equation 12}$$

where $PT_{(range)}$ is a proximity to trade result, where the evaluated prices appear within an acceptable range of outcomes, $$TC_i = \frac{(TRD_t - CEP_t)}{TRDt}, \qquad \text{Equation 13}$$

where $TRD_t$ is a trade price at time t, $CEP_t$=evaluated price at time t, i is each individual outcome comprised within the total number of observations n, n is a total number of outcomes i creating the set of observations included within the test, and range=defines the range of acceptable outcomes included within testing parameters, where each individual outcome i from the set of observations n is measured against.

The first example graph 1202 may show a percentage of total trade on a y-axis 1204 and different point ranges on an x-axis 1206. The different point ranges may be, for example, ≤0.25 PT 1208, ≤0.50 PT 1210, ≤0.75 PT 1212, and ≤1 PT 1214. In each point range of the different point ranges, bars of different colors or shading may show a percentage of total trade within that point range over a date range 1216. The date range shown 1216 at the bottom of the graph may have a corresponding coloring or shading as the bars.

Figure 13:
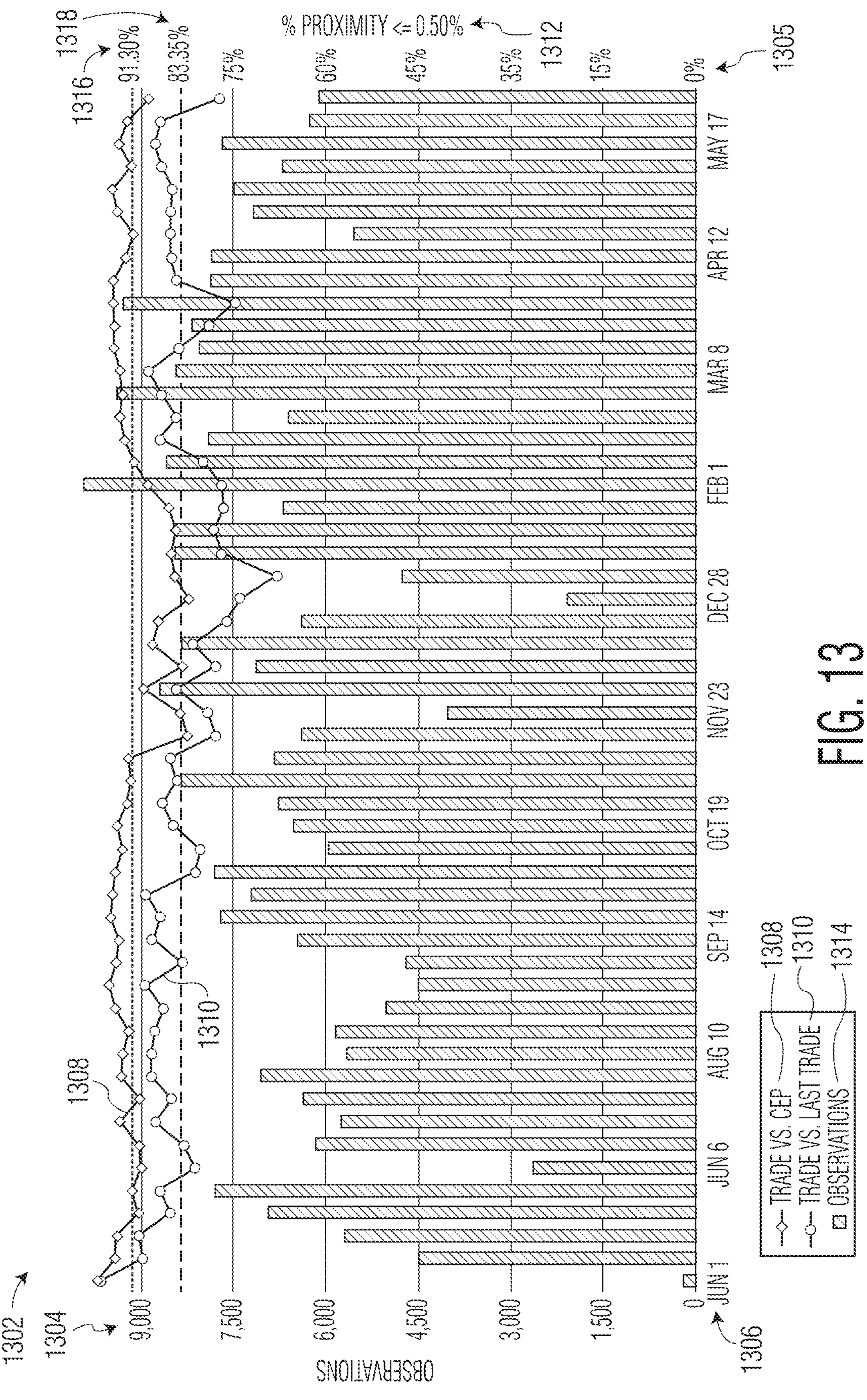
FIG. 13 is a second example graph generated by the system of the present disclosure illustrating a proximity to trade by week.

Referring now to FIG. 13, a second example graph 1302 is shown. The second example graph 1302 may illustrate a proximity to trade by week. The second example graph 1302 may compare a proximity to trade of trade vs. CEP 1308 and a proximity to trade of trade vs. last trade 1310 for a particular percentage of proximity 1312, and may show a number of observations per week 1314. The second example graph 1302 may show a number of observations on a first y-axis 1304, a proximity to trade on a second y-axis 1305, and different dates on an x-axis 1306. The second example graph 1302 may show a median proximity to trade of trade vs. CEP 1316 and a median proximity to trade of trade vs. last trade 1318.

Figure 14:
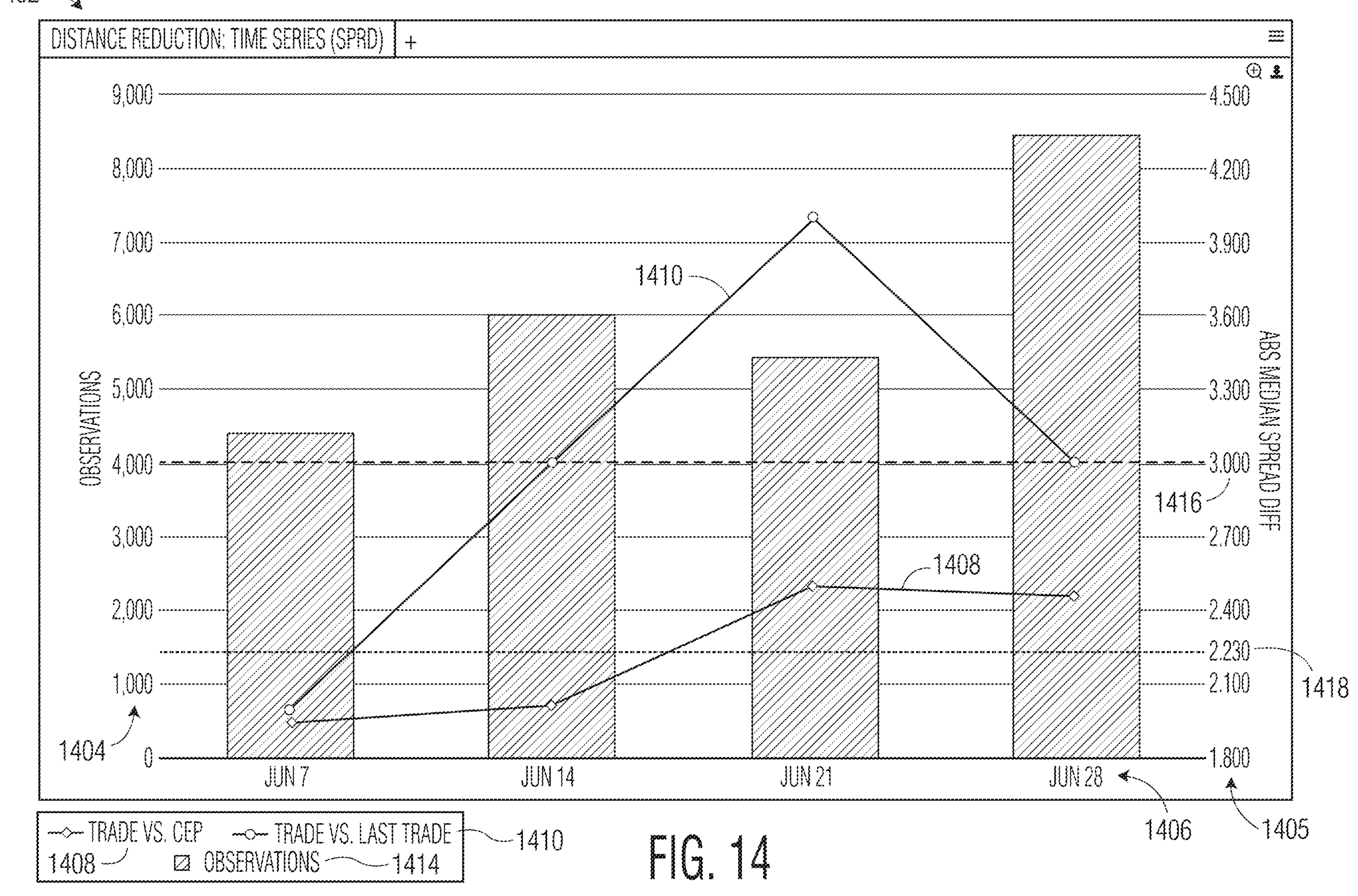
FIG. 14 is a third example graph generated by the system of the present disclosure illustrating a distance reduction time series trend analysis.

Referring now to FIG. 14, a third example graph 1402 is shown. The third example graph 1402 may illustrate a distance reduction time series trend analysis. The distance reduction time series trend analysis may include time series backtesting analysis showing, for all securities eligible each day in a time period, median absolute percentage price differences between: 1) a CEP at a time ($T_0$) to a next trade at the time ($T_0$); and 2) a prior trade at time ($T_{t-n}$) to a next trade at the time ($T_0$). The third example graph 1402 shows the distance reduction time series trend analysis for an absolute median spread difference, but similar graphs may be generated for other variables, such as an absolute median yield difference, for example.

The third example graph 1402 may show a number of observations on a first y-axis 1404, an absolute median spread difference on a second y-axis 1405, and different dates on an x-axis 1306. The third example graph 1402 may compare trade vs. CEP 1408 and trade vs. last trade 1410 and may show a number of observations per date 1414. The third example graph 1402 may show a median value for trade vs. CEP 1416 and a median value for trade vs. last trade 1418.

Figure 15A:
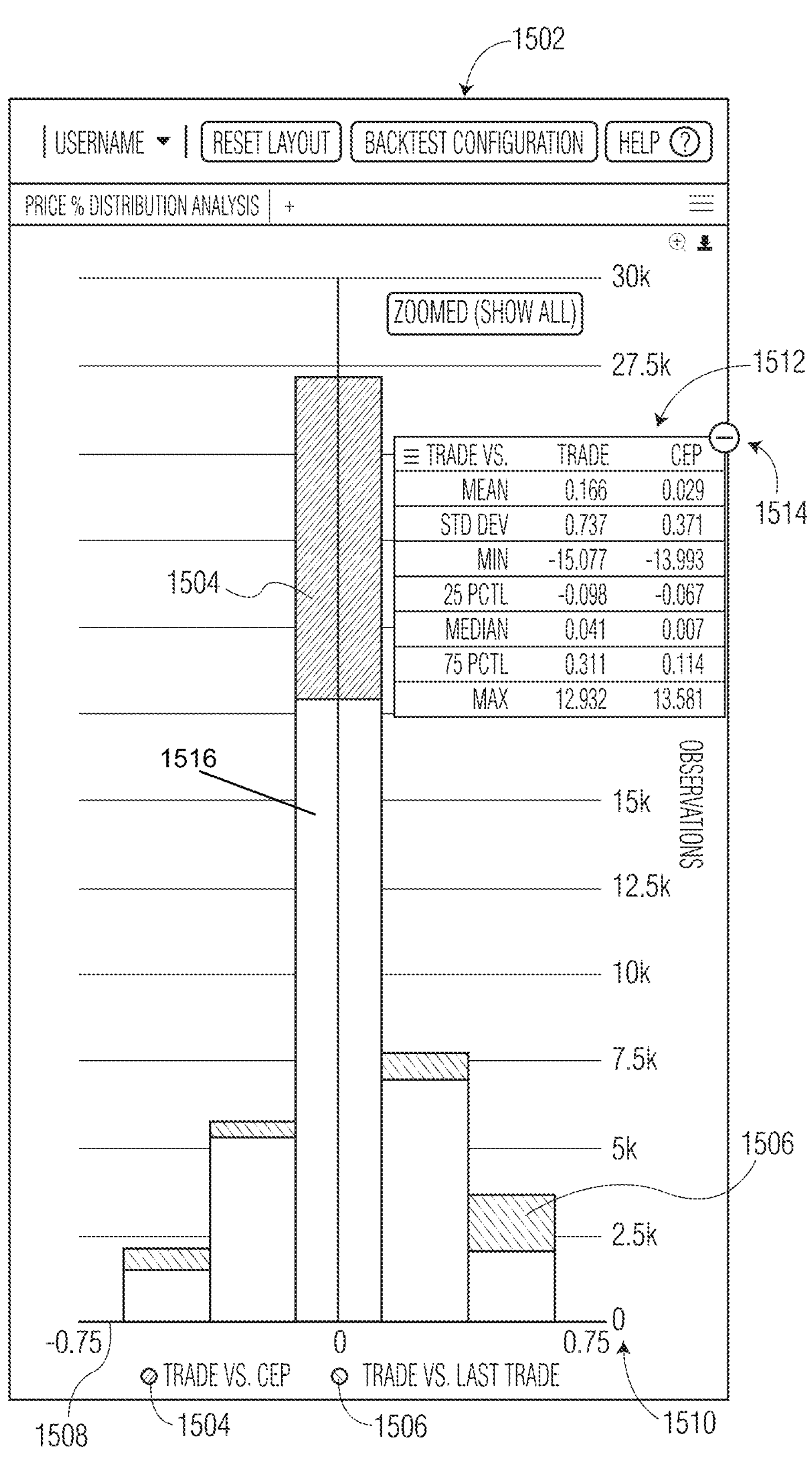
FIGS. 15A-15D are illustrations of different embodiments of a fourth example graph generated by the system of the present disclosure illustrating price percentage distribution analysis.
Figure 15B:
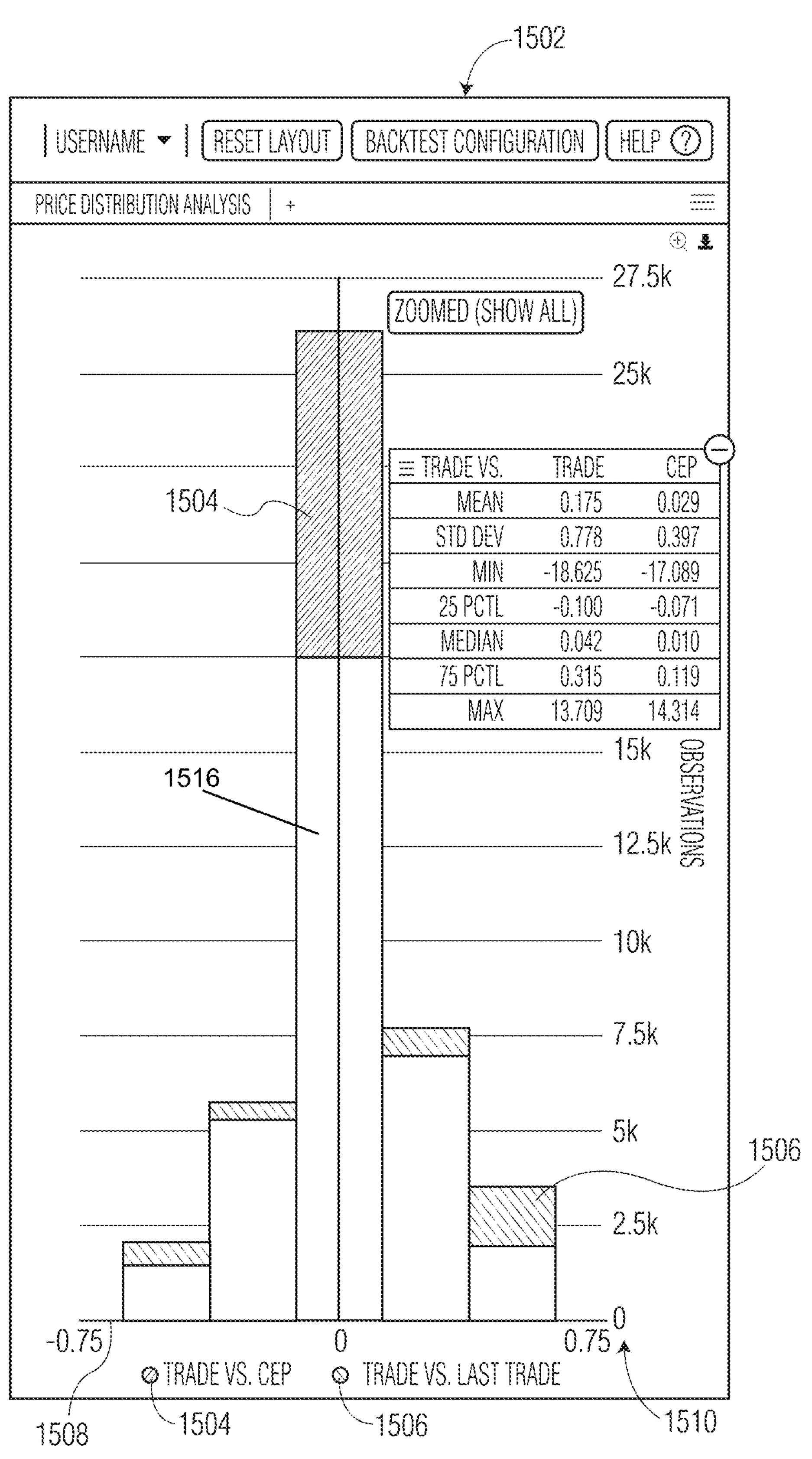
Figure 15C:
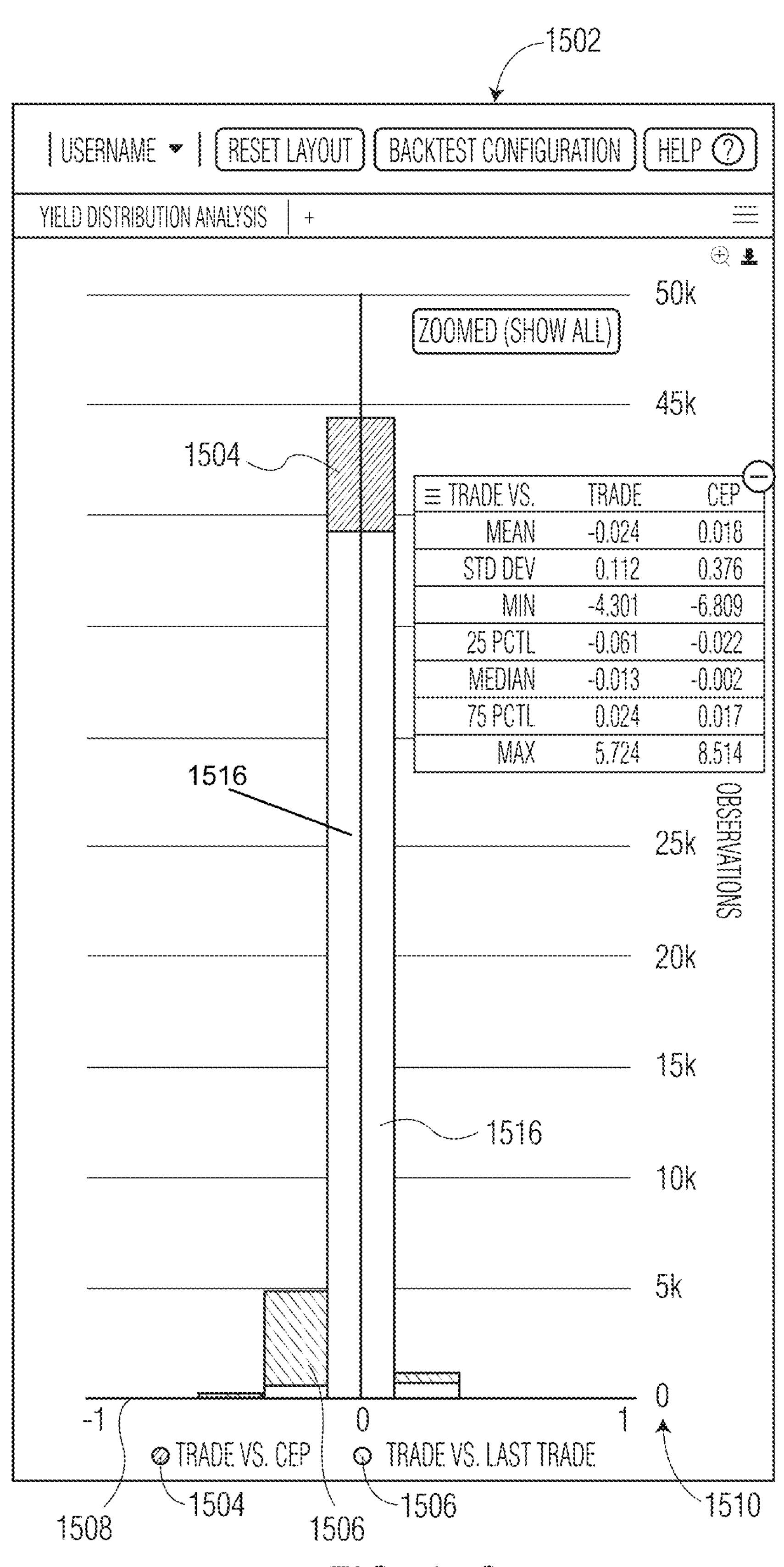
Figure 15D:
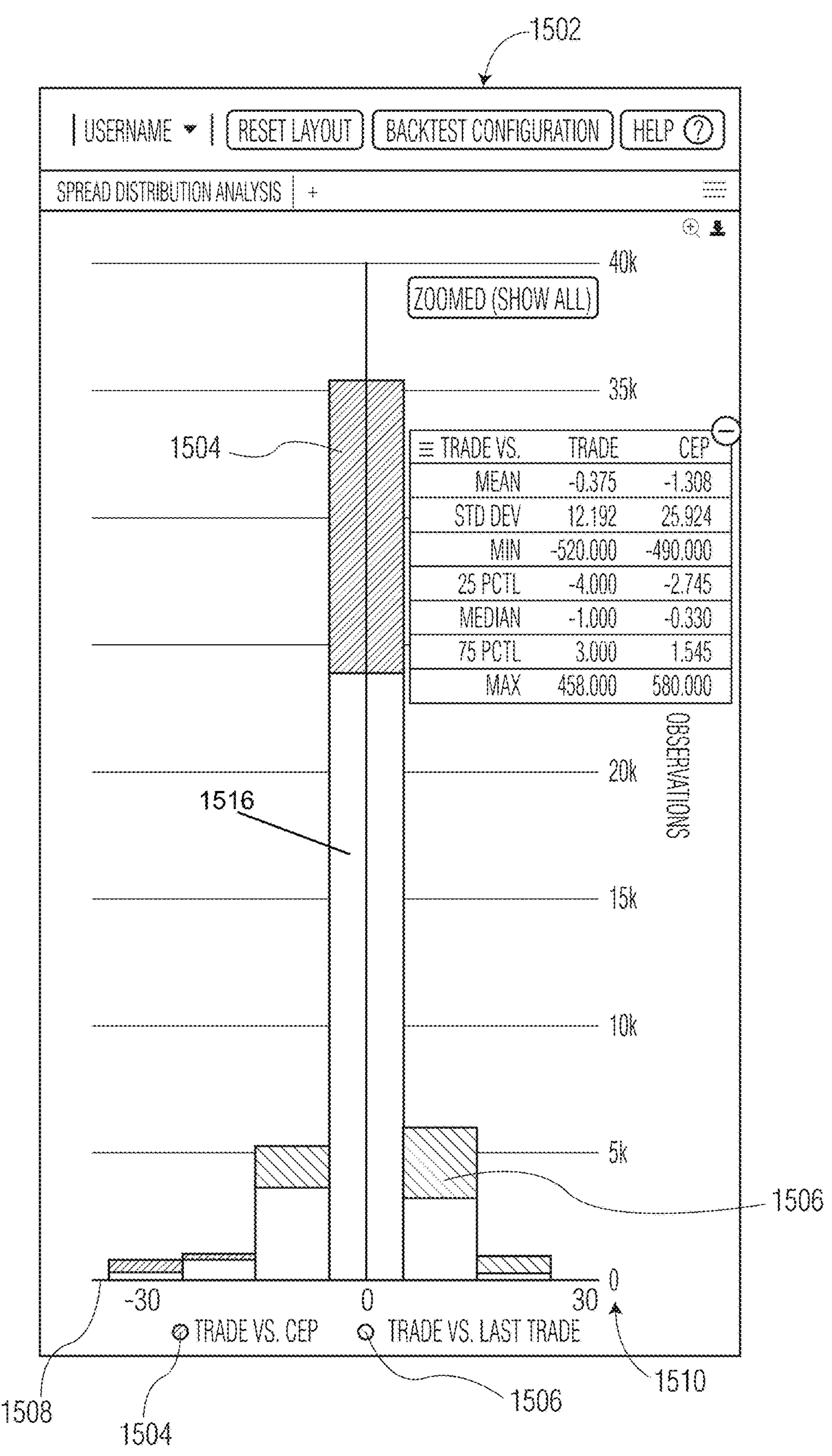

Referring now to FIGS. 15A-15D, different embodiments of a fourth example graph 1502 is shown. The fourth example graph 1502 may illustrate a distribution analysis. The fourth example graph 1502 may display the distribution of a difference between the CEP price and the previous trade 1504 and a difference between the current trade and the previous trade 1506. FIG. 15A shows a price percentage distribution analysis, FIG. 15B shows a price distribution analysis, FIG. 15C show a yield distribution analysis, FIG. 15D shows a spread distribution analysis. Each embodiment of the fourth example graph 1502 may use CEP pricing data as well as transaction data. A user may select one or more of the embodiments of the fourth example graph 1502 to be displayed. The x-axis 1508 may represent distribution values and the y-axis 1510 may be a count of observations. A legend 1512 may display the summary statistics for the same dataset. The legend 1512 may be expanded to any size and may be minimized using a button 1514. As shown in FIGS. 15A-15D, the difference between the CEP price and the previous trade 1504 may be shown in a first color/shading and the difference between the current trade and the previous trade 1506 may be shown in a second color/shading. A third color/shading 1516 may be used to show where the first color/shading and the second color/shading overlap.

The percentage distribution analysis may be shown as a distribution plot (e.g., a histogram) illustrating a difference between the observations of CEP and a price of a next trade and the observations a price of a prior trade to a price of a next trade as actual changes, not absolute changes. In other words, the more observations of previous trade or CEP are closer to 0, the less different it is from the next trade and the more accurate the respective price evaluation metric may be. The actual change may be used as a way of observing and testing bias. For example, if most of the mass of CEP observations is to the left of the 0 value on the chart (i.e., negative), this may suggest negative movement on average (i.e., downward movement on average from the CEP to the next trade), the CEP may be too high on average. If most of the mass of CEP observations is to right side of the 0 value on the chart (i.e., positive), the CEP may be underestimating trade price on average.

Figure 16:
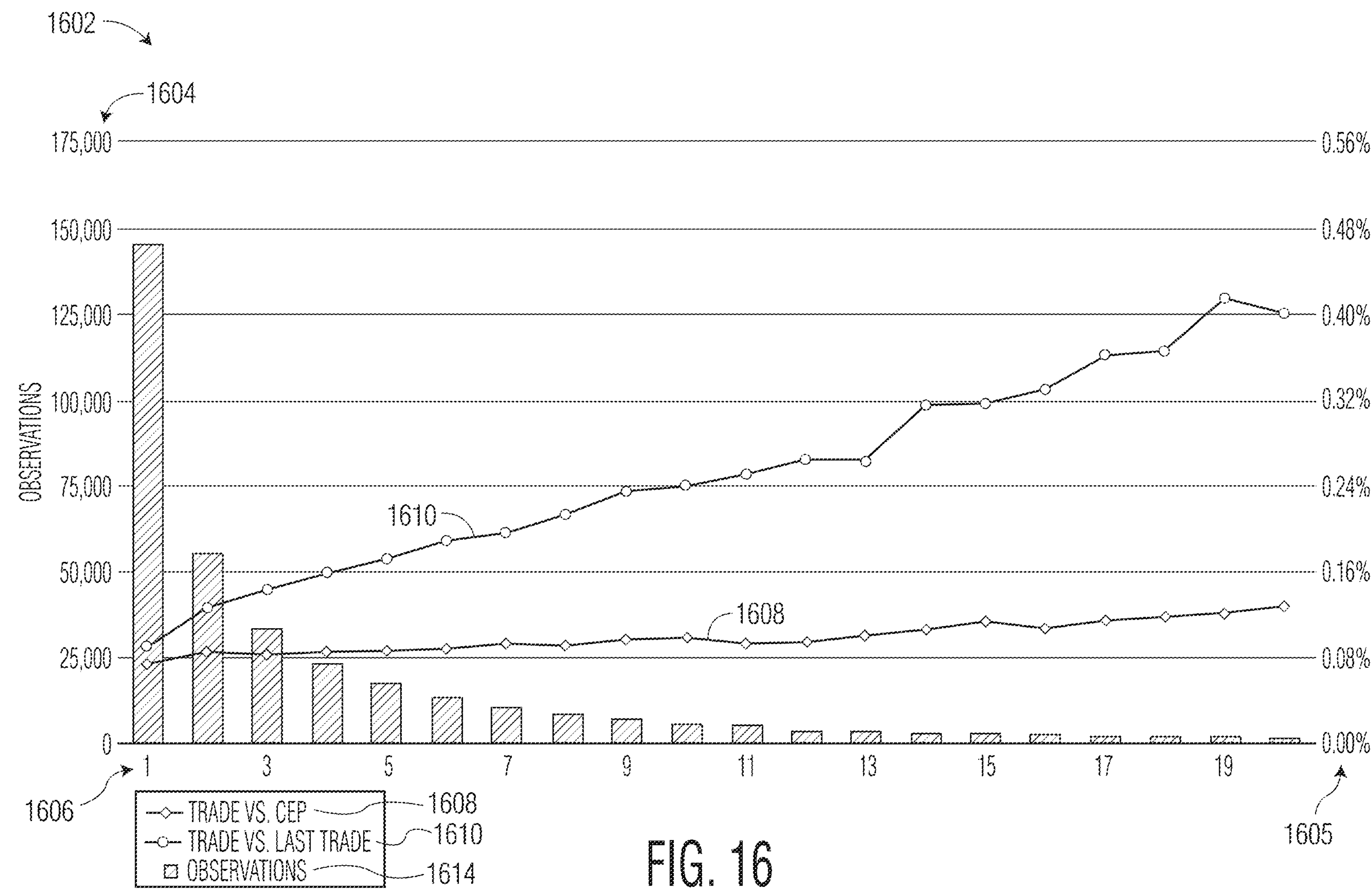
FIG. 16 is a fifth example graph generated by the system of the present disclosure may illustrating an absolute distance reduction days since last trade.

Referring now to FIG. 16, a fifth example graph 1602 is shown. The fifth example graph 1602 may illustrate an absolute distance reduction days since last trade. The distance reduction time since last trade may be generated from the backtesting data and may show the average absolute price difference between: 1) a CEP at a time ($T_0$) to a next trade at the time ($T_0$); and 2) a prior trade at time ($T_{t-n}$) to a next trade at the time ($T_0$). The absolute distance reduction days measures how much distance exists between (1) the most recent evaluated prices and the next trade, and (2) the prior trade and the next trade, and how these results vary over time.

The fifth example graph 1602 may show a number of observations on a first y-axis 1604, a median absolute percentage difference on a second y-axis 1605, and elapsed days on an x-axis 1606. The fifth example graph 1602 may compare trade vs. CEP 1608 and trade vs. last trade 1610 and may show a number of observations per day 1614.

Figure 17A:
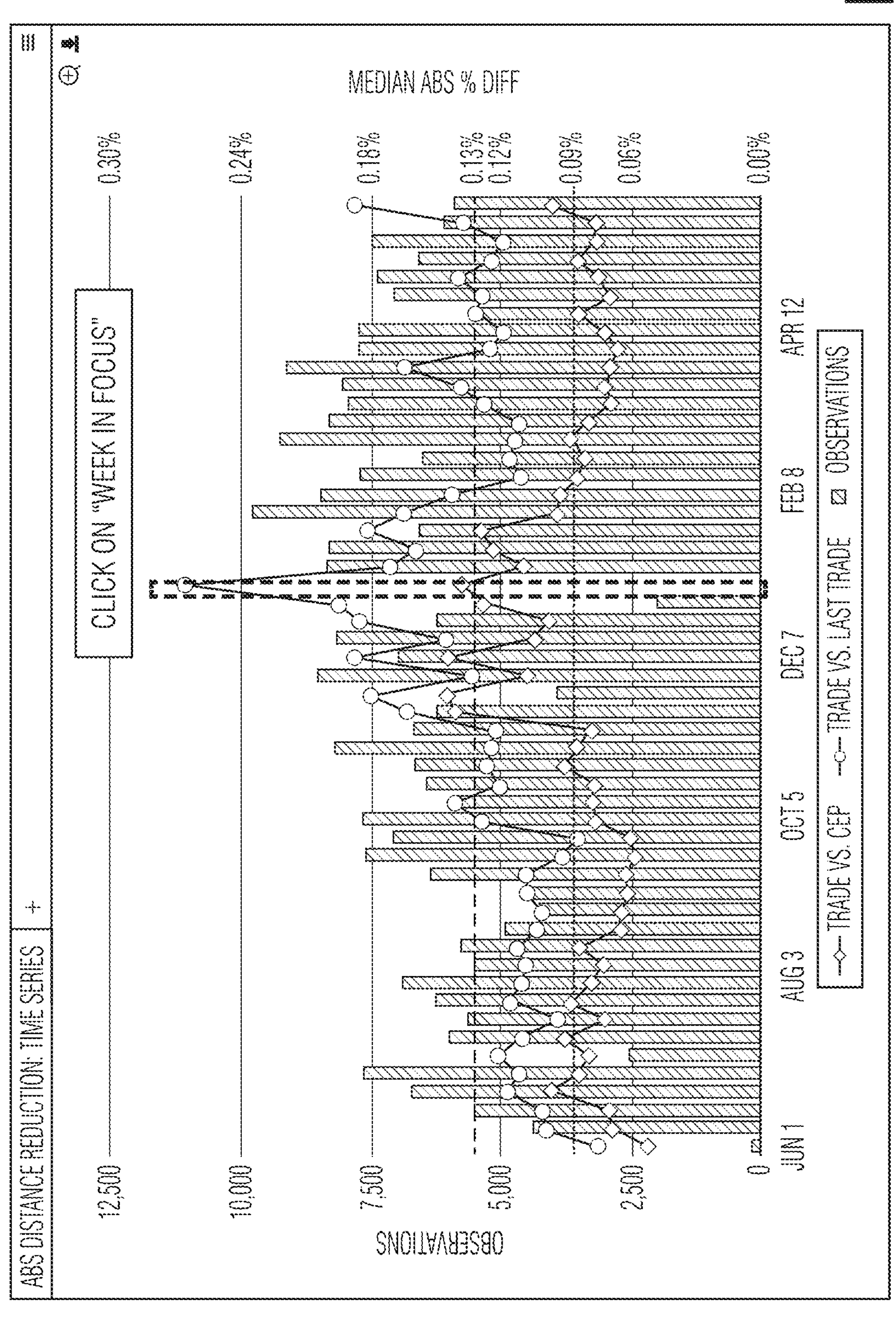
FIG. 17A is a first schematic representation of a graphical user interface illustrating traversing from high-level summary results to individual security results in the results dashboard.
Figure 17B:
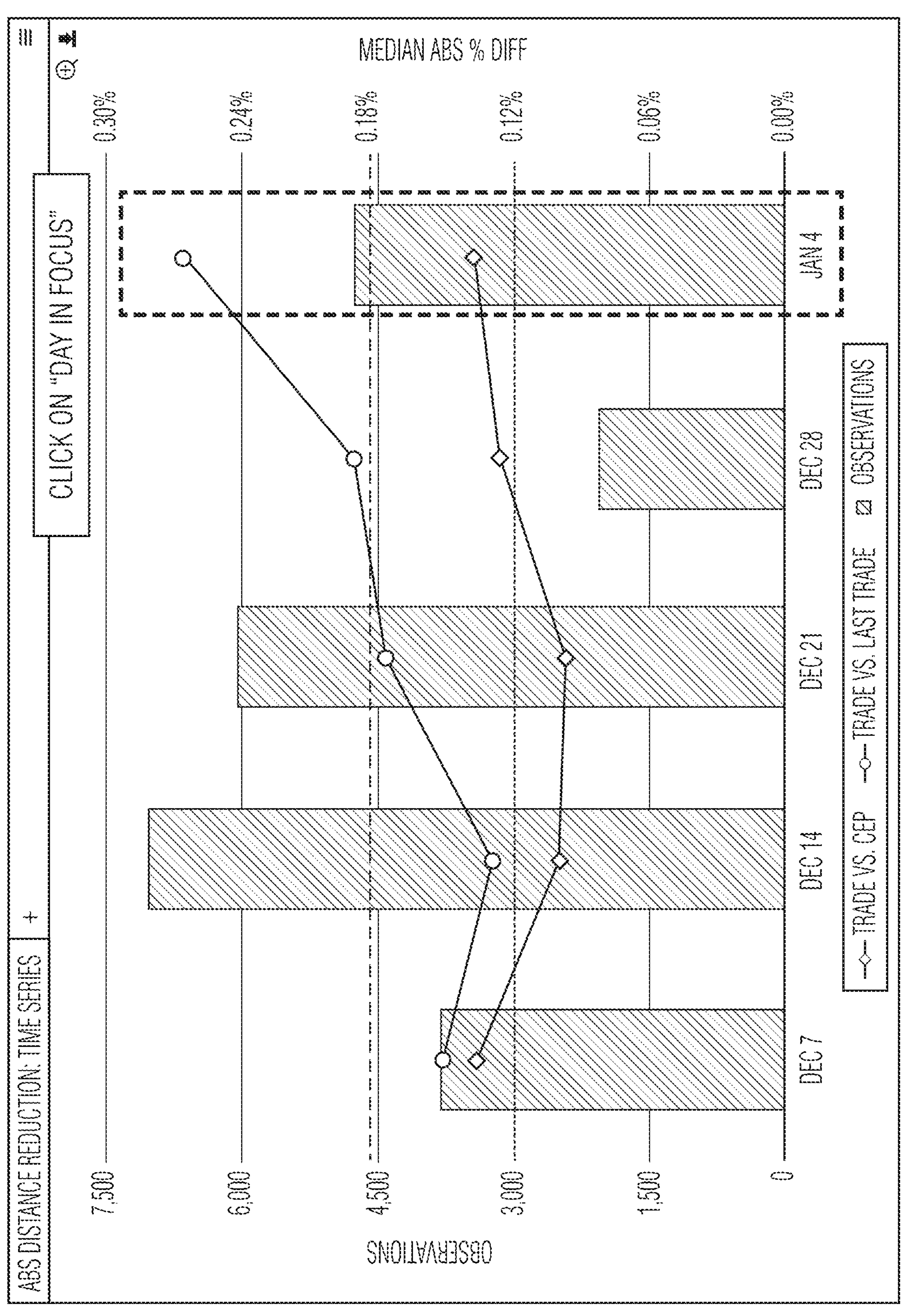
FIG. 17B is a second schematic representation of a graphical user interface illustrating traversing from high-level summary results to individual security results in the results dashboard.
Figure 17C:
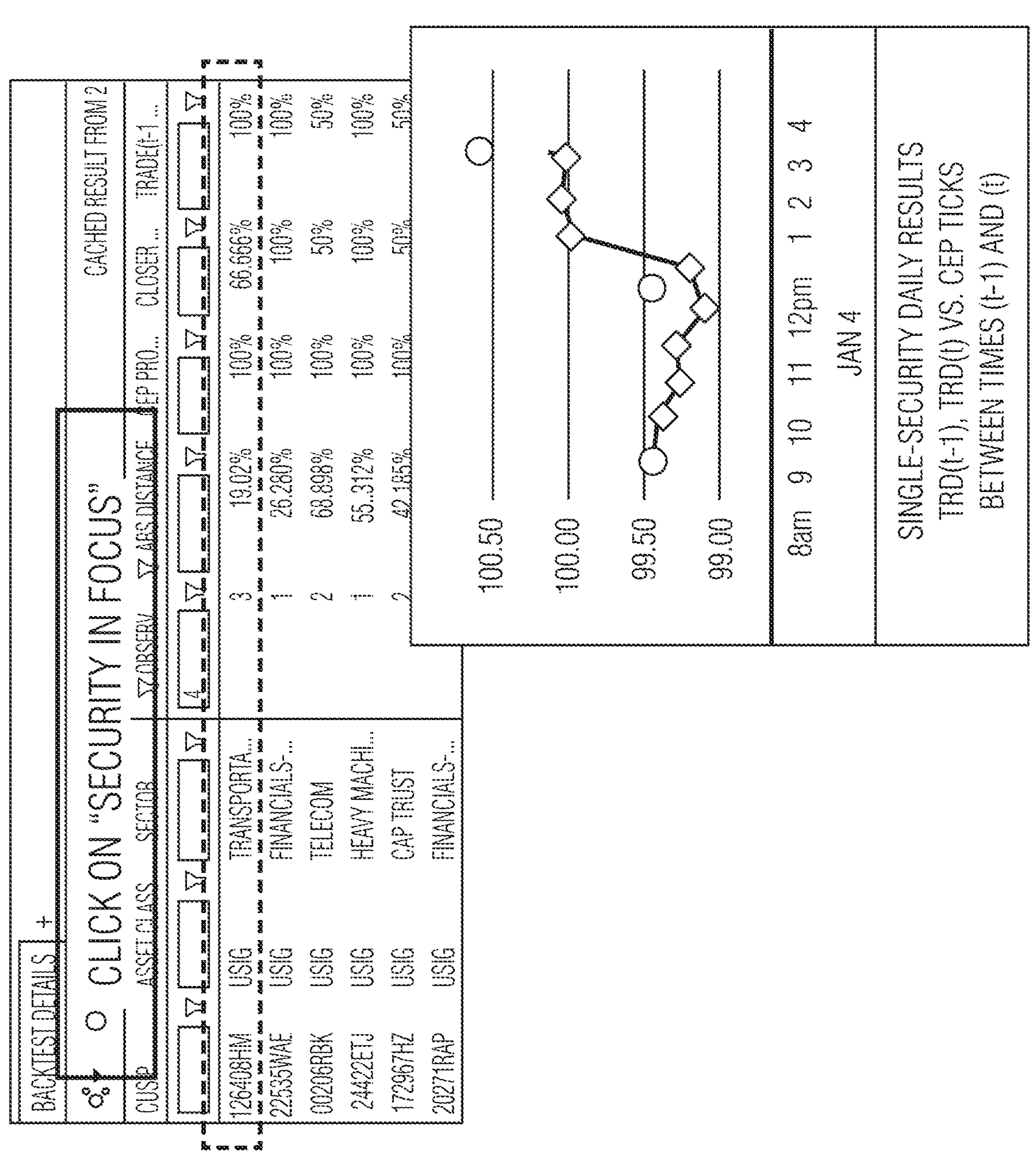
FIG. 17C is a third schematic representation of a graphical user interface illustrating traversing from high-level summary results to individual security results in the results dashboard.

Referring now to FIGS. 17A-17C, schematic representations of a graphical user interface illustrating the ability to navigate from high-level summary results down to individual security results (i.e., "traversing) is shown. Although not shown, the traversing feature may be used to navigate in the reverse direction (i.e., from individual security results to high-level summary results). FIGS. 17A-17C show the traversing feature being used on a weekly time series graph, but the feature may be used on any of the one or more interactive visuals 1104 shown in the results dashboard 1102. As shown in FIG. 17A, the system (e.g., based on user input/selection) may select a particular week in a time series to focus on, thereby creating a "week in focus" interface display, which shows data relevant to the selected week (i.e., a "deep dive"). The backtest details 1114 may automatically adjust in the original window, reducing down and displaying only those securities (and related data) included in the week selected.

As shown in FIG. 17B, a daily time series may display on the graphical user interface for the "week in focus." The system (e.g., based on user input) may select a particular day in the "week in focus," thereby creating a new interface display showing data relevant to the selected day (i.e., a "day in focus" deep dive). The backtest details 1114 may automatically adjust in the original window, reducing down and displaying only those securities (and related data) included in the day selected.

As shown in FIG. 17C, the system (e.g., based on user input) may select a particular security on the selected day to create a "security in focus" deep dive request. A new time series chart may be generated in the original window to show results for the selected security, with CEP ticks/trades/quotes/alternative price submissions/etc. included in the test on that day.

Figure 18:
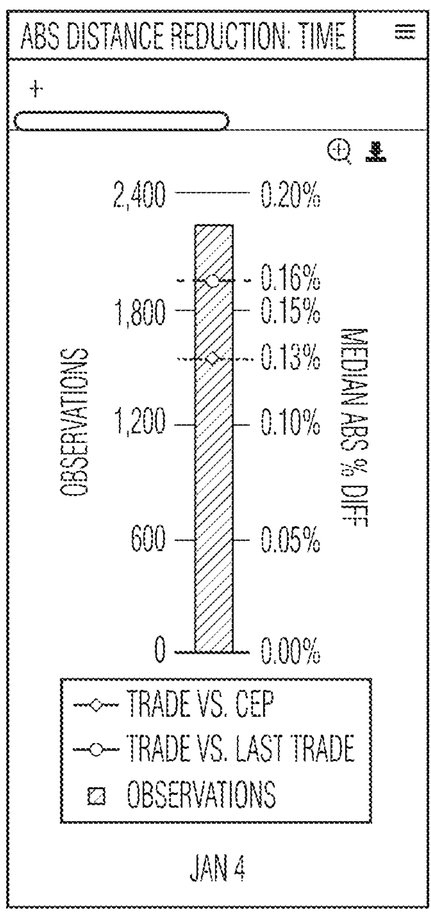
FIG. 18 shows a summary box plot for all securities included in a backtest of a full time period.

Referring now to FIG. 18, a schematic representation of a graphical user interface illustrating a box plot that may be displayed in the results dashboard 1102 is shown. FIG. 18 shows an illustrative summary box plot for all securities included in a backtest of a full time period. These graphs provide a further illustration of the type of output that the system of the present disclosure can generate and display via a graphical user interface. As with other output, the parameters of these graphs may be modified ad hoc and/or updated dynamically and in real time. For example, a summary box plot may be generated for one or more of: all securities included in a backtest over a period of one week; all securities included in a backtest for a single day; a single security included in a backtest for a single day; and all securities included in a backtest for a single day.

Figure 19:
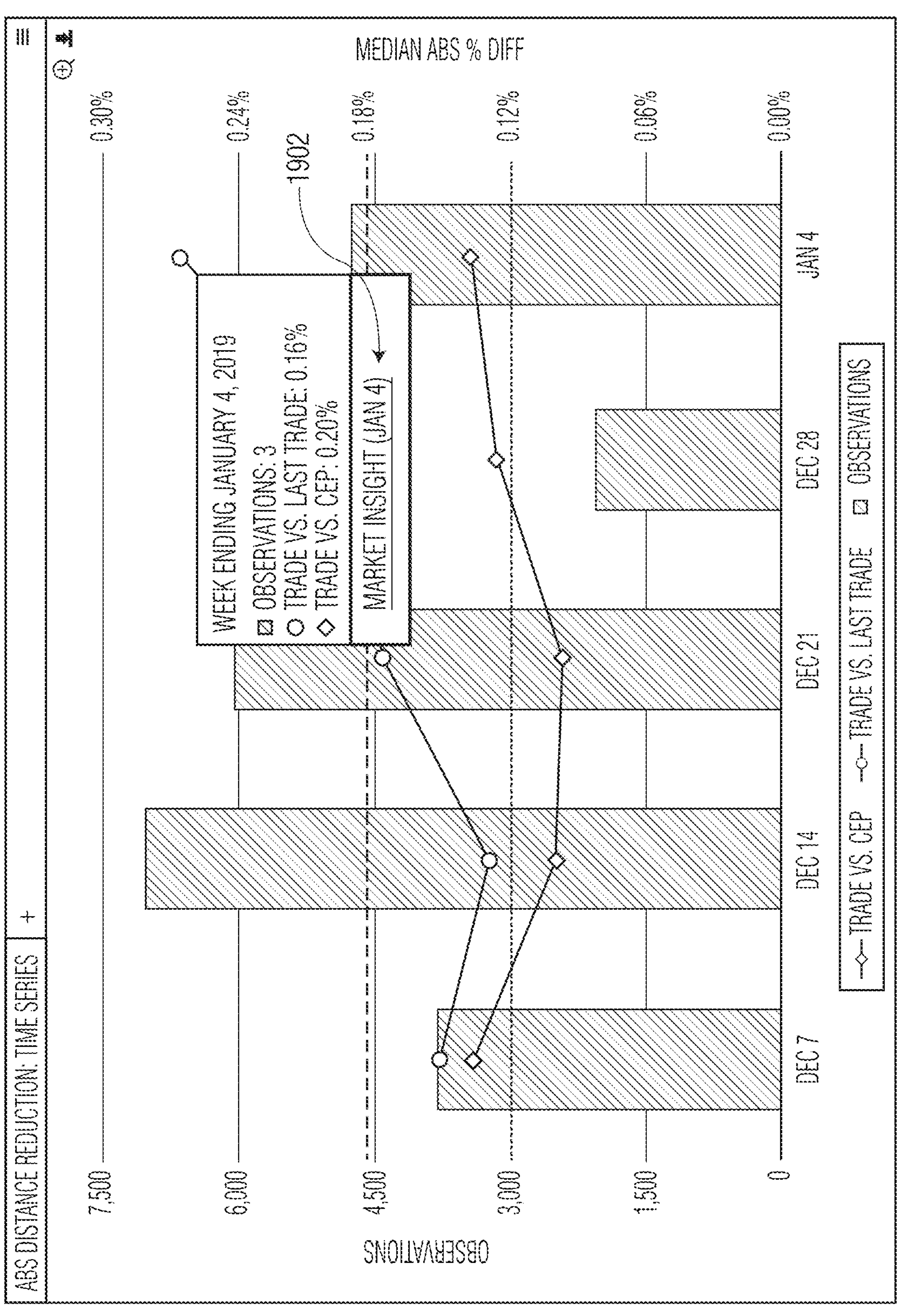
FIG. 19 is a schematic representation of a graphical user interface illustrating integration of a hyperlink to daily market insight data into the results dashboard.

Referring now to FIG. 19, a schematic representation of a graphical user interface illustrating integration of a hyperlink 1902 to daily market insight data for the results dashboard 1102 is shown. The hyperlink 1902 may be displayed in the one or more interactive visuals 1104 and may enable a user to retrieve historical market context data. The hyperlink may allow new widgets to be generated and displayed to users and may be set up independently of the results dashboard 1102. The hyperlink 1902, upon being selected, may automatically generate a pop-up window to appear within a widget that may include historical daily market insight.

Referring now to FIG. 20, a schematic representation of a graphical user interface illustrating a pop up window 2002 that may be generated by clicking a hyperlink 1902 is shown. The pop up window 2002 may have page options associated with different categories (e.g., market overview, corporate bonds, municipal bonds, and securitized products) that allow a user to navigate as needed. The pop up window 2002 may display the market insight data. The market insight data may be tied to a specific day selected and may provide a user contextual information about the market for that day, such as, for example, an overall state of the market or significant events that occurred. The market insight data may be stored in a database operatively coupled to the data conversion and distribution system 100.

In an embodiment, the backtesting utility 999 may use machine learning to automatically generate an interpretation of the backtesting results and provide this information to a user via the results dashboard 1102. For example, an implementation may describe how to best interpret the backtesting results. The backtesting utility 999 may leverage key parameters, such as configuration, sample size, observation count, outliers detected, lookback period selected, etc. to generate these results.

A pop-up window from the results dashboard 1102 may auto-populate with results, creating a variety of descriptive summary text available to the user. Expected results in the backtest details 1114 may generate a more general interpretation. Negative results in the backtest details 1114 may prompt further interpretation options.

Figure 21:
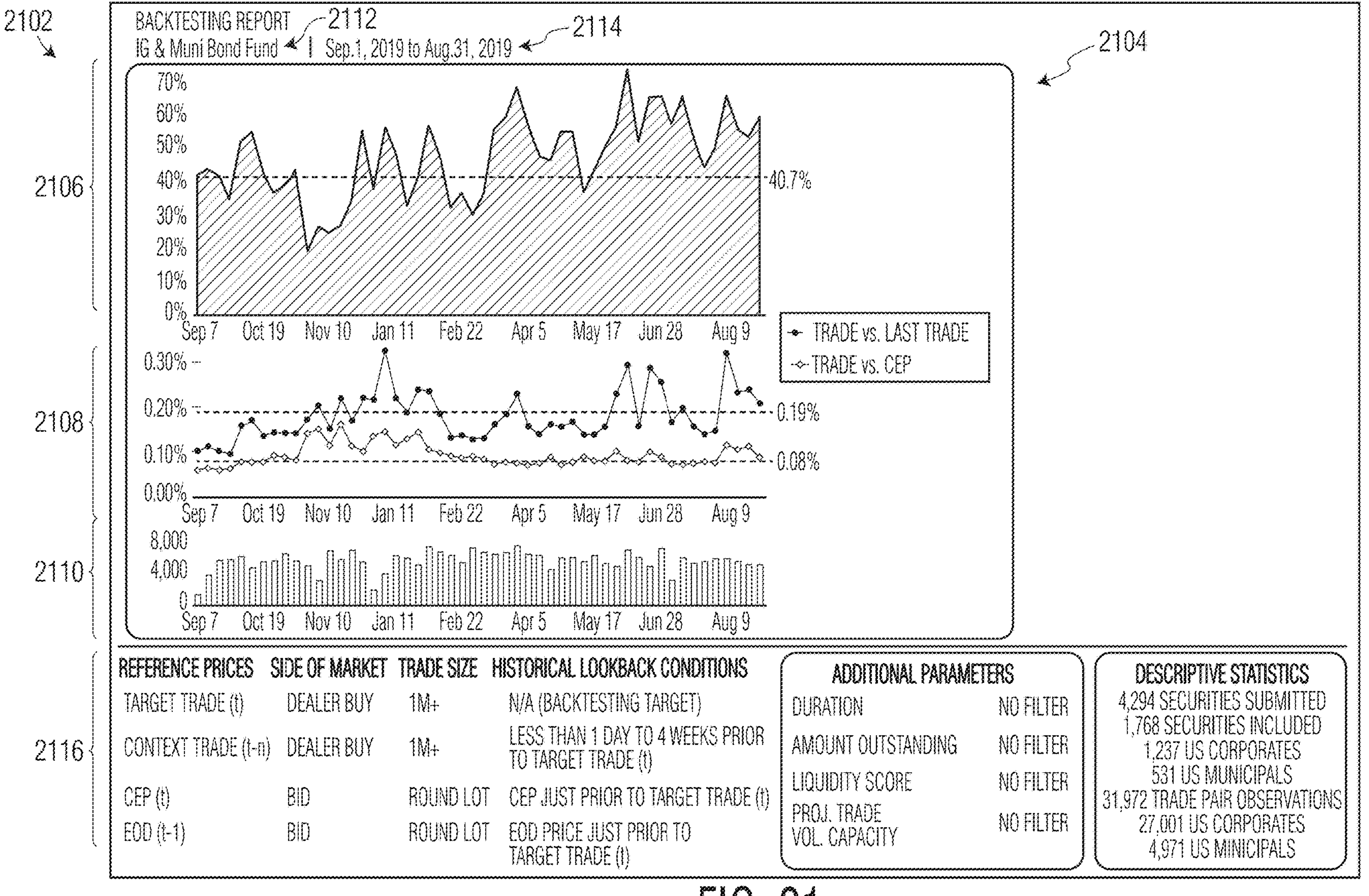
FIG. 21 is a schematic representation of a graphical user interface illustrating a backtesting report with a summary chart.

Referring now to FIG. 21, a schematic representation of a graphical user interface illustrating a backtesting report 2102 is shown. The backtesting report 2102 may be generated by the backtesting utility 999. The backtesting report 2102 may display a type 2112 of securities analyzed and a date range 2114 for observations. The backtesting report 2102 may include a summary graph 2104 that may show one or more of the graphs described above in a single window, which may allow a user to review multiple types of data in one place. The summary graph 2104 may include any number graphs, which may be selected by a user or may be generated automatically by the backtesting utility 999. For example, the summary graph 2104 may include a first graph 2106 showing a distance reduction as percentages 2106, a second graph 2108 showing median absolute price differences as percentages, and a third graph 2110 showing a number of trade pair observations.

As described above, the first graph 2106 may illustrate the relative distance reduced between reference prices (e.g., CEP(t)) and future trades (e.g., Target Trade (t)) in the context of previous trades (e.g., Context Trade (t-n)). The distance reduction may summarize backtesting performance through relative comparison, where the median absolute price differences may be utilized for each corresponding time series. In general, a positive distance reduction outcome may indicate that the reference prices are closer in proximity to future trade observations than the previous trade observations over time.

The second graph 2108 may illustrate the median absolute price differences observed between 1) reference prices and future trades (i.e., CEP(t) to Target Trade (t)) and 2) previous trades to future trades (i.e., Context Trade (t-n) to Target Trade (t)). In general, the lower the median absolute price difference, the closer in proximity to future trades.

The third graph 2110 may illustrate the total number of trade pairs included in the backtesting as a function of the date range, securities submitted, and configuration settings applied.

The backtesting report 2102 may also include a legend 2116 summarizing, for example, the data analyzed, conditions applied, and additional parameters used in the backtesting.

Figure 22A:
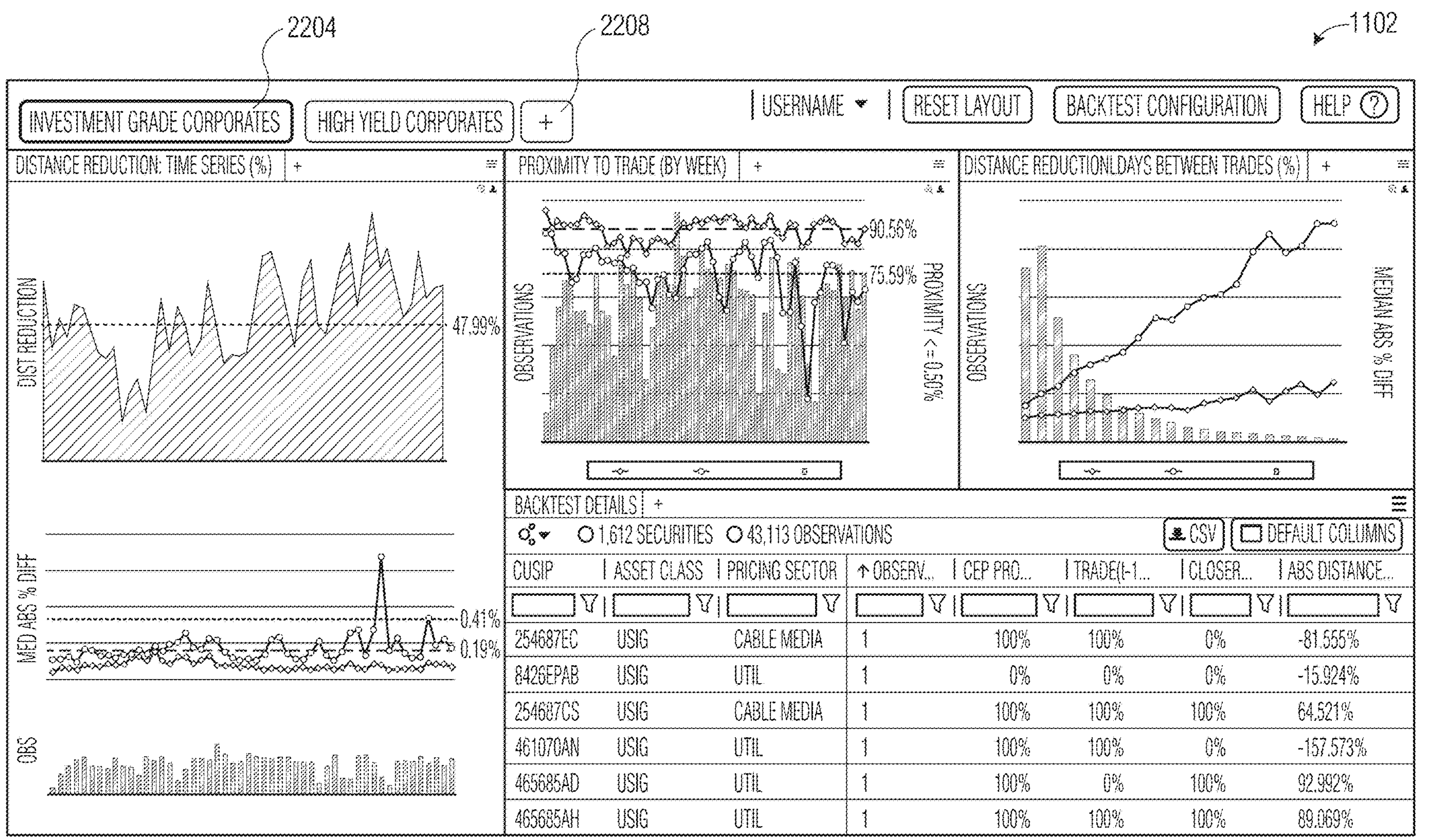
FIGS. 22A-22B are schematic representations of a graphical user interface illustrating integration of a paging feature into the results dashboard.
Figure 22B:
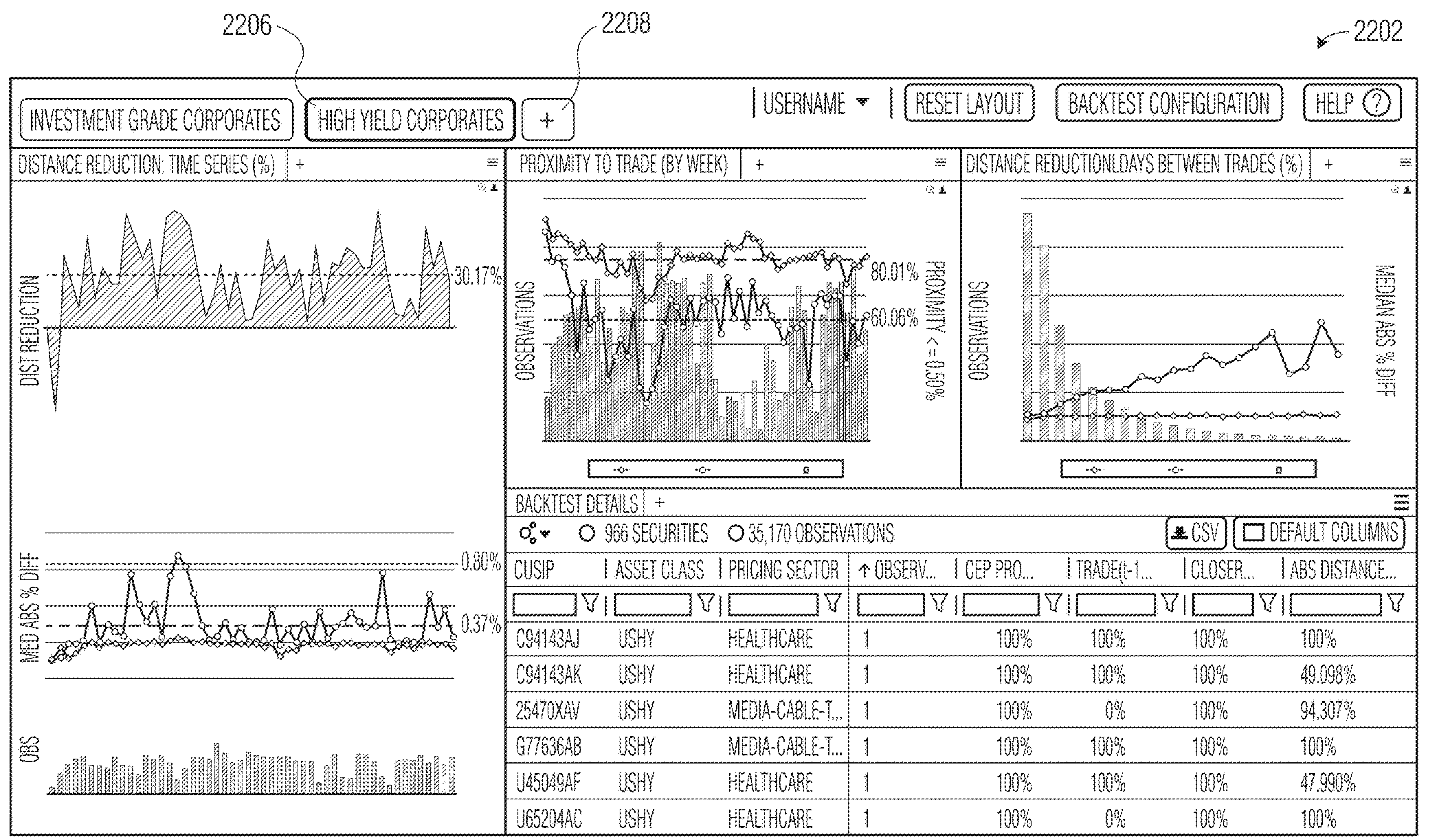

Referring now to FIGS. 22A-22B, schematic representations of a graphical user interface illustrating integration of a paging feature into the results dashboard 1102 are shown. The paging feature may allow users to create new pages on the fly to analyze different aspects of the data processed by the backtest configuration 1002 without having to re-run the backtest configuration 1002. This may reduce computing load as the modeling does not have to be performed again.

In an example, the paging feature may be used to show both the original results dashboard 1102 on a first tab/page 2204 and a second results dashboard 2202 for another set of data to be analyzed on a second tab/page 2206. Each of the first tab/page 2204 and the second tab/page 2206 may be configured to display any type of information generated after the original run of the backtest configuration 1002. In an example, the first tab/page 2204 may include a results dashboard 1102 illustrating investment grade corporate bonds and the second tab/page 2206 may include a second results dashboard 2202 illustrating high yield corporate bonds. A user may add any number of tabs/pages to the original results dashboard 1102. The different tabs/pages may be displayed as icons on each of the results dashboards and a user may switch between the different tabs/pages by clicking on the different icons. A plus icon 2208 may allow a user to open a new tab/page.

The paging feature may also be used to quickly traverse between summary information and the deep dives described above with reference to FIGS. 17A-17C. For example, a daily results time series may be expanded into a longer time window (up to a full time period selected in an initial backtest configuration 1002) and may be linked to a user selected identifier from a security-level results table.

In some examples, the one or more computer systems may include data storage devices storing instructions (e.g., software) for performing any one or more of the functions described herein. Data storage devices may include any suitable non-transitory computer-readable storage medium, including, without being limited to, solid-state memories, optical media and magnetic media.

The term "computer" shall refer to an electronic device or devices, including those specifically configured with capabilities to be utilized in connection with a data conversion and distribution system, such as a device capable of receiving, transmitting, processing and/or using data and information in the particular manner and with the particular characteristics described herein. The computer may include a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device specifically configured to perform one or more functions described herein.

The term "network" shall refer to any type of network or networks, including those capable of being utilized in connection with a data conversion and distribution system described herein, such as, for example, any public and/or private networks, including, for instance, the Internet, an intranet, or an extranet, any wired or wireless networks or combinations thereof.

The term "user interface" shall refer to any suitable type of device, connection, display and/or system through which information may be conveyed to and received from a user, such as, without limitation, a monitor, a computer, a graphical user interface, a terminal, a screen, a keyboard, a touchscreen, a biometric input device that may include a microphone and/or camera, a telephone, a personal digital assistant, a smartphone, or an interactive television.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

The term "or" may be construed in an inclusive or exclusive sense. Similarly, the term "for example" may be construed merely to mean an example of something or an exemplar and not necessarily a preferred means of accomplishing a goal.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present invention.

The invention claimed is:

1. A system for dynamically updating model results, the system comprising:

at least one server comprising one or more processors and a non-transitory memory, the at least one server configured to communicate with one or more data sources, the at least one server configured to:

generate an interactive graphical user interface (GUI) on at least one user device, the interactive GUI comprising a configuration interface for generating customizable backtesting analytics;

receive, via the configuration interface of the interactive GUI, user input from the at least one user device comprising a set of user-selectable parameters to form a customized backtesting configuration;

apply the customized backtesting configuration to unified data to generate backtesting data specific to the user input, the unified data having a single format and generated by a data unification module configured to reformat and aggregate electronic data files comprising real-time market data obtained from the one or more data sources in a plurality of formats;

model the generated backtesting data by initiating one or more models to produce model results, the one or more models including a combination of one or more non-statistical models and one or more statistical models, the model results comprising one or more of metrics and relationship information among the generated backtesting data;

generate and display, in a results dashboard of the interactive GUI, graphic backtesting analytic indicators representative of the model results specific to the customized backtesting configuration together with one or more filters for refining the customized backtesting configuration; and dynamically regenerate, in real-time, the results dashboard to display updates to the graphic backtesting analytic indicators responsive to user selection of the one or more filters, without generating any further windows in the interactive GUI, the one or more models being automatically reinitiated to account for the user selection of the one or more filters.

2. The system of claim 1, wherein the at least one server is configured to dynamically regenerate the graphic backtesting analytic indicators based on changes to the real-time market data.

3. The system of claim 1, wherein the unified data includes a combination of data quote counts, transaction counts, and transaction volume values corresponding to a time window.

4. The system of claim 1, wherein the at least one server is configured to automatically reinitiate the one or more models to account for changes in the unified data.

5. The system of claim 1, wherein the at least one server is configured to update the graphic backtesting analytic indicators responsive to any changes in the unified data.

6. The system of claim 1, wherein the set of user-selectable parameters comprises one or more of one or more data filtering parameters and one or more backtesting analytics parameters.

7. The system of claim 1, wherein the set of user-selectable parameters comprises one or more of a financial security parameter, a portfolio parameter, an asset class parameter, a date range, a specific date, a specific time of day, and one or more target backtesting analytics.

8. The system of claim 1, wherein the one or more filters comprise one or more of a price-type criteria, a trade size criteria, an optimal institutional trade size calculation and selection parameter, a lookback time period criteria, conditional filtering criteria and analytics filtering criteria.

9. The system of claim 1, wherein the one or more filters comprise one or more of real time regeneration of initial backtesting analytics, discrete, range, or multi-selection results generation, and security-level attributes criteria.

10. The system of claim 1, wherein the at least one server is configured to sort a portion of the backtesting data according to one or more sorting criteria.

11. The system of claim 1, wherein the one or more non-statistical models, when run, generate the metrics, the metrics comprising one or more of security level metrics, aggregate statistics and time-dependent aggregate statistics.

12. The system of claim 1, wherein the one or more statistical models, when run, utilize statistically significant features from among the generated backtesting data to generate the relationship information, the relationship information comprising one or more relationship coefficients based on the statistically significant features.

13. The system of claim 1, wherein the one or more models comprises one or more machine learning models.

14. The system of claim 1, wherein the at least one server is configured to adjust, via the interactive GUI, responsive to further user input, how the graphic backtesting analytic indicators are displayed.

15. The system of claim 14, wherein the adjusting comprises at least one of: moving a position of at least one of the graphic backtesting analytic indicators within the results dashboard, zooming in on one or more of the graphic backtesting analytic indicators, and analytic indicator extraction.

16. The system of claim 1, wherein the at least one server is configured to use machine learning to automatically generate an interpretation of the model results and to display the interpretation via the interactive GUI.

17. The system of claim 1, wherein the graphic backtesting analytic indicators comprise one or more interactive graphs.

18. The system of claim 1, wherein the results dashboard further comprises a backtesting detail region configured to display information associated with the generated backtesting data.

19. The system of claim 18, wherein the at least one server is configured to dynamically regenerate the results dashboard to display updates to the backtesting detail region responsive to the user selection of the one or more filters.

20. The system of claim 18, wherein the backtesting detail region is configured to arrange the displayed information according to one or more categories.

21. The system of claim 20, wherein the one or more filters correspond to the one or more categories.

22. The system of claim 20, wherein the one or more categories comprise one or more of a security identifier, an asset class, a sector, a number of observations, a liquidity score, a security duration, security level metrics, aggregate statistics, and time-dependent aggregate statistics.

* * * * *